US012215542B2

(12) United States Patent
Kim et al.

(10) Patent No.: US 12,215,542 B2
(45) Date of Patent: Feb. 4, 2025

(54) SMART ENTRYWAY

(71) Applicant: LG ELECTRONICS INC., Seoul (KR)

(72) Inventors: Hyunchul Kim, Seoul (KR); Kiyeal Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 797 days.

(21) Appl. No.: 17/202,920

(22) Filed: Mar. 16, 2021

(65) Prior Publication Data

US 2021/0207429 A1 Jul. 8, 2021

Related U.S. Application Data

(63) Continuation-in-part of application No. 17/136,903, filed on Dec. 29, 2020.

(30) Foreign Application Priority Data

Jan. 2, 2020 (KR) ........................ 10-2020-0000417
Jan. 2, 2020 (KR) ........................ 10-2020-0000418
(Continued)

(51) Int. Cl.
*E06B 5/11* (2006.01)
*E05B 47/00* (2006.01)

(52) U.S. Cl.
CPC ................ *E06B 5/11* (2013.01); *E05B 47/00* (2013.01); *E05B 2047/0094* (2013.01);
(Continued)

(58) Field of Classification Search
CPC .......... G07C 9/32; G07C 9/20; A47G 29/141; A47G 29/30; E05B 65/0003;
(Continued)

(56) References Cited

U.S. PATENT DOCUMENTS 3,248,533 A 4/1966 Mathis
3,673,735 A 7/1972 Winsler
(Continued)

FOREIGN PATENT DOCUMENTS

FR 2 772 810 6/1999
JP 2003-041861 2/2003
(Continued)

OTHER PUBLICATIONS

European Search Report issued in Application No. 21162559.5 dated Aug. 11, 2021.
(Continued)

*Primary Examiner* — Mark A Williams
(74) *Attorney, Agent, or Firm* — KED & ASSOCIATES, LLP

(57) ABSTRACT

A smart entryway includes an entrance door assembly configured to allow users (e.g., residents) to enter and exit a first space (e.g., a residence) and a storage assembly configured to allow secondary users (e.g., deliverymen) in a second space (e.g., a porch) to store items for later retrieval by the users. A portion of the storage assembly may be optionally refrigerated or heated. A security assembly is provided between the entrance door assembly and the storage assembly. The security assembly includes an authentication device to authenticate users and secondary users and a locking device to unlock the storage assembly and the entrance door assembly upon authentication. The locking device is provided behind the authentication device and concealed from the second space. When a first door of the storage assembly accessible from the first space is opened, a second door of the storage assembly accessible from the second space is locked.

20 Claims, 39 Drawing Sheets

(30) Foreign Application Priority Data

| | | | |
|---|---|---|---|
| Jan. 2, 2020 | (KR) | ........................ | 10-2020-0000419 |
| Jan. 2, 2020 | (KR) | ........................ | 10-2020-0000421 |
| Jan. 2, 2020 | (KR) | ........................ | 10-2020-0000422 |
| Mar. 16, 2020 | (KR) | ........................ | 10-2020-0031818 |

(52) U.S. Cl.
CPC ... *E05Y 2600/452* (2013.01); *E05Y 2600/508* (2013.01); *E05Y 2600/54* (2013.01); *E05Y 2900/131* (2013.01)

(58) Field of Classification Search
CPC ............. E05B 47/0001; E05B 63/0017; E05B 2047/0095; E06B 1/52; E06B 7/32; F25B 21/02; F25D 13/00; G06K 7/1413; G06K 7/1417; E05Y 2400/85; E05Y 2900/131; E05Y 2900/132
See application file for complete search history.

(56) References Cited

U.S. PATENT DOCUMENTS

| | | | | |
|---|---|---|---|---|
| 5,645,330 | A * | 7/1997 | Artwohl | F25D 27/00 49/504 |
| 5,690,501 | A | 11/1997 | Mader | |
| 6,148,563 | A * | 11/2000 | Roche | E06B 3/66366 49/501 |
| 9,687,087 | B1 | 6/2017 | Artwohl | |
| 11,512,894 | B2 * | 11/2022 | Kwon | F25D 19/04 |
| 11,543,169 | B2 * | 1/2023 | Kim | F25D 17/08 |
| 2011/0056136 | A1 | 3/2011 | Rodgers et al. | |
| 2012/0285089 | A1 | 11/2012 | Artwohl | |
| 2017/0026555 | A1 | 1/2017 | Hoyda et al. | |
| 2017/0032594 | A1 | 2/2017 | Chandler, Jr. | |
| 2017/0213187 | A1 * | 7/2017 | Choi | H04N 7/181 |
| 2019/0221144 | A1 | 7/2019 | Artwohl | |
| 2019/0280531 | A1 | 9/2019 | Ahmed et al. | |
| 2020/0380465 | A1 * | 12/2020 | Newcomb | G07C 9/00309 |
| 2021/0106160 | A1 * | 4/2021 | Janas | A47G 29/30 |
| 2021/0207431 | A1 * | 7/2021 | Kim | A47G 29/141 |
| 2021/0209878 | A1 * | 7/2021 | Kim | E06B 3/70 |

FOREIGN PATENT DOCUMENTS

| | | |
|---|---|---|
| JP | 2019-112873 | 7/2019 |
| KR | 20-0357547 | 7/2004 |
| KR | 10-0809044 | 3/2008 |
| KR | 10-2017-0092021 | 8/2017 |
| NL | 1 016 630 | 5/2002 |

OTHER PUBLICATIONS

European Search Report dated Jul. 26, 2021 issued in Application No. 21163465.4.
European Office Action dated May 17, 2023 issued in Application No. 21163465.4.
Korean Office Action dated Jun. 20, 2024 issued in Application No. 10-2020-0031818.
U.S. Office Action dated Jun. 21, 2024 issued in U.S. Appl. No. 17/205,846.

* cited by examiner

SMART ENTRYWAY

CROSS-REFERENCE TO RELATED APPLICATIONS

This application is a continuation-in-part of U.S. patent application Ser. No. 17/136,903, filed Dec. 29, 2020, which claims priority under 35 U.S.C. § 119 to Korean Application Nos. 10-2020-0000417, 10-2020-0000418, 10-2020-0000419, 10-2020-0000421, and 10-2020-0000422 all filed on Jan. 2, 2020, whose entire disclosures are hereby incorporated by reference. This application also claims priority under 35 U.S.C. § 119 to Korean Application No. 10-2020-0031818 filed on Mar. 16, 2020, whose entire disclosure is hereby incorporated by reference.

BACKGROUND

1. Field

The present disclosure relates to a smart entryway.

2. Background

When visitors enter and exit a building, and entrance door or gate may be the first or last structure encountered and leave a lasting impression on the overall appearance of the building, and there is a demand for elegant and appealing doors. In addition, as apartments and multi-family homes are on the rise, security is becoming increasingly important and there is a need for secure front entry doors and gates. Furthermore, as online shopping for groceries and other items has increased, there is an increasing demand to store, secure, and preserve delivered items without interacting face-to-face with deliverymen.

Historically, milkmen delivered milk and other perishable dairy items to residences in the morning, sometimes daily in areas where good refrigeration was lacking. Milkmen would leave the items at the door, inside an insulated box near the front door, or in a cubby that could be accessed from both the outside (for delivery) and inside (for pick-up). Such milk cubbies were not refrigerated or secure, and it was intended that the recipient remove and use the milk quickly. In addition, an intruder could potentially reach into the milk cubby to see inside the residence or potentially to access and unlock an interior lock (e.g., door lock) inside. As refrigeration became widely available and cars and supermarkets became more common, milk didn't need to be delivered every day, as consumers could shop for milk in bulk and store their milk in at-home refrigerators. Milk cubbies fell out of style.

More modern entrance doors may include slots for delivering newspapers or other small items. In addition, a mailbox further away from the door is typically assigned to a particular residence for deliverymen to store letters and other small items. However, larger packages must typically be left outside of the door or at a front desk in apartment buildings. While mailboxes can be secured with a lock, they are typically very small and made of metal, so they are not very insulating. In addition, newspaper slots allow intruders to view inside of the home or reach in to attempt to unlock the door from the inside.

Modern consumers increasingly do not want to shop for milk and other groceries in person, and so grocery delivery has become popular again. Therefore, there is a need for an entrance door that may securely receive larger delivery items, while preventing intruders from using such an entrance door to see inside of the house or unlock the door. In addition, as consumers are increasingly on-the-go and away from their residences, there is a need for an entrance door or storage system that can preserve perishable items for a relatively long time.

Korean Registered Utility Model Publication No. 20-0357547 discloses a refrigerator configured to be installed in a pre-existing front door or alternatively on an exterior wall adjacent to the front door. The refrigerator has a door configured to be opened and closed from outside the front door for delivery and a door configured to be opened and closed from inside the front door for receiving. However, only the interior (or "receiving") door has a door lock, and so items stored by a deliveryman that have not yet been retrieved may be stolen. In addition, the door lock is a conventional door lock, which may be forcibly released or unlocked by an outsider. As the refrigerator and pre-existing front door are installed separately, they do not have coordinating operations. Furthermore, the installation of such a refrigerator at the door or exterior wall may cause structural damage, as exterior walls tend to be load bearing walls. Such a configuration may pose fire durability issues, especially if the front door is large.

Korean Patent No. 10-0809044 discloses a contactless face authentication door lock system having a door lock to lock and unlock an entrance door and a camera attached to a ceiling to authenticate a user's face for entry. The door lock is controlled by receiving a wireless signal from the camera, and is therefore vulnerable to external hacking, difficult to control when signal is lost, and bulky in having a number of components for providing the wireless signal. In addition, the camera and other components are installed separately on the exterior, which may provide an unpleasing appearance.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Referring to FIGS. 1 to 4, a smart entryway according to an embodiment may be configured to be installed in a doorway 15 of a pre-existing structure or building 10 to partition and allow passage between a first space S1 and a second space S2. The first space S1 may be an exterior space or common space provided in front of the smart entryway. The second space S2 may be an interior space or private (e.g., residential) space provided behind the smart entryway. The first space S1 may be, for example, a front porch or a community hallway, while the second space S2 may be a residential room or foyer. The first space S1 may be public and accessible to outsiders, while the second space S2 may be a secure private space for residents and their guests. The smart entryway may also be referred to as a smart door or smart gate.

Figure 14:
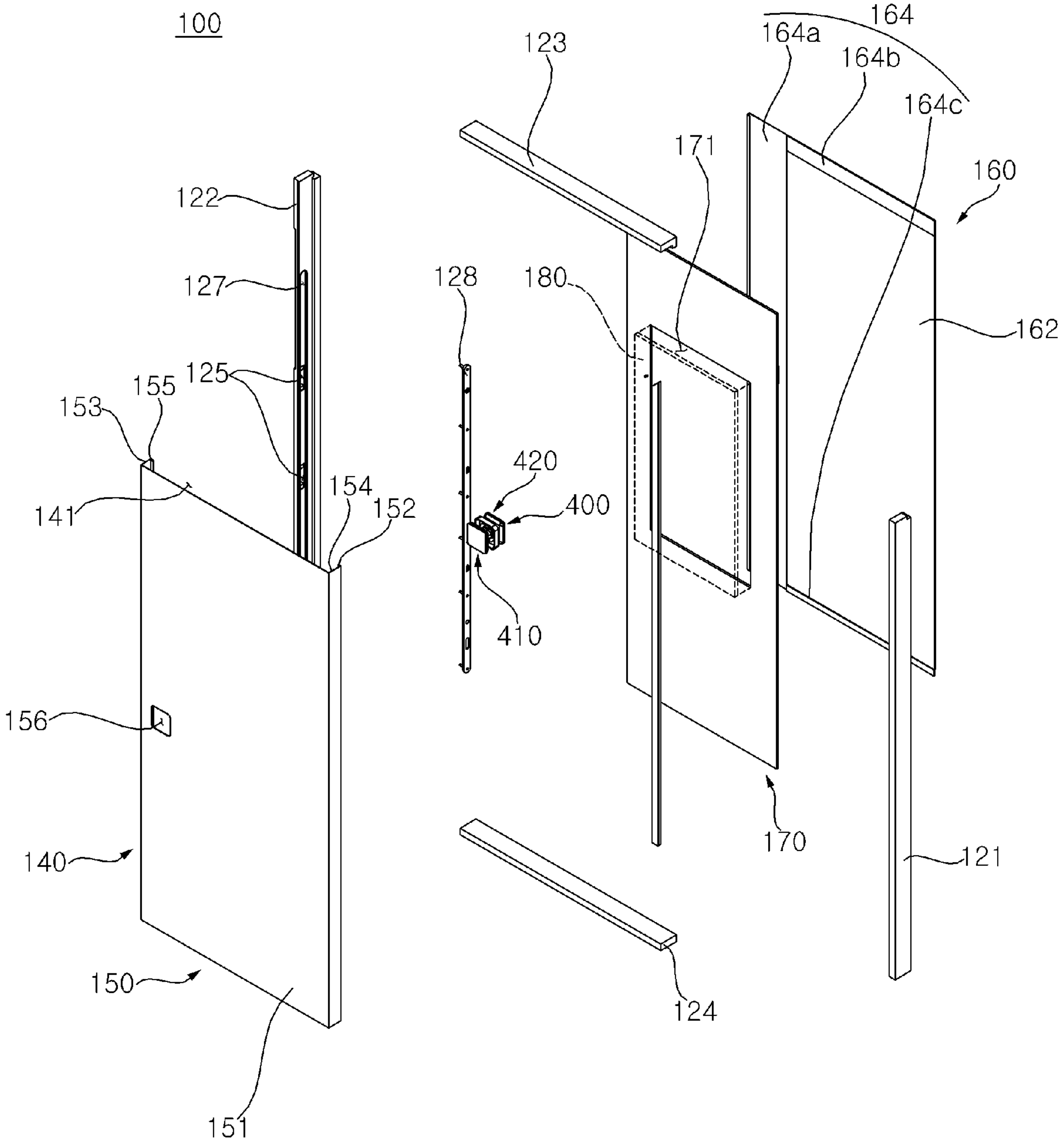
FIG. 14 is an exploded perspective view of the access door of FIGS. 13A and 13B.

The smart entryway may include an entrance door assembly 100 having an access door 140 allowing ingress and egress to and from the second space S2, and a storage assembly or delivery box assembly 200 having at least one storage container or box 500 to temporarily store items such as mail or groceries. Items may be placed in the smart entryway from the first space S1, and may be retrieved by users from the second space S2. At least a portion of the storage assembly 200 may be temperature-controlled to allow users to receive items requiring a certain temperature (e.g., perishable food items). In addition, the access door 140 may include a door display 180 (FIG. 14) visible from the second space S2. The door display 180 may indicate certain information or allow a user in the second space S2 to interact with someone in the first space S1.

A security assembly 300 may be provided between the entrance door assembly 100 and the storage assembly 200 such that the storage assembly 200 may be provided at a first side (e.g., left side) of the security assembly 300 and the entrance door assembly 100 may be provided at a second side (e.g., right side) of the security assembly 300. The security assembly 300 may selectively lock or unlock at least one of the entrance door assembly 100 or the storage assembly 200. The entrance door assembly 100, storage assembly 200, and security assembly 300 may fill the doorway of the structure 10.

The security assembly 300 may include an authentication device or interface 700 to authenticate a primary user (e.g., resident) and open the access door 140 upon authentication. The security assembly 300, based on a detection by the authentication device 700, may block access of unauthorized persons by keeping the access door 140 locked and closed when the user is not authenticated. A transparent cover 340 may protect the authentication device 700 and security assembly 300 from damage and prevent tampering.

Like the access door 140, the storage container 500 may be opened and closed based on authorization. For example, the storage container 500 may be opened and closed by using a predetermined authentication code (e.g., barcode or number code). A secondary user (e.g., a mailman) who possesses the predetermined authentication code may open the storage container 500 and store and/or access items (e.g., mail) in the opened storage container 500. Alternatively or in addition thereto, the secondary user may retrieve items left in the storage container 500 by the user (e.g., outgoing mail or package). Access to the storage container 500 may be authenticated differently than access through the access door 140 such that secondary users possessing the predetermined authentication code for the storage container 500 may not necessarily be allowed through the access door 140. Primary users may gain access to both the access door 140 and the storage container 500 upon authorization The entrance door assembly 100 and the storage assembly 200 may be installed in a doorway or other opening 15 formed in a structure 10, which may be a wall, series of walls (e.g., exterior wall, interior wall, and drywall), or a column constituting a building. Alternatively, the structure 10 may be a separate frame that is later installed in a wall, series of walls, or column constituting the building.

For convenience of description, the doorway or opening 15 will be referred to as a doorway, but the smart entryway is not limited to doorways. For example, the smart entryway may be implemented as a smart window installed in a window frame, a smart dog door installed in a pre-existing opening for a dog door, a smart gate for a fence, a smart garage door, etc. The doorway 15 may communicate with the first space S1 and the second space S2. The storage assembly 200 may be provided at a first side (e.g., left side) of the doorway 15, and the entrance door assembly 100 may be provided at a second side (e.g., right side) of the doorway 15. The security assembly 300 may be provided between the entrance gate 100 and the storage assembly 200.

The structure 10 may include a rear or interior wall 21 having a rear surface facing the second space S2 and a front or exterior wall 22 having a front surface facing the first space S1. A top wall or ceiling 23 may connect upper ends of the rear wall 21 and the front wall 22. A base or floor 24 may connect lower ends of the rear wall 21 and the front wall 22.

The front and rear walls 22 and 21 may be vertical walls or columns. The ceiling 23 may be a horizontal wall. The floor 24 may be a horizontal. Each of the front and rear walls 22 and 21 may be formed as separate left and right walls or columns that may connect via an upper wall above the doorway, or alternatively formed as a single wall or column. The front and rear walls 22 and 21 may be connected at sides by side walls or panels provided in a building, but embodiments disclosed herein are not limited. A space between the front and rear walls 22 and 21 and between the floor 24 and the ceiling 23, but not including the doorway 15, may be filled with solid material or be formed of building material (e.g., wood, cement, or brick). The front and rear walls 22 and 21 may be formed integrally with the ceiling 23 and/or the floor 24, but embodiments disclosed herein are not limited.

A middle structure, wall, or column 25 (FIG. 7) may be provided in the middle of the doorway 15 between left and right sides of the structure 10 forming the doorway 15. The middle structure 25 may be formed by the structure 10, or alternatively may be a separate structure such as a plate. When available, the middle structure 25 may support the security panel assembly 300.

The front and rear walls 22 and 21 and the ceiling and floor 23 and 24 may have a pre-existing configuration of the structure 10 where the smart entryway is to be installed. For example, in the case of a reinforced concrete structure 10 that is part of a concrete building, at least one of the rear wall 21, the front wall 22, top wall or ceiling 23, or floor 24 may be formed of a concrete material. In the case of a wooden structure 10 that is part of a wooden building, at least one of the rear wall 21, the front wall 22, the ceiling 23, and the floor 24 may be wood. In the case of a steel structure 10 that is part of a steel building, at least one of the rear wall 21, the front wall 22, the ceiling 23, or the floor 24 may include steel.

There may be optional intermediate walls between the front and rear walls 22 and 21. As an example, the front wall 22 may be brick or cement, the rear wall 21 may be drywall and an intermediate air, insulation, wood, or cement wall may be provided between the front and rear walls 22 and 21.

The smart entryway may be installed in the structure 10 regardless of a building material or manufacturing method of the building. The smart entryway may come with an optional bottom surface or base 24*b* configured to be installed on the floor 24, as shown in FIG. 3B.

The structure 10 may partition the first space S1 from the second space S2. The doorway 15 may be formed through the structure 10 in a front-rear direction to communicate with the first space S1 and the second space S2. The doorway 15 may have a thickness t, a width W and a height H. The thickness t may be a front-rear distance between the first space S1 and the second space S2 and represent a front-rear depth of the doorway 15. The width W may be an inner left-right distance of the doorway 15. The height h may be a vertical distance no greater than a height of the door assembly 100.

The entrance door assembly 100, the storage assembly 200, and the security assembly 300 may be provided in the doorway 15. When assembled, the entrance door assembly 100, the storage assembly 200, and the security assembly 300 may have a thickness less than or equal to the thickness t of the doorway 15, a height less than or equal to the height H of the doorway 15, and a width less than or equal to the width W of the doorway 15.

The doorway 15 may be divided into a first opening or right section 11, a second opening or left section 12, and a third opening or middle section 13. The entrance door assembly 100 may be provided in the first opening 11. The storage assembly 200 may be provided in the second opening 12. The security assembly 300 may be provided in the third opening 13.

The first opening 11 may have the largest area among the first through third openings 11-13, and the third opening 13 may have the narrowest or smallest area among the first through third openings 11-13. The second opening 12 may be narrower than the first opening 11 and larger than the third opening 13. A size of the first opening 11 may correspond to a size of the entrance door assembly 100, a size of the second opening 12 may correspond to a size of the storage assembly 200, and a size of the third opening 13 may correspond to a size of the security assembly 300. A user may move from the first space S1 to the second space S2 through the entrance door assembly 100, and a width of the first opening 11 may be the widest among the first through third openings 11-13.

Although the figures show that the widths of the first opening 11, the second opening 12, and the third opening 13 are different from each other, embodiments disclosed herein are not limited to the described proportions. Although the figures show that the heights of the first, second, and third openings 11-13 are the same, embodiments disclosed herein are not limited. Heights of the entrance door assembly 100, the storage assembly 200, and the security assembly 300 may be the same while the widths are different, but embodiments disclosed herein are not limited.

Dimensions of the entrance door assembly 100, the storage assembly 200, and security assembly 300 may be configured based on dimensions of the doorway 15. As most front doorways have a standardize size, the smart entryway may be manufactured to fit within a standard doorway or to have dimensions matching standard doors to allow mass production. In the U.S., for example, many front doors are 50 inches high, 36 inches wide, and 2 inches thick, and so the entire smart entryway may be configured to be 50 inches high, 36 inches wide, and 2 inches thick.

The access door 140 of the entrance door assembly 100 may open and close the first opening 11. The storage container 500 of the storage assembly 200 may be divided into two or more sections or containers 500-1 and 500-2 to have a cabinet or drawer structure. Each container 500-1 and 500-2 may have front and rear container doors 520 and 540 (FIG. 16) to open and close the containers 500-1 and 500-2. Each front container door 520 of the storage container 500 may open or close at least a portion of the second opening 12. The front container door 520 may be exposed to and face the first space S1, and the rear container doors 540 may be exposed to and face the second space S2. The front and rear container doors 520 and 540 may alternatively be referred to as exterior and interior container doors 520 and 540. Details on the front and rear containers doors 520 and 540 will be described with reference to FIGS. 16-18.

The security assembly 300 may be provided in the third opening 13 to cover the third opening 13. The security assembly 300 may be coupled to at least one of the entrance door assembly 100, the storage assembly 200, or the structure 10.

Figure 1:
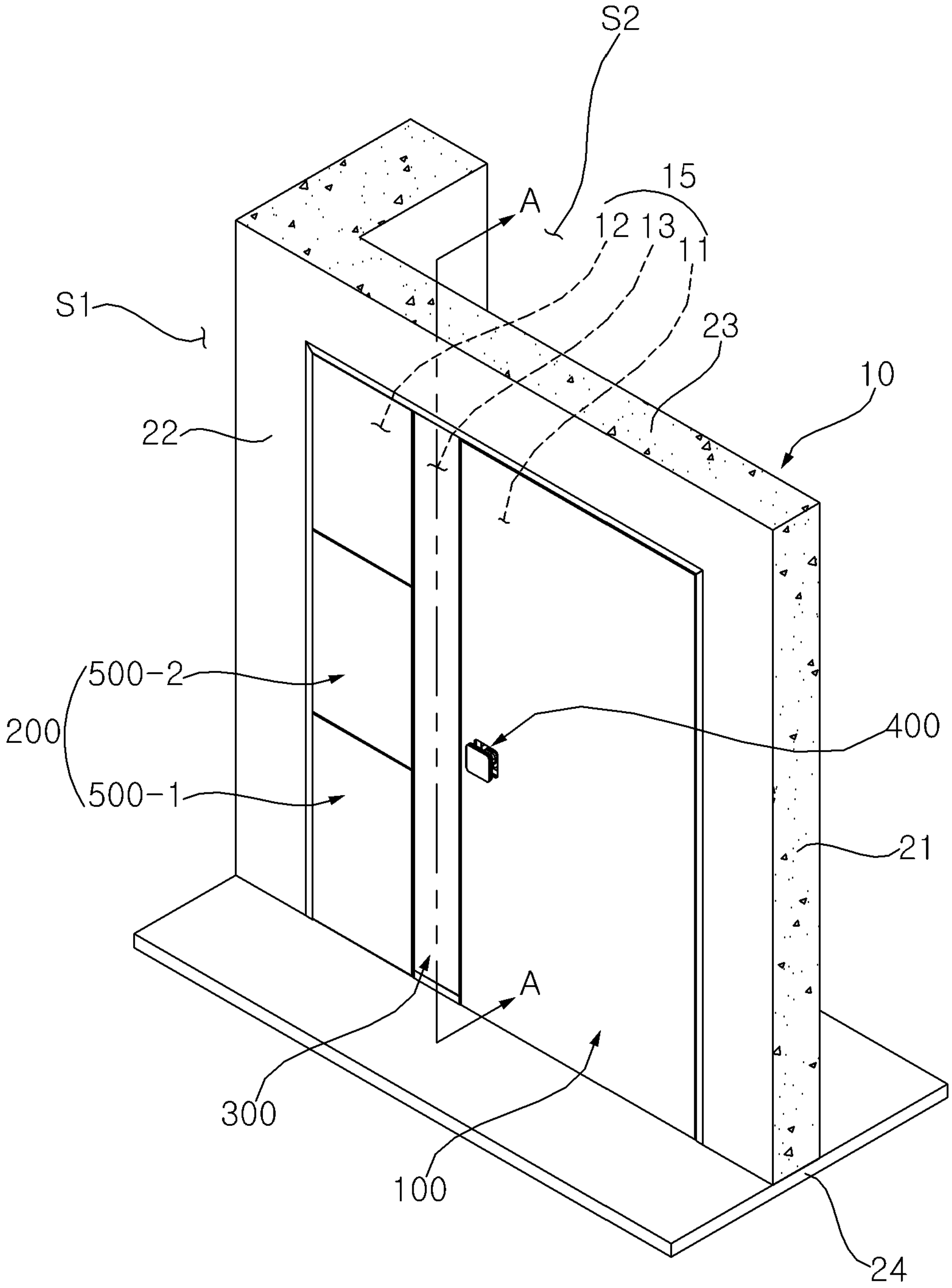
FIG. 1 is a perspective view of a smart gate according to an embodiment.
Figure 2:
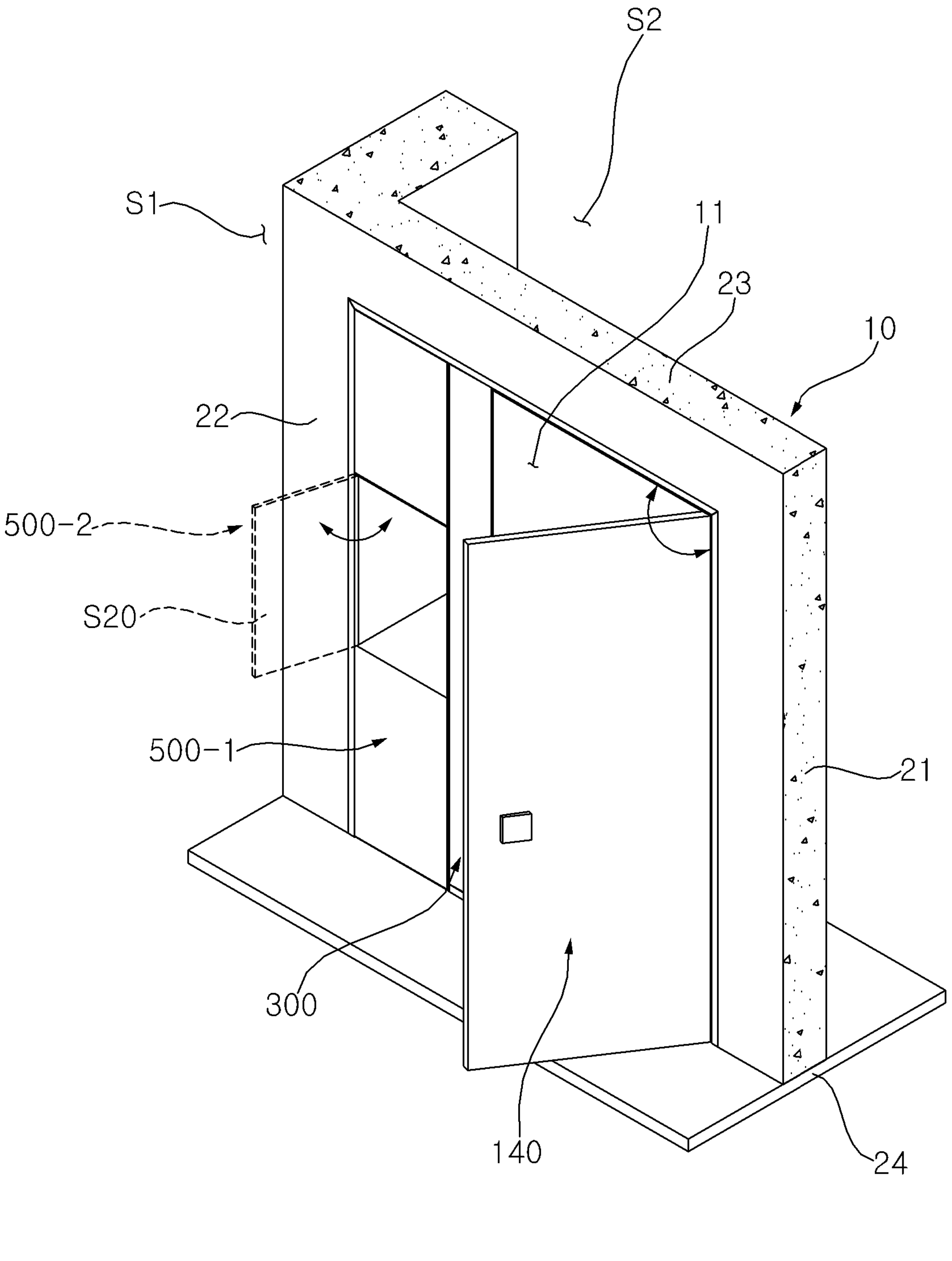
FIG. 2 shows the smart gate of FIG. 1 opened.
Figure 3A:
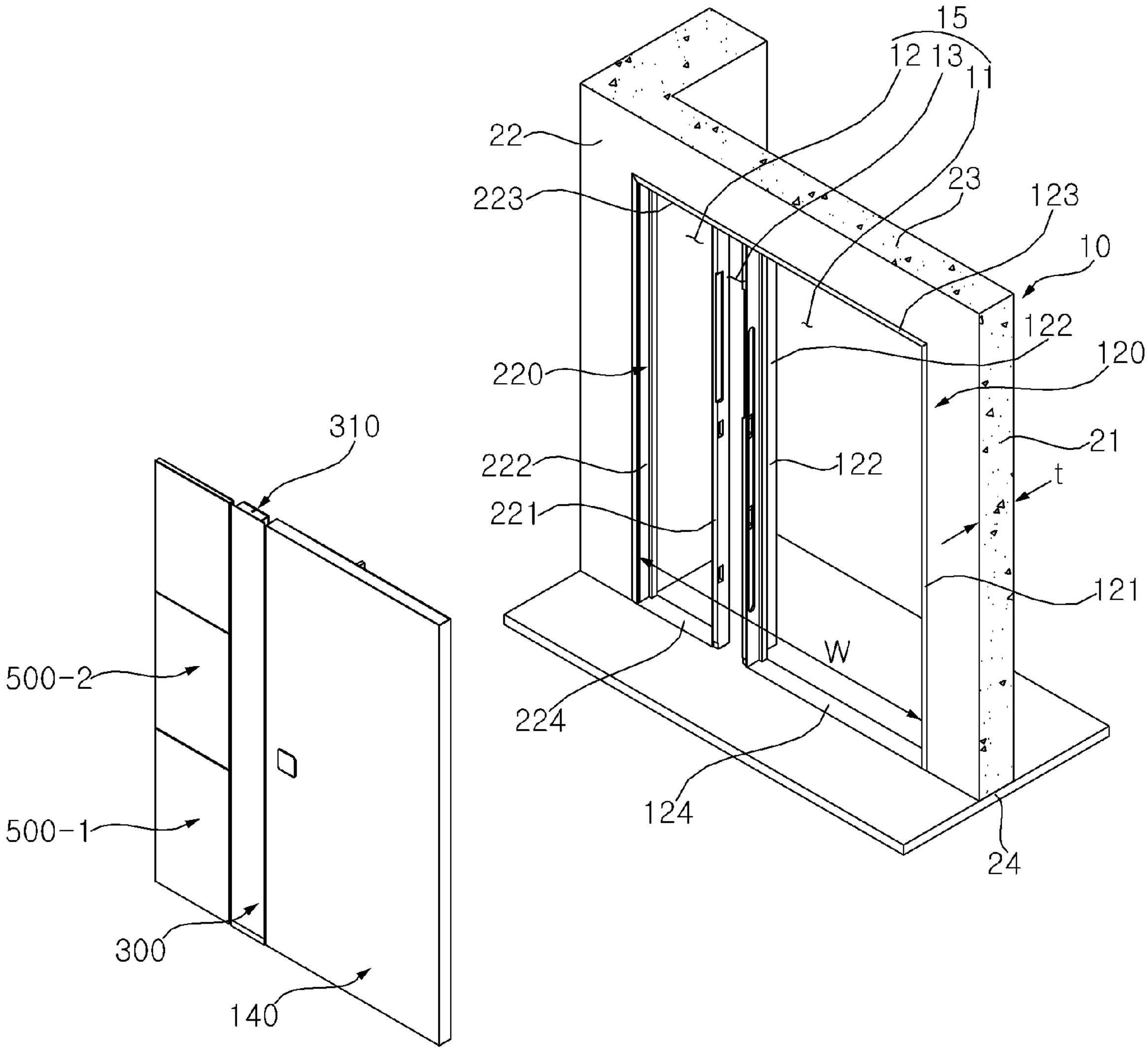
FIG. 3A is an exploded perspective view of a part of an access door, and storage doors shown in FIG. 1.
Figure 3B:
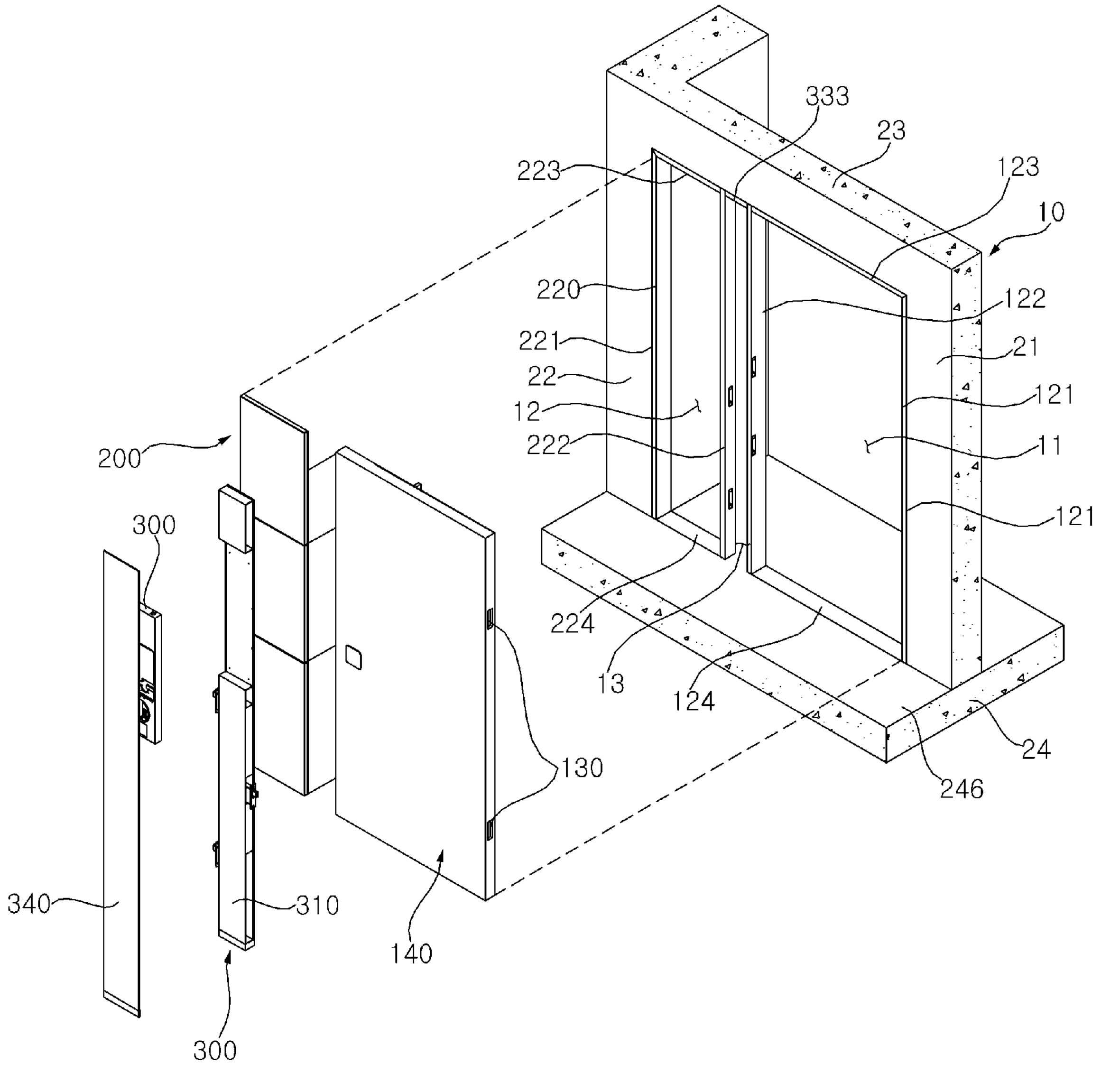
FIG. 3B is an exploded perspective view showing a security assembly provided between the access door and storage doors.
Figure 3C:
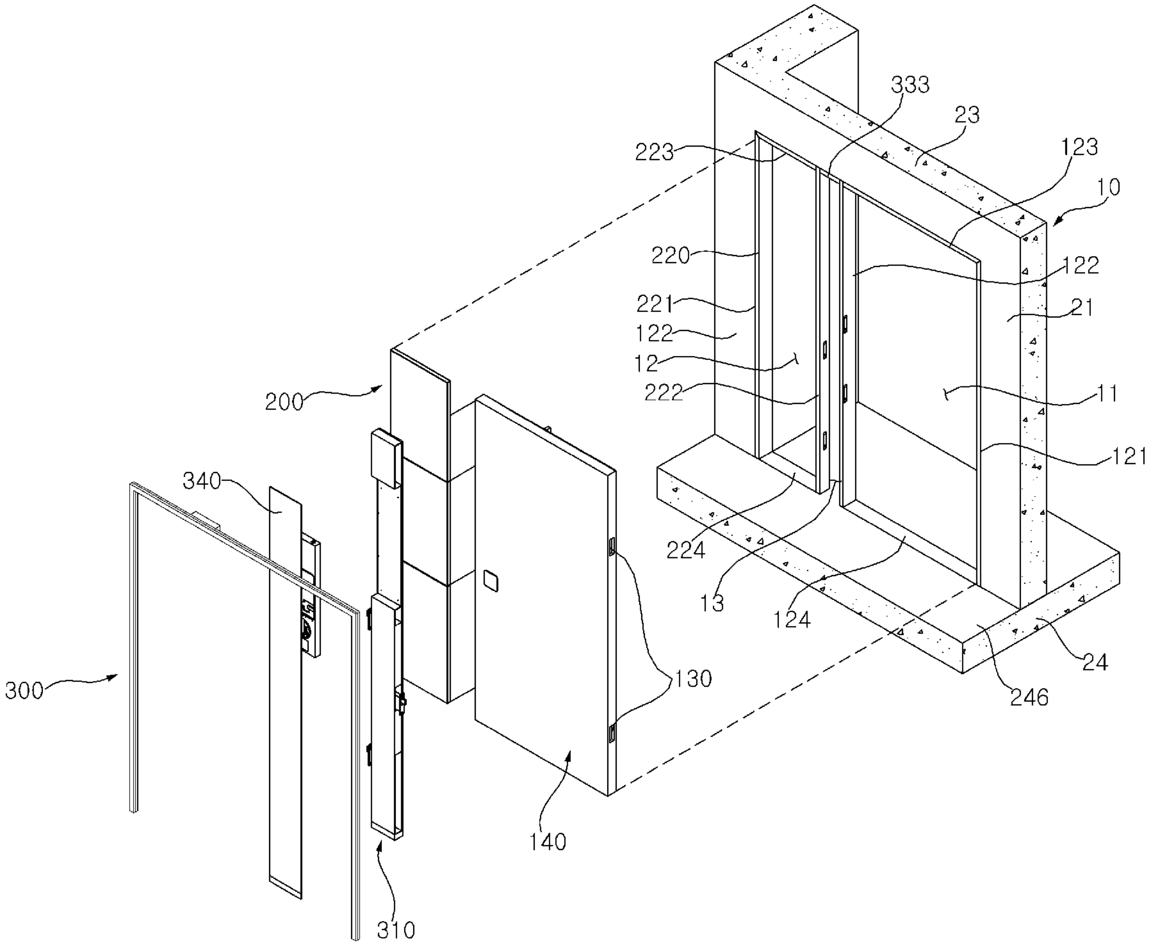
FIG. 3C is an exploded perspective view showing a front trim or seal.
Figure 3D:
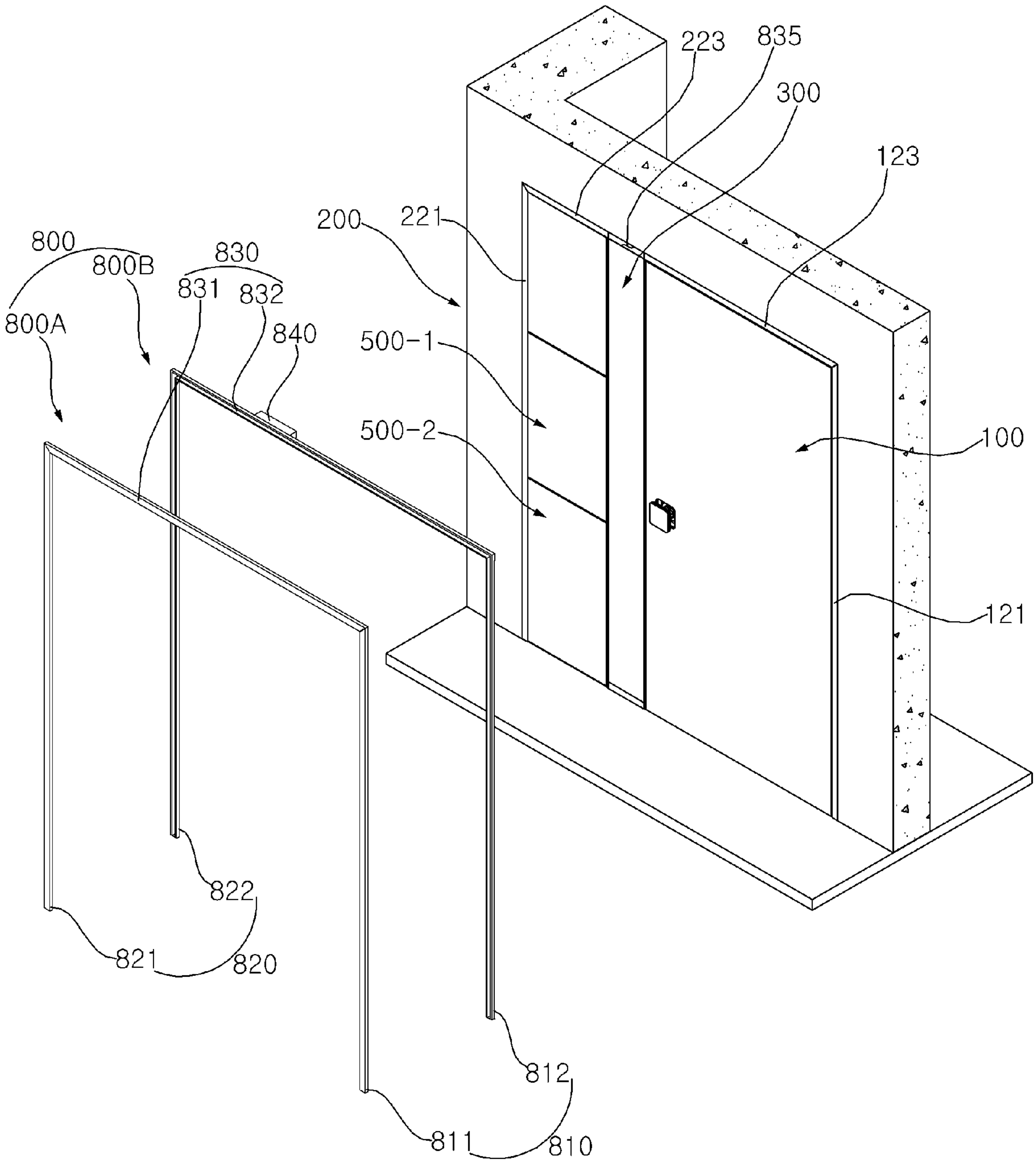
FIG. 3D is a view showing the front trim.
Figure 3E:
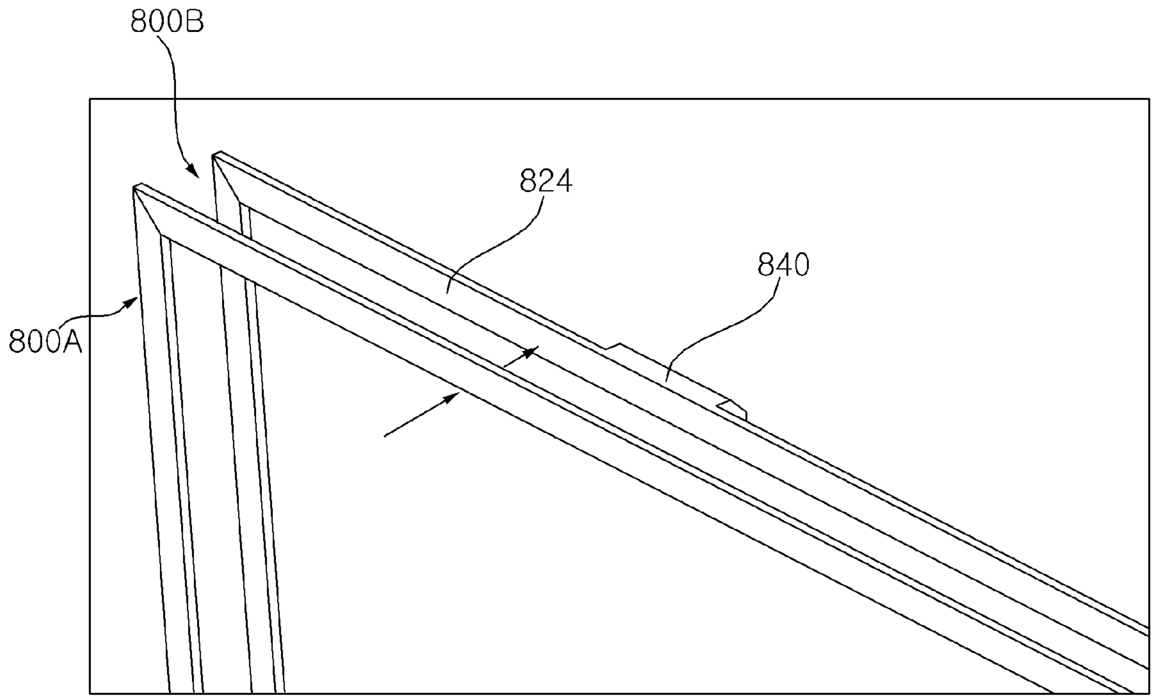
FIG. 3E is an enlarged exploded view of the front trim.
Figure 3F:
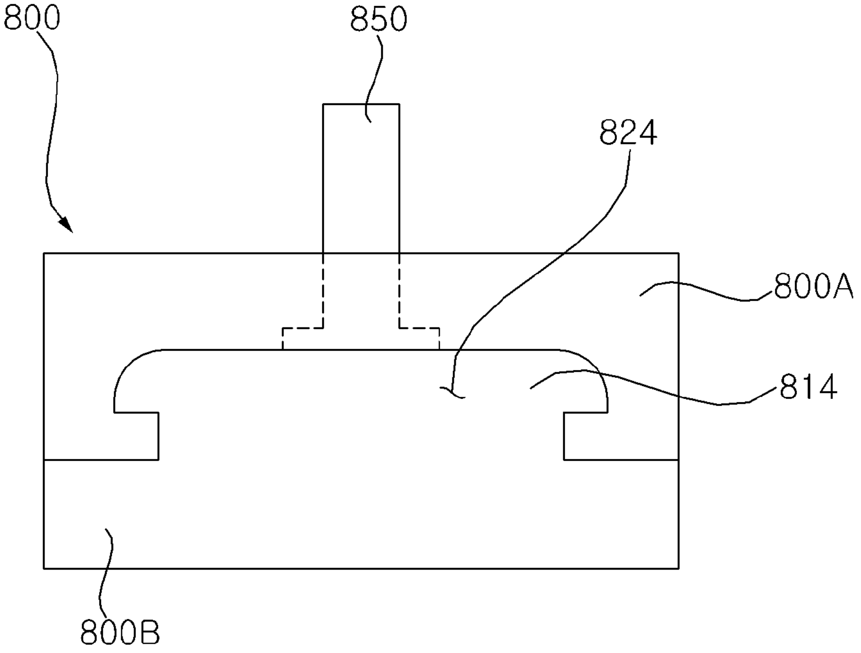
FIG. 3F is a top cross-sectional view of the front trim.
Figure 3G:
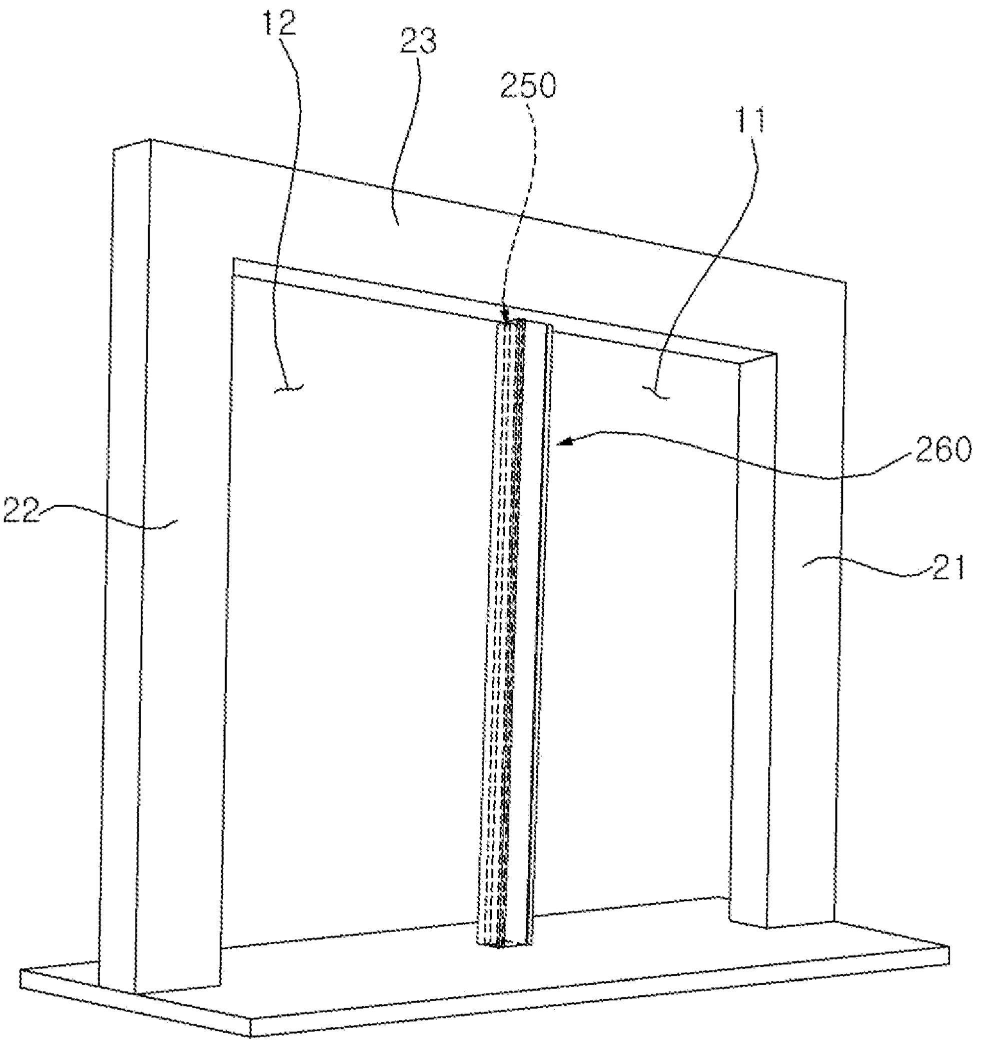
FIG. 3G is a perspective view of a structure or building.
Figure 3H:
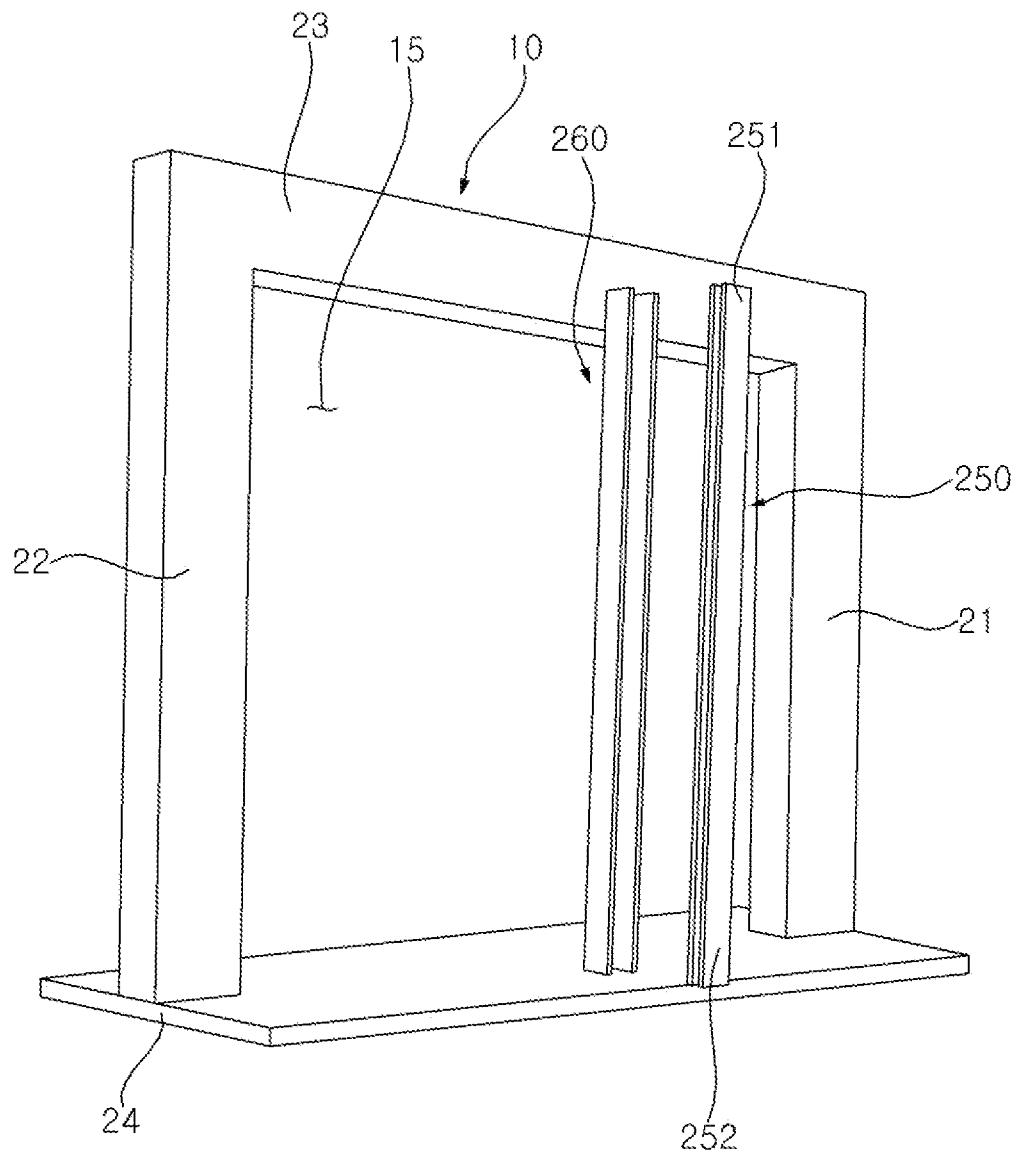
FIG. 3H is an exploded view of the structure.
Figure 4A:
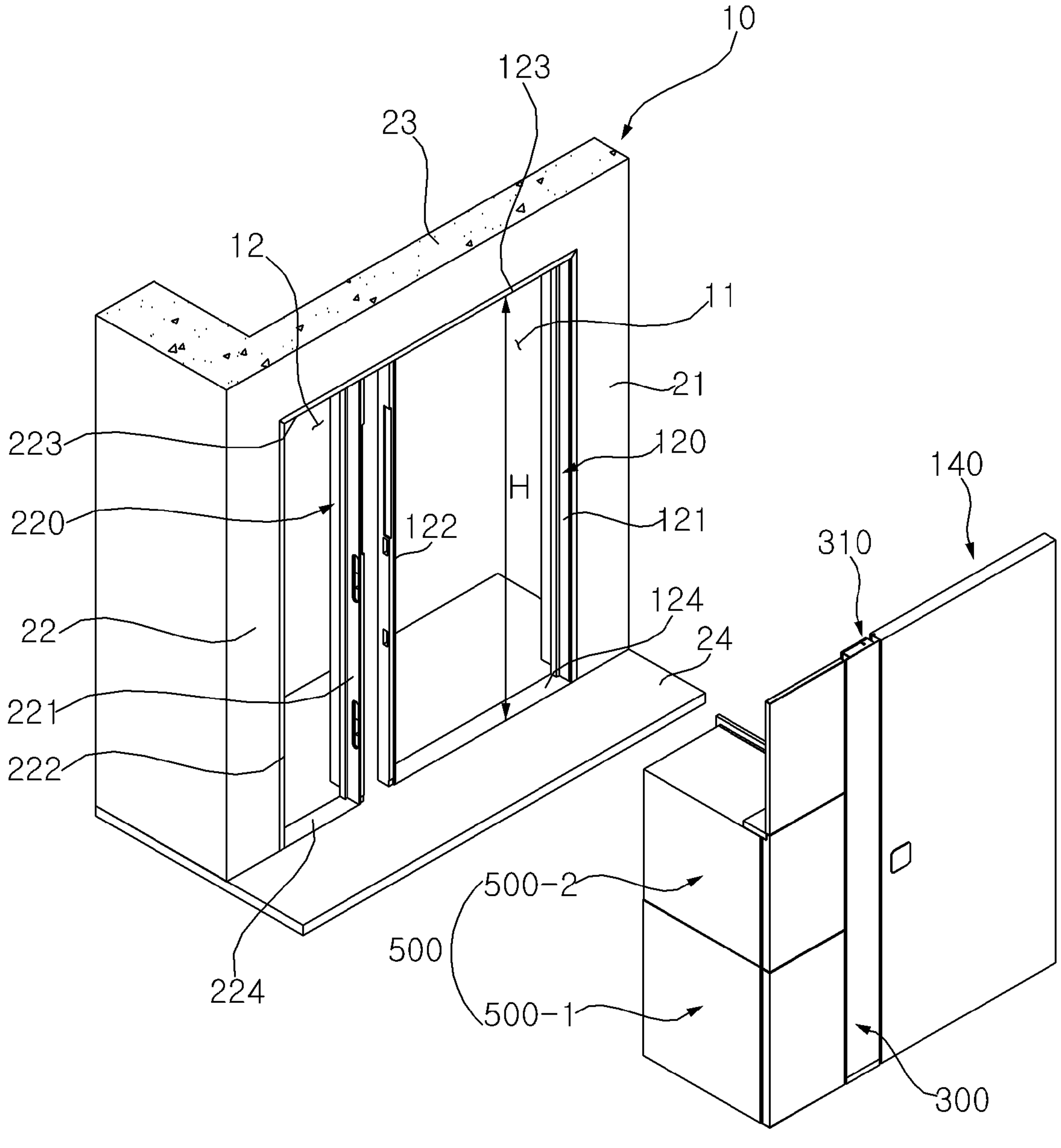
FIG. 4A is a partially exploded perspective view seen from the other side of FIG. 3A.
Figure 4B:
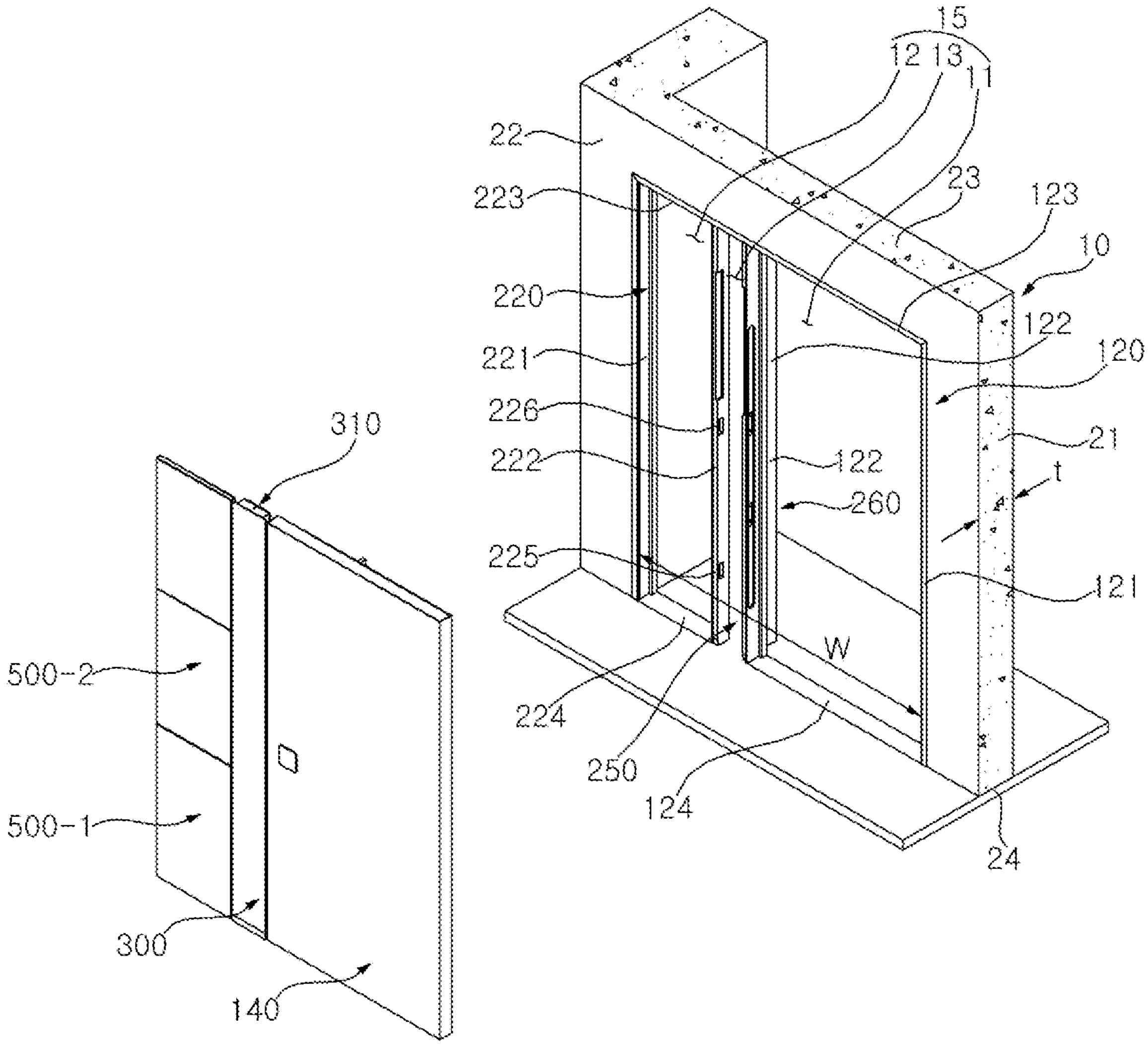
FIG. 4B is a partially exploded perspective view that includes the structure.
Figure 4C:
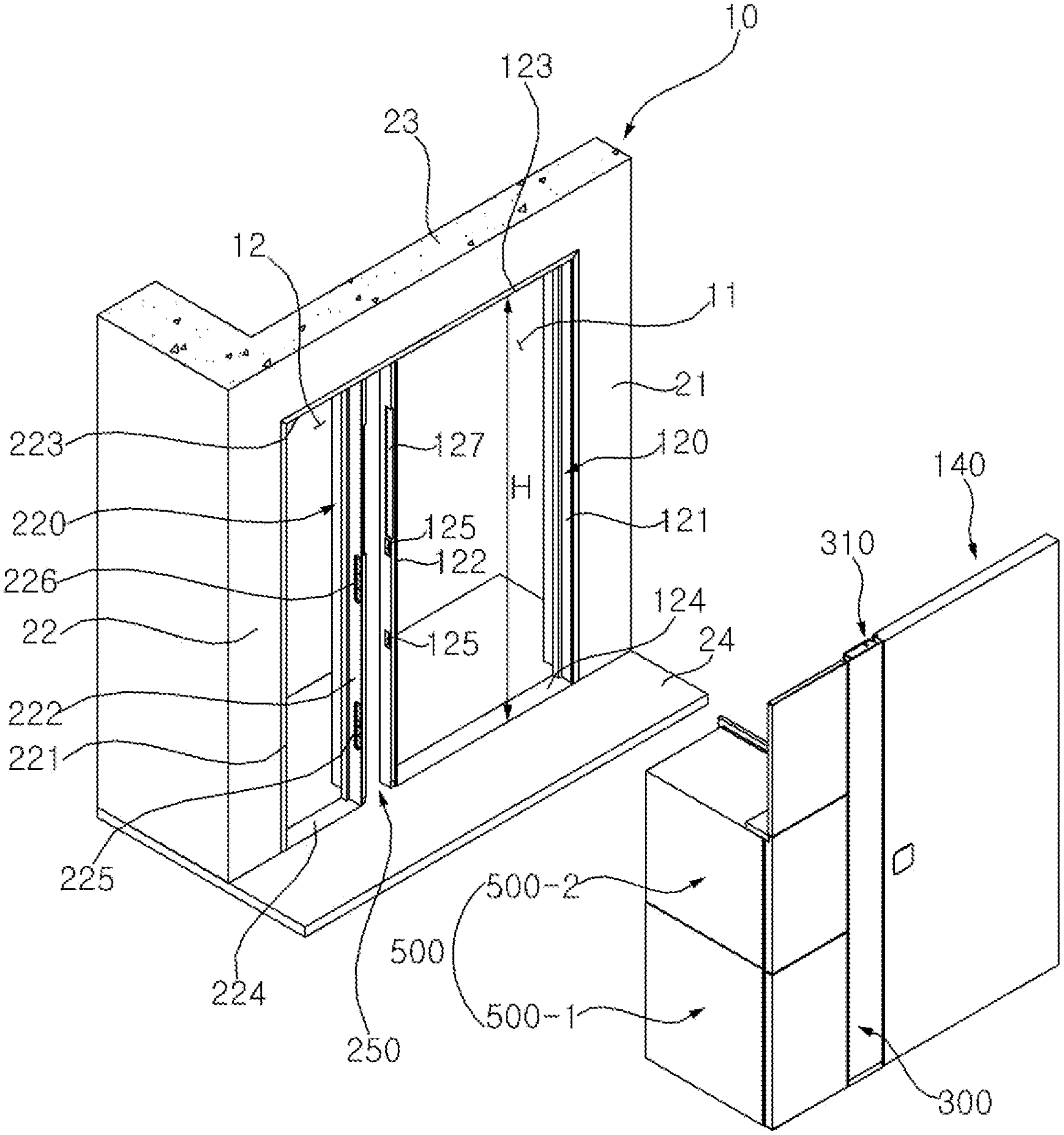
FIG. 4C is a partially exploded perspective view seen from the other side of FIG. 4B.
Figure 5:
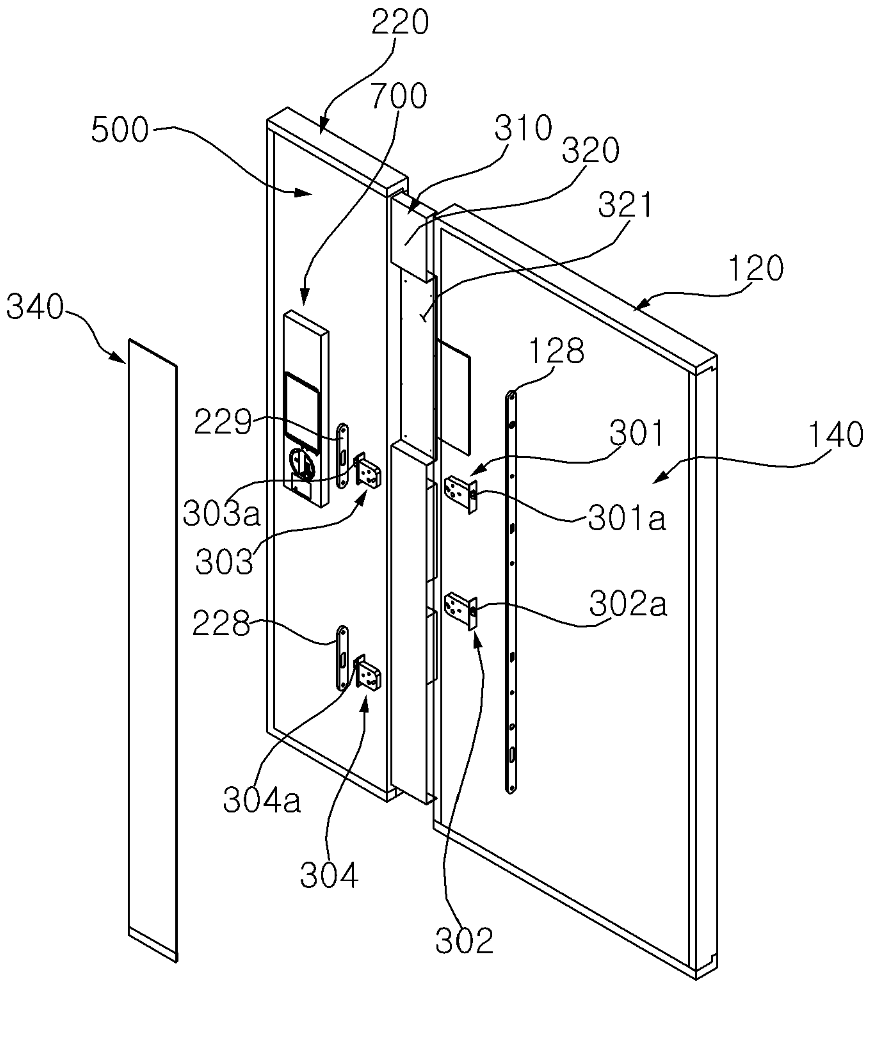
FIG. 5 is an exploded perspective view illustrating the security assembly of FIG. 1 disassembled.
Figure 15A:
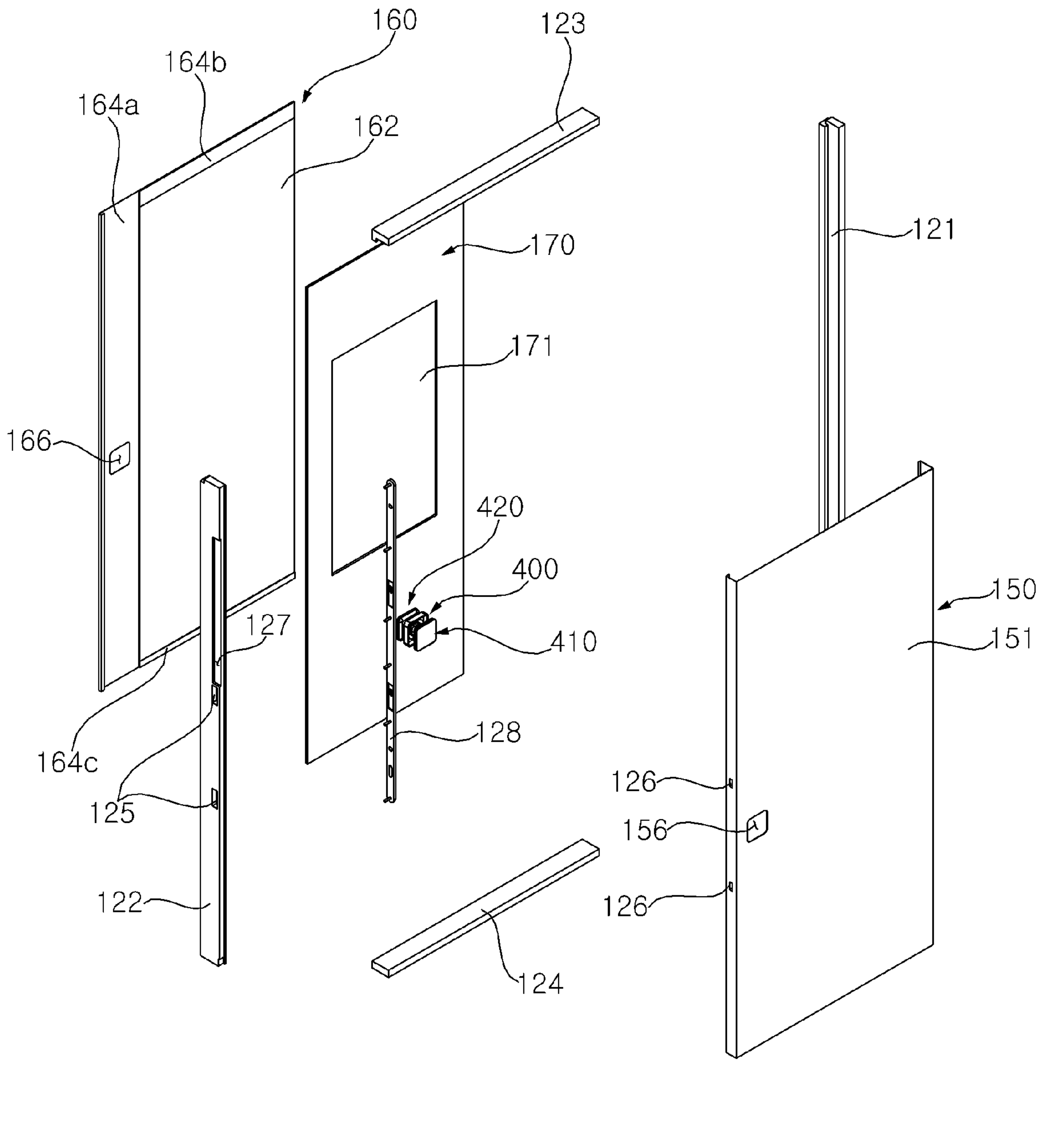
FIG. 15A is an exploded perspective view of the other side of FIG. 14.
Figure 15B:
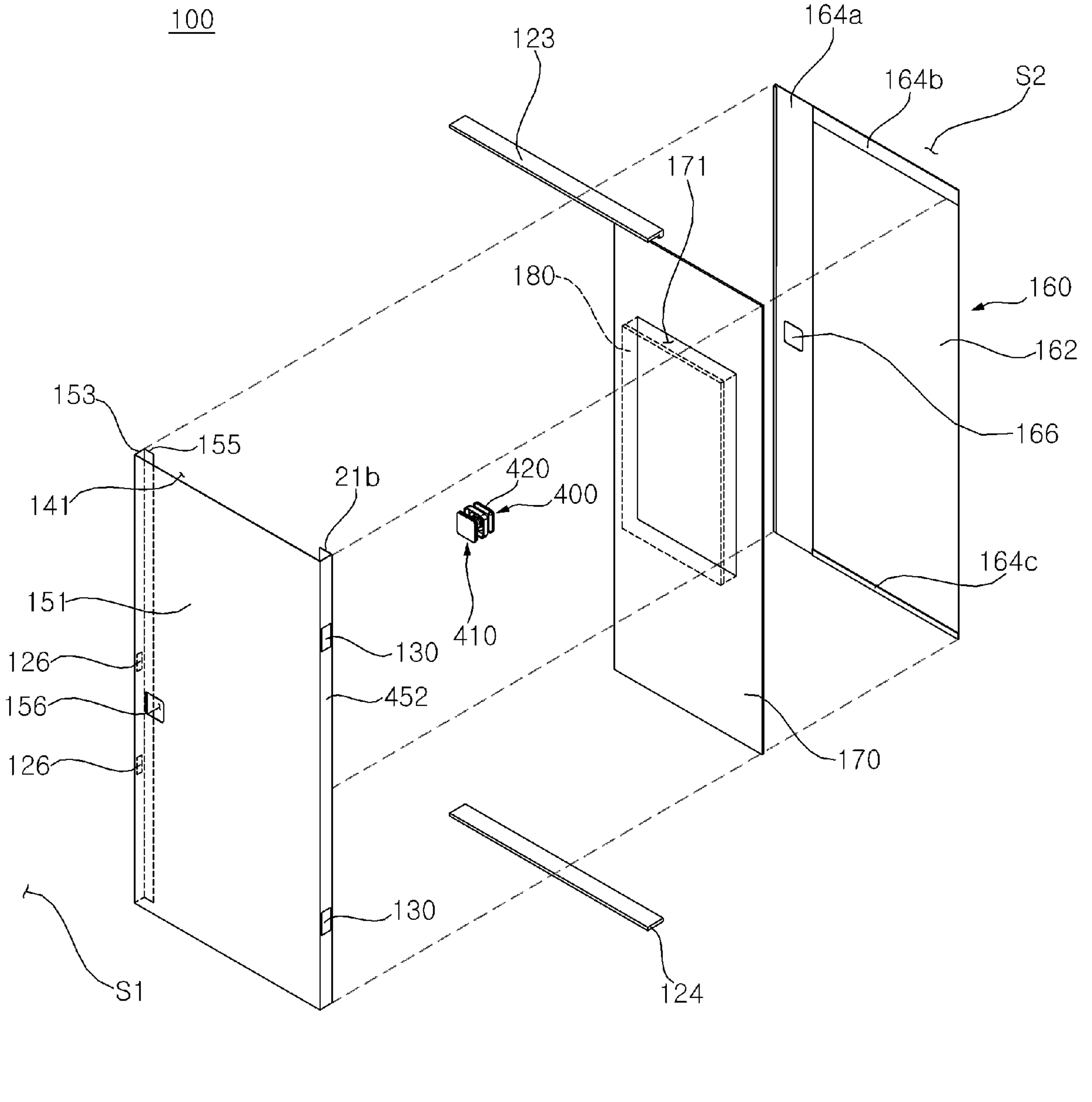
FIG. 15B is an exploded perspective view of the access door showing a rear handle.

Referring to FIGS. 3A-4, the entrance door assembly 100 may include a door frame 120 installed on the structure 10 at or adjacent to a right rim or edge of the front wall 22 to surround the access door 140. The access door 140 may be hinged to the door frame 120 to open and close the first opening 11. The door frame 120 may include a first door frame or right panel 121 provided at a right side of the doorway 15 and contacting the front wall 22 and/or the structure 10 at a position between the front and rear walls 22 and 21, and a second door frame or left panel 122 provided at a left side of the first opening 11 and configured to contact the security assembly 300. The door frame 120 may further include a third door frame or top panel 123 provided at a top of the doorway is 15 under the ceiling 23 and an optional fourth door frame or lower panel 124 provided on top of the floor 24. The first, second, third, and fourth door frames 121, 122, 123, and 124 may be perpendicular to each other, and may alternatively be referred to as beams. The first and second door frames 121 and 122 may be bent to receive edges of the access door 140 (FIGS. 15A-15B).

The door frame 120 may be formed of a steel material for security, but embodiments disclosed herein are not limited. The first door frame 121, the second door frame 122, the third door frame 123, and the fourth door frame 124 may occupy an edge of the first opening 11, and the access door 140 may occupy the rest of the first opening 11. More details on the door frame 120 will be described with reference to FIGS. 12-15.

Figure 16:
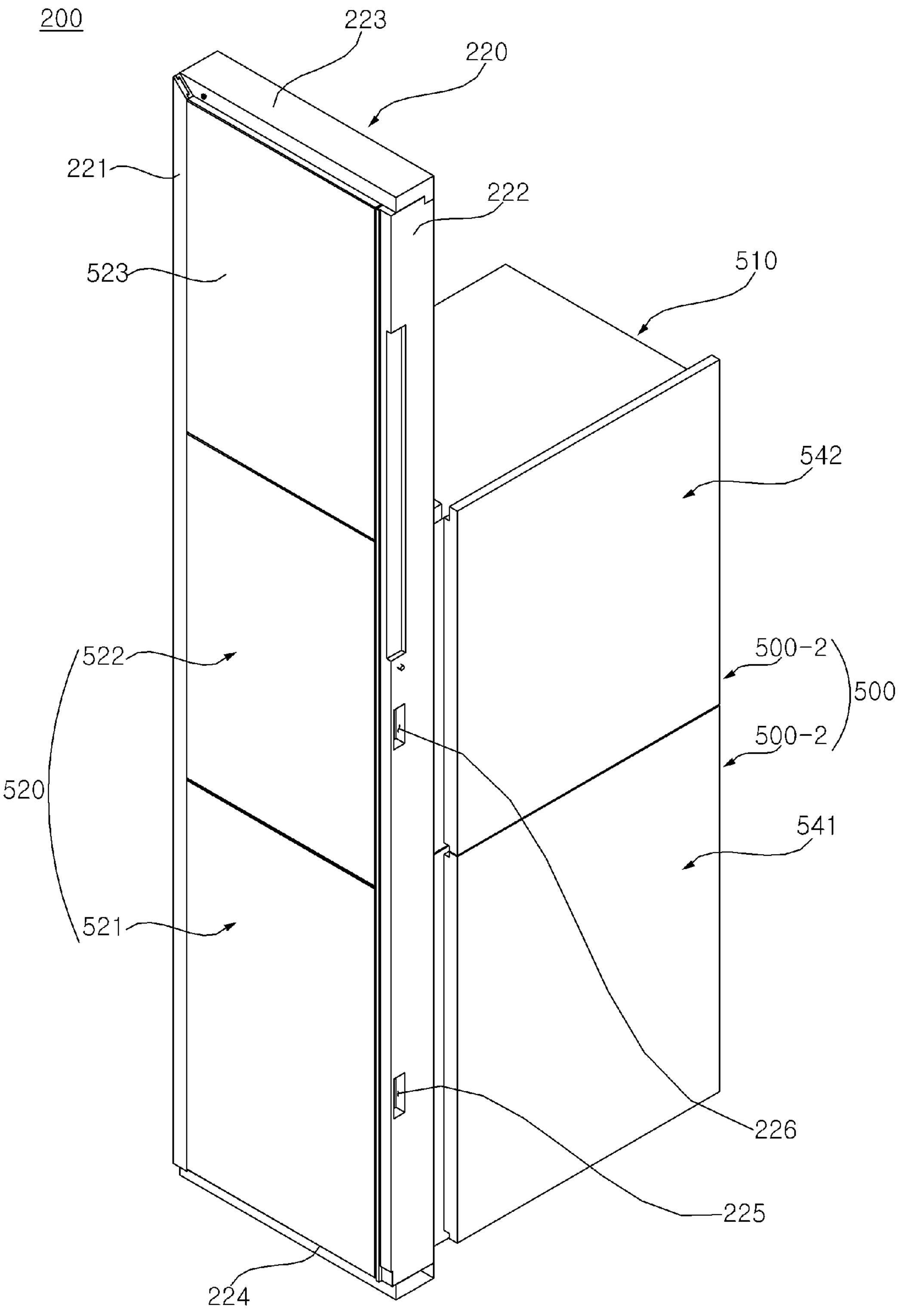
FIG. 16 is a perspective view of the storage assembly shown in FIG. 12.

The storage assembly 200 may include a storage frame 220 installed on the structure 10 at or adjacent to a left rim or edge of the front wall 22 to surround the storage container 500. The containers 500-1 and 500-2 may be secured within the storage frame 220, and a first (i.e., front) container door 520 may be hinged to each container 500 to open and close the second opening 12 (FIG. 16). The storage frame 220 may include a first storage frame or left panel 221 provided at a left side of the second opening 12 and configured to contact the front wall 22 and/or the structure 10 at a position between the front and rear walls 22 and 21, and a second storage frame or right panel 222 provided at a right side of the second doorway 15 and contacting the security assembly 300. The storage frame 220 may further include a third storage frame or top panel 223 provided at a top of the doorway 15 is the ceiling 23 and a fourth storage frame or lower panel 224 provided on top of the floor 24. The first, second, third, and fourth storage frames 221, 222, 223, and 224 may be perpendicular to each other, and may alternatively be referred to as beams.

The third storage frame 223 and the third door frame 123 may be formed as one upper frame or panel, or alternatively may be formed separately and later combined. As another alternative, there may be an upper panel or security frame 333 provided at a top of the doorway 15 and between the third door and storage frames 123 and 223 under the ceiling 23 to support a top of the security assembly 300. The third storage frame 223, security frame 333, and third door frame 123 may be formed as one upper frame or panel, or alternatively may be formed separately and later combined. The second box and door frames 222 and 122 may be formed integrally with sides of the security assembly 300 and/or formed separately and later optionally combined (e.g., welded or bonded) with the security assembly 300.

The storage frame 220 may be formed of a steel material for security, but embodiments disclosed herein are not limited. The first storage frame 221, the second storage frame 222, the third storage frame 223, and the fourth storage frame 224 may occupy an edge of the second opening 12, and the containers 500-1 and 500-2 may occupy the rest of the second opening 12. More details on the storage frame 220 will be described with reference to FIGS. 12-15.

The security assembly 300 may have a security panel or box 310 provided between the door frame 120 and the storage frame 220. The security panel 310 may be fixed to the structure 10 and/or coupled to the door frame 120 and the storage frame 220 so as to selectively lock and unlock the entrance door assembly 100 and the storage assembly 200. The security assembly 300 may cover the third opening 13. As previously described, an upper panel or security frame 333 may be provided at the top of the doorway 15 to support a top of the security assembly 300. The upper panel 333 may be coupled to the third box and door frames 223 and 123 to form a single upper panel or frame provided at a top of the doorway 15.

Referring specifically to FIGS. 3C-3E, an optional front or outer trim 800 may be provided to surround the entire doorway 15. The front trim 800 may be provided in front of the first door and storage frames 121 and 221, the third door and storage frames 123 and 223, and the fourth door and storage frames 124 and 224 so as to be in contact with the structure 10 and form a front edge of the doorway 15 that covers, from a front, the first, third, and fourth door frames 121, 123, and 124 and the first, third, and fourth storage frames 221, 223, and 224. The front trim 800 may also cover the upper frame 333. The front trim 800 may alternatively be referred to as a front seal or frame.

Alternatively, the front trim 800 may be an inner frame provided within the first door and storage frames 121 and 221, under the first door and storage frames 121 and 221, and on top of the fourth door and storage frames 124 and 224 so not to leave the front, the first, third, and fourth door frames 121, 123, and 124 and the first, third, and fourth storage frames 221, 223, and 224 exposed in the doorway 15.

The front trim 800 may be made of a material having low thermal conductivity and a low thermal expansion coefficient (e.g., a ceramic material or a steel material having a high melting point). The front trim 800 may block or reduce an amount of heat transmitted to the door frame 120 and the storage frame 220 and serve as a seal to reduce or prevent heat from the first space S2 from entering the second space S2, improving the durability of the smart entryway and structure 10 in the event of fire.

The front trim 800 may include a first or right front trim or seal 810 contacting a right side of the structure 10 to cover the first door frame 121, a second or left front trim or seal 820 contacting a left side of the structure 10 to cover the first storage frame 122, and a third or upper trim or seal 830 contacting a bottom of the structure 10 under the ceiling 23 and covering the third door and storage frames 123 and 223. The first front trim 810 may be provided in front of the first door frame 121 and may be fixed to the first door frame 121 and/or a right inner side of the front and/or rear walls 21 and/or 22. The second front trim 820 may be provided in front of the first storage frame 221 and may be fixed to the second storage frame 221 and/or a left inner side of the front and/or rear walls 11 and/or 12. The third front trim 830 may be provided in front of and coupled to the third door frame 123 and the third storage frame 223.

Heights of the first front trim 810 and the second front trim 820 may be the same as the height h of the doorway 15. The first front trim 810 and the second front trim 820 may be parallel to each other.

The front trim 800 may include a first or outer front trim 800A and a second or inner front trim 800B provided behind the first front trim 800A and in front of the storage and door frames 220 and 120. The first front trim 800A may face the first space S1.

The first front trim 810 may include a first outer frame or trim 811 and a first inner frame or trim 812. The first outer trim 811 may be exposed to the first space S1, and the first inner trim 812 may be fixed to the first door frame 121. The first outer trim 811 may be coupled (e.g., pressed-fitted) to the first inner trim 812.

The second front trim 820 may include a second outer frame or trim 821 and a second inner frame or trim 822. The second outer trim 821 may be exposed to the first space S1, and the second inner trim 822 may be fixed to the first storage frame 121. The second outer trim 821 may be coupled (e.g., pressed-fitted) to the second inner trim 822.

The third front trim 830 may include a third outer frame or trim 831 and a third inner frame or trim 832. The third outer trim 831 may be exposed to the first space S1, and the third inner trim 832 may be fixed to at least one of the third door frame 123 or the third storage frame 121. The third outer trim 831 may be coupled (e.g., pressed-fitted) to the third inner trim 832.

A space or gap 835 (FIG. 3D) may be formed between the third door frame 123 and the third storage frame 223, and the upper panel 333 (FIG. 3C) may be provided in the space 835 to connect the third door frame 123 or the third storage frame 221. A front-rear thickness of the upper panel 333 may be less than front-rear thicknesses of the third door and storage frames 123 and 223. An insertion block or rib 840 may be provided to protrude from a rear of the third inner trim 832, and the insertion block 840 may be inserted into the space 835 to be in front of the upper panel 333 and between the third door and storage frames 123 and 223. The insertion block 840 may support the third door frame 123 and/or the third storage frame 223 and be provided at a same height as the third door frame 123 and the third storage frame 221.

The first front trim 800A may be pressed-fitted with the second front trim 800B. Rears of the first, second, and third outer frames 811, 821, 831 may be pressed-fitted to fronts of the first, second, and third inner frames 812, 822, 832, respectively. Fronts of the first, second, and third outer frames 811, 821, and 831 may be exposed to the first space S1.

Referring to FIGS. 3E and 3F, a rear of the first front trim 800A may be formed with a coupling protrusion 814, and a front of the second front trim 800B may be formed with a coupling recess or groove 824 in which the coupling protrusion 814 may be inserted. An outer contour of the coupling protrusion 814 may correspond to an inner contour of the coupling groove 824 such that the first front trim 800A may be snap fitted to the second front trim 800B. The coupling protrusion 814 may have a hook or wedge shape. The coupling groove 824 may have a shape configured to mutually engage with the coupling protrusion 814 in the front-rear direction.

In addition, a fastening member 850 (e.g., a bolt or screw) may protrude from a rear of the coupling protrusion 824 and be inserted through a hole or opening formed through the coupling groove 824 for added security. The fastening member 850 may not be visible from the first space S1.

The first, second, and third outer frames 811, 821, 831 may be formed with a continuous coupling protrusion 814 which may be configured to be pressed-fit into a continuous coupling groove 824 formed in the first, second, and third inner frames 812, 822, 832. Alternatively, each of the first, second, and third outer frames 811, 821, 831 may include at least one coupling protrusion 814, which may be formed to be inserted into at least one coupling groove 824 formed in each of the first, second, and third inner frames 812, 822, 832. In such an embodiment, positions of the coupling protrusions 814 may correspond to positions of the coupling grooves 824.

Referring to FIGS. 3G-3H and 4B-4C, an assembly structure or support 250 may be provided in the third opening 13. The access gate 100 may be provided at a first (e.g., left) side of the assembly structure 250, and the storage assembly 200 may be provided at a second (e.g., right) side of the assembly structure 250. The assembly structure 250 may include a rigid panel (e.g., an H-beam or I-beam) made of steel and may be selectively installed in the doorway 15 of the structure 10. An upper end 251 of the assembly structure 250 may be coupled to or embedded in the ceiling 23, and the lower end 252 may be coupled to or embedded in the base or floor 24.

The first opening 11 may be provided at the right side of the assembly structure 250 (in FIGS. 3G and 4B) and the second opening 12 may be provided on the left side of the assembly structure 250. The assembly structure 250 may occupy a portion of the third opening 13, and the security assembly 300 may be provided in front of the assembly structure 250. A thickness of the assembly structure 250 and the security assembly 300 in the front-rear direction may be equal to or less than the thickness t of the opening 15.

The assembly structure 250 may prevent intrusion into the third opening 13 and improve security of the smart entryway. Since the assembly structure 250 may be coupled to the door frame 120 and the storage frame 220, the door frame 120, the assembly structure 250, and the box frame 220 may be integrated.

The assembly structure 250 may be exposed to the second space A2, and a structure cover 260 may be provided to surround the assembly structure 250. The structure cover 260 may cover front, rear, left, and right sides of the assembly structure 250. Alternatively, the structure cover 260 may not cover the front side of the assembly structure 250 and instead cover left, right, and rear of the assembly structure 250.

Referring to FIGS. 5-11, the security assembly 300 may include an authentication device 700 provided to a front of the security panel 310 and a locking device provided at a rear of the security panel 310 to selectively lock or unlock any one of the entrance door assembly 100 or the storage assembly 200.

The locking device may include first and second door locks 301 and 302 to selectively lock or unlock the access door 140 and first and second container or storage locks 303 and 304 to selectively lock or unlock the front container door 520 of the storage container 500. The security panel 310 may prevent outsiders from assessing the authentication device 700 and the locking device and include a metal material with high strength (e.g., a steel material). Although two door locks 301 and 302 and two storage locks 303 and 304 are shown, embodiments disclosed herein are not limited in a number of locks.

A right side of the security panel 310 may be fixed to the door frame 120 of the entrance door assembly 100 and a left side of the security panel 310 may be fixed to the storage frame 220 of the storage assembly 200. The security panel 310 and the door frame 120 may be welded or riveted so as to reduce or prevent dismantling, but embodiments disclosed herein are not limited. When the security panel 310 and the door frame 120 are fastened to each other via a fastening member, the fastening member may not be exposed to the first space S1 of the doorway 15 so as to prevent tampering. Similarly, the security panel 310 and the storage frame 220 may be welded or riveted, and if the security panel 310 is coupled to the storage frame 220 via a fastening member, the fastening member may not be exposed to the first space S1.

The first and second door locks 301 and 302 and the first and second container door locks 303 and 304 may be provided inside the security panel 310 without being exposed to the first space S1. The first and second door locks 301 and 302 and the first and second container door locks 303 and 304 may not be accessed without accessing the security panel 310.

The authentication device 700 may be provided on a front side of the security panel 310 so as to be accessed from the first space S1. The authentication device 700 may check whether a user is authorized to enter through the access door 140 or to open one of the containers 500-1 and/or 500-2 of the storage assembly 200.

The authentication device 700 may selectively unlock and lock the entrance door assembly 100 by operating the first and second door locks 301 and 302 after determining that a primary user is authorized. The authentication device 700 may selectively unlock and lock the storage container 500 by operating the first and second storage locks 303 and 304. Even if a secondary user is not authorized to enter the access door 140, the secondary user may be authorized to open the storage container 500. The storage container 500 (or at least one of the containers 500-1 or 500-2 of the storage container 500) may be unlocked by entering an authenticated code, scanning a bar code, etc. into the authentication device 700, and the storage container 500 may be automatically locked a predetermined time after being unlocked. Embodiments disclosed herein are not limited to authentication codes; for example, the authentication device 700 may include a camera, fingerprint scanner, or other user input. More details on the authentication device 700 will be described with reference to FIG. 23.

As an example, a predetermined authentication code (barcode, QR code, passcode, etc.) may be required for delivery of goods. The authentication device 700 may have an input device in which an authentication code may be entered (scanner, camera, number pad, keyboard, etc.), and the storage container 500 may be unlocked when the entered authentication code matches the predetermined authentication code. More details on the authentication device 700 will be described with reference to FIG. 23.

A cover 340 may be provided to cover the authentication device 700 and the security panel 310. At least a portion of the cover 340 that aligns with the authentication device 700 may be transparent or translucent such that light may be transmitted therethrough so that the cover 340 may remain on the security panel 310 during authorization by the authentication device 700. As an example, the cover 340 include tempered glass, laminated glass, or plastic. The cover 340 may be a plate or frame, but embodiments are not limited.

Figure 7A:
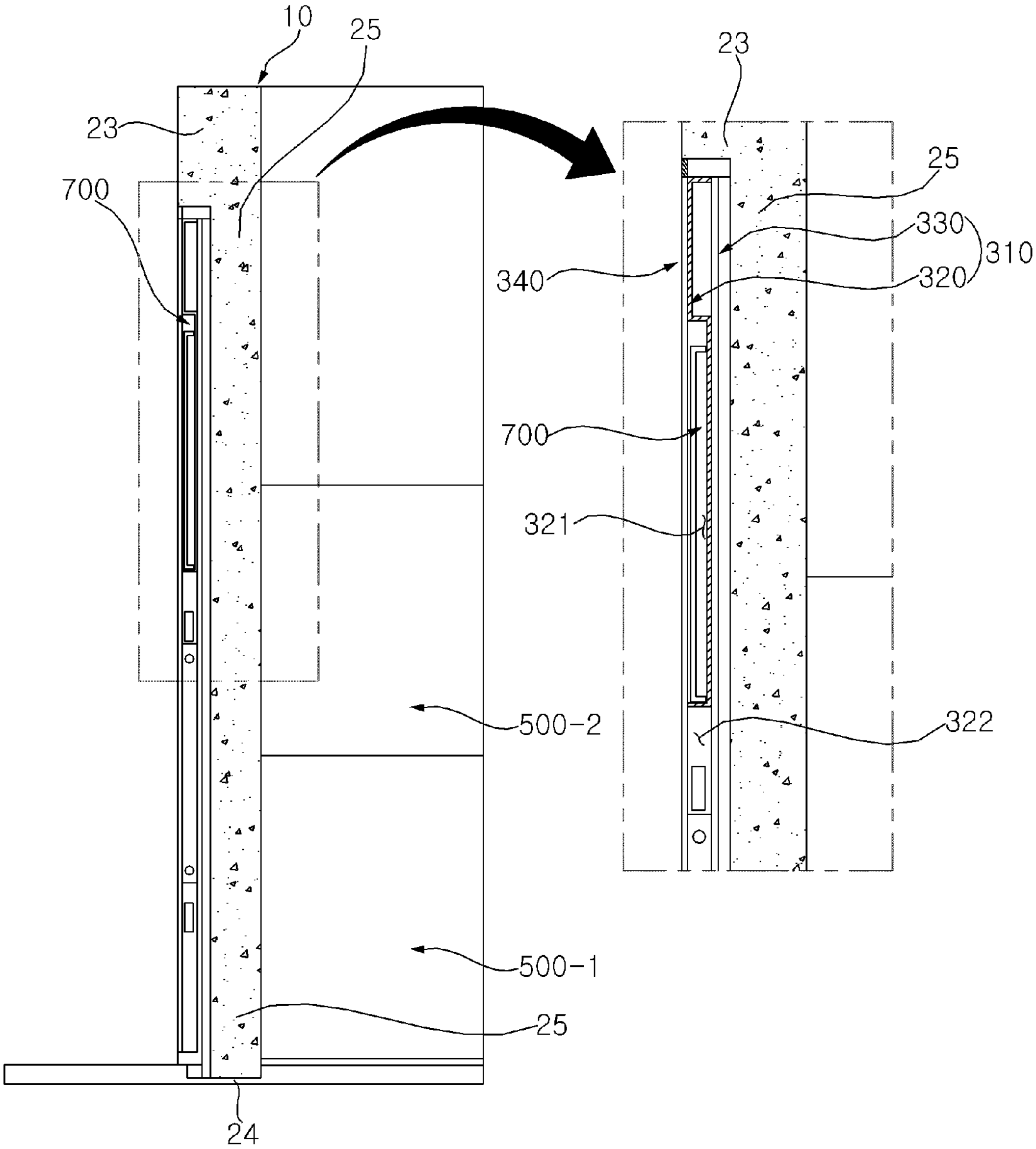
FIG. 7A is a side cross-sectional view of the security assembly of FIG. 6.

As shown in FIG. 7A, the security panel 310 may include a first or front panel or plate 320 facing the first space S1 and a second or rear panel or plate 330 facing the second space S2. The first plate 320 and the second plate 330 may align in the front-rear direction. Alternatively, the first plate 320 and the second plate 330 may align in different directions (e.g., a left-right direction or a vertical direction) depending on a space or structure 10 where the smart entryway is to be installed.

The first and second door locks 301 and 302 and the first and second container door locks 303 and 304 may be provided between the first plate 320 and the second plate 330 so as to be inside of the security panel 310 and concealed from the first space S1. The first plate 320 may be formed integrally with the second plate 330. Alternatively, the first and second plates 320 and 330 may be formed separately and later fixed (e.g., welded).

A front of the first plate 320 may include a first installation section or recess 321 in which the authentication apparatus 700 is provided. The first installation recess 321 may be recessed backward or formed to be concave from the first space S1. A rear of the first plate 320, which may face an inside of the security panel 310, may be formed with a second installation section or recess 322 on which a door lock or storage lock 301-304 may be provided. The second installation recess 322 may be recessed forward or formed to be concave from the inside of the security panel 310. There may be a plurality of second installation recesses 322 to receive a plurality of door and storage locks 301-304, respectively.

The second installation recess 322 may be provided below the first installation recess 321, and at least a portion of the first installation recess 321 may be directly above at least a portion of the second installation recess 322 such that the first and second installation recesses 321 and 322 at least partially vertically align to reduce or minimize a front-rear thickness of the security panel 310.

Since the first installation recess 321 may be opened toward the first space S1, the cover 340 may cover the first installation recess 321. Since the second installation recess 322 may be opened toward the second space S2, the second plate 330 may cover the second installation recess 322.

At least one of a left side or a right side of the first installation recess 321 may be opened, and the authentication device 700 may be replaced or repaired through the open side. At least one of a left side or a right side of the second installation recess 322 may be opened, and the first or second door lock 301 or 302 and/or or the first or second container door lock 303 or 304 may be replaced or repaired through the open side.

The first installation recess 321 may be recessed or bent to the rear from a front surface 320*a* of the first security plate 320. The first plate 320 may be manufactured by bending a plate to form the first installation recess 321 and the second installation recess 322. Alternatively, the first plate 320 may be manufactured through casting, welding, injection molding, or press working, and the first installation recess 321 may be formed in a groove shape. The second installation recess 322 may also be manufactured in the same or a similar manner as the first installation recess 321. As another alternative, the first and second installation recesses 321 and 322 may be formed by attaching thicker plates or blocks onto the front and rear of the first plate 320 to form the first and second installation recesses 321 and 322 between blocks, but such an embodiment may be thicker.

The first and second door locks 301 and 302 and the first and second container door locks 303 and 304 may be installed in the second installation recess 322. The first and second door locks 301 and 302 and the first and second container door locks 303 and 304 may be provided on a rear surface 320*b* of the first plate 320 to be provided between the first plate 320 and the second plate 330. The door locks 301 and 302 and the container door locks 303 and 304 may be concealed from the first space S1 by the first plate 320 and concealed from the second space S2 by the second plate 330.

A plurality of supports or ledges 311, 312, 313, 314 (FIG. 9) to support the first and second door locks 301 and 302 and the first and second box locks 303 and 304 may be provided on the rear surface 320*b* of the first panel 320 in the second installation recess 322. The supports 311, 312, 313, and 314 may be formed by cutting and bending side portions of the first plate 320, or alternatively may be formed separately and later fixed to the first plate 320. The supports 311, 312, 313, and 314 may be L-shaped, but embodiments disclosed herein are not limited. The supports 311, 312, 313, and 314 will be described in more detail with reference to FIGS. 9 and 11.

Figure 7B:
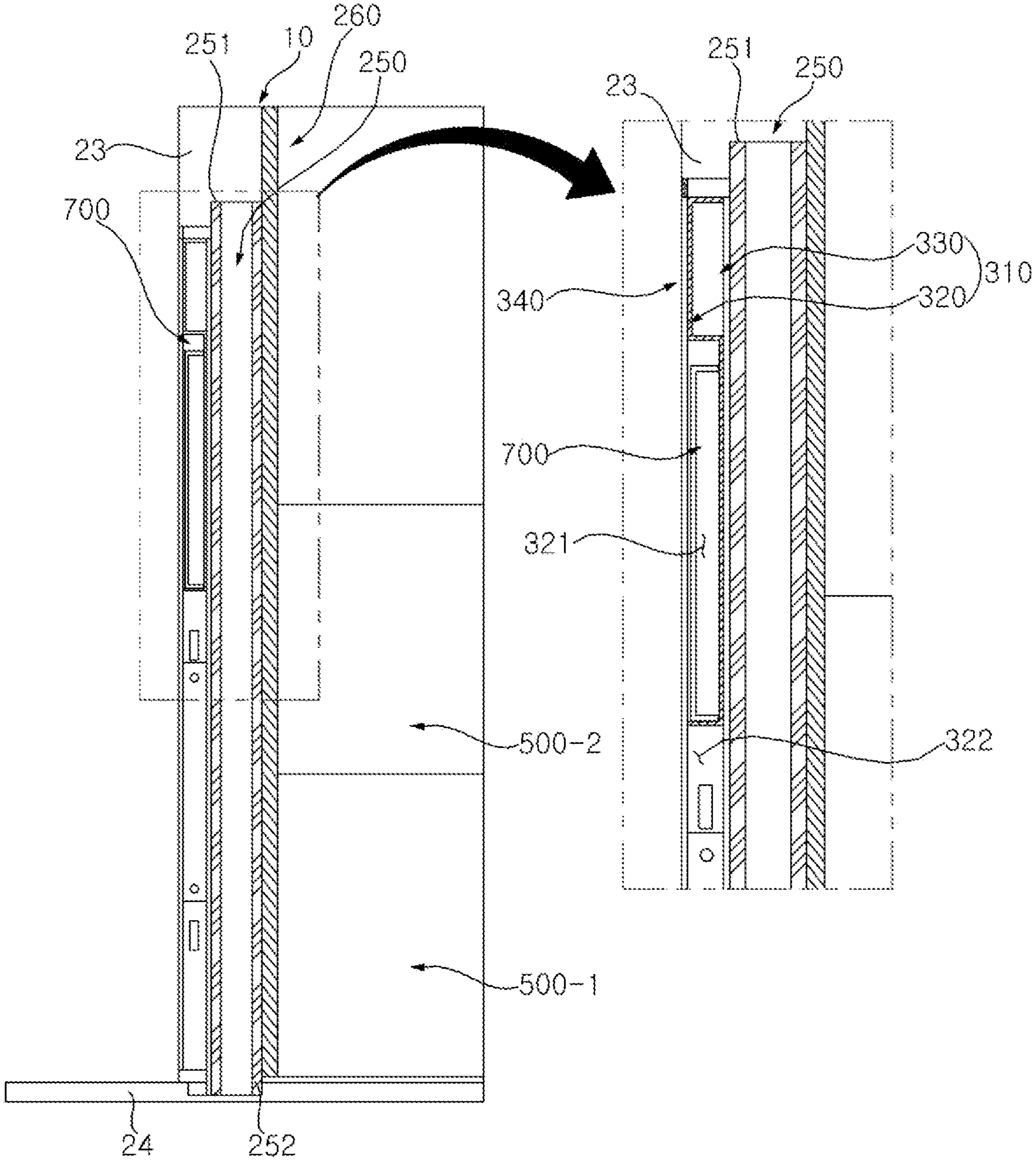
FIG. 7B is a side cross-sectional view of the security assembly when the structure of FIGS. 3G through 3H is included.
Figure 7C:
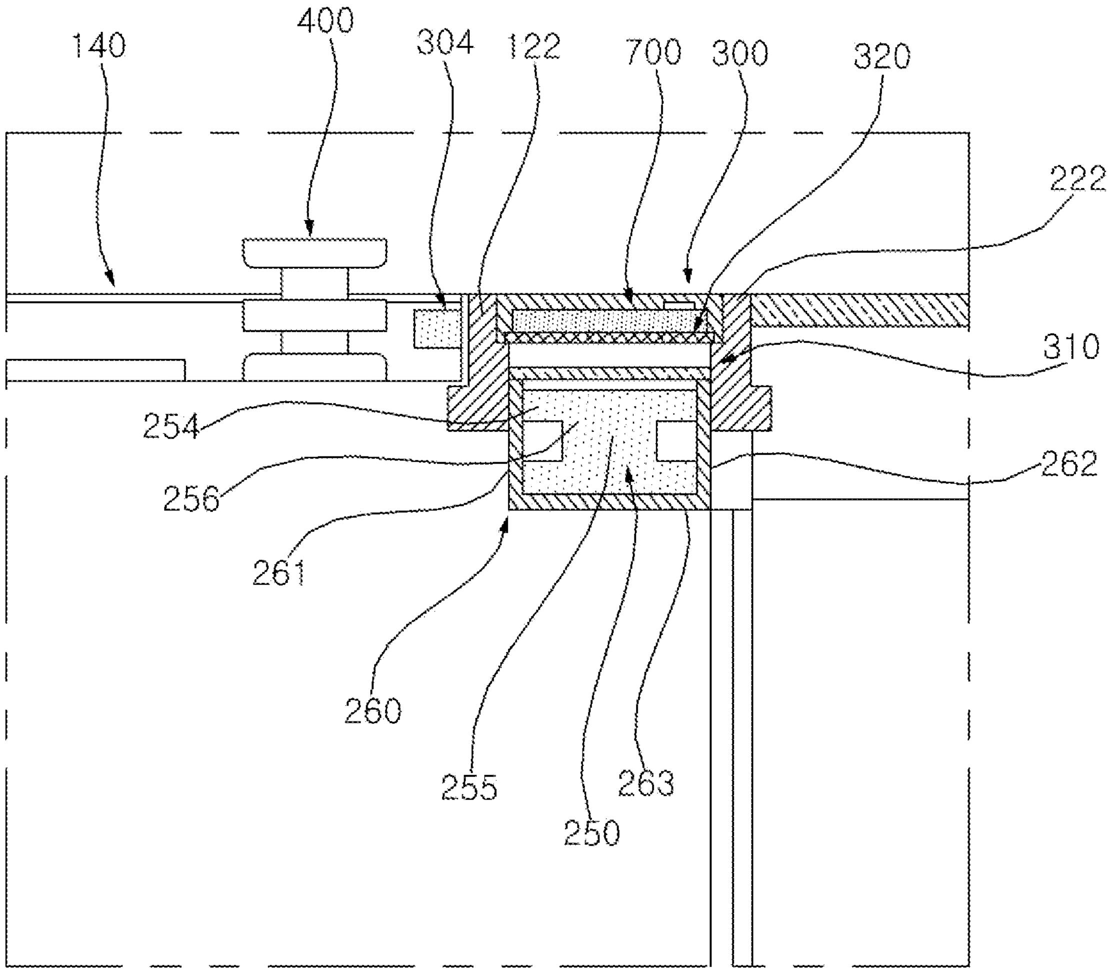
FIG. 7C is a top cross-sectional view of the security assembly when the structure of FIGS. 3G through 3H is included.
Figure 8:
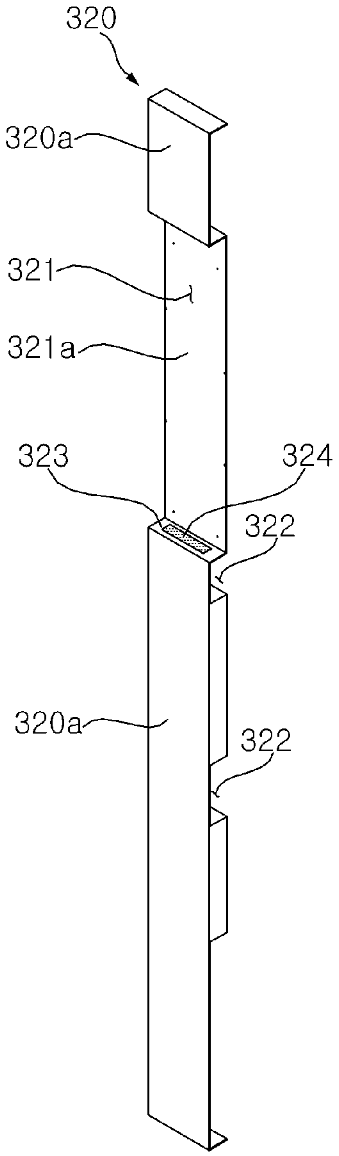
FIG. 8 is a perspective view of a first security panel shown in FIG. 6.

Referring to FIGS. 7B-7C, the security assembly 300 may be fixed to the assembly structure 250 provided at the rear. By fixing the security assembly 300 to the assembly structure 250 to integrate the security assembly 300 and assembly structure 250 together, external intrusion may be blocked. For example, even if the security assembly 300 is separated or loosened, the security assembly 300 may be blocked by the assembly structure 250 so that visitors may not break in or invade.

The assembly structure 250 may be provided behind the second plate 330. The second plate 330 and the assembly structure 250 may be coupled (e.g., through welding or rivet joints). The second door frame 122 may be provided at and coupled to a right side (in FIG. 4B) of the assembly structure 250, and the second storage frame 222 may be provided at and coupled to a left side (in FIG. 4B) of the assembly structure 250. At least a portion of the assembly structure 250 may be provided between the second door frame 122 and the second storage frame 222.

The assembly structure 250 may include a first or front portion 254, which may be closer to the first space S1 than the second space S2, a second or rear portion 255, which may be closer to the second space S2 than the first space S1, and a third or connecting portion 256 connecting the first portion 254 and the second portion 255.

The first portion 254 may face and be coupled to the second plate 330. The first portion 254 may be provided between the second door frame 122 and the second storage frame 222. The second portion 255 may be provided behind the second door frame 122 and the second storage frame 222. The first portion 254 may be provided behind the security assembly 300 and concealed by the security panel 310 and the first plate 320.

The structure cover 260 may include a first cover portion or plate 261 covering a first side (e.g., left side in FIG. 7C) of the assembly structure 250, a second cover portion or plate 262 covering a second side (e.g., right side in FIG. 7C) of the assembly structure 250, and a third cover portion or plate 263 connecting the first cover plate 261 and the second cover plate 262 to cover the rear side of the assembly structure 250. There may be an optional fourth cover portion or plate connecting the first and second cover plates 261 and 262 to cover the front side of the assembly structure 250.

The structure cover 260 may be formed of a steel material to improve fire protection and crime prevention. The structure cover 260 may be exposed to the second space S2. A part or end of the first cover plate 261 and the third cover plate 263 may be exposed to the second space 102.

The first cover plate 261 and the second cover plate 262 may face each other. A front surface of the structure cover 260 may be open, and the assembly structure 250 may be inserted through the open front surface.

The first cover plate 261 may be fixed (e.g., fastened or welded) to the second door frame 122, and the second cover plate 262 may be fixed (e.g., fastened or welded) to the second storage frame 222. The upper end 251 of the assembly structure 250 may be buried in the ceiling or top of the doorway 23 and protrude upward past upper ends of the first and second plates 320 and 330 of the security panel 310. The lower end 252 of the assembly structure 250 may be buried in the floor or base 24 and protrude downward past lower ends of the first and second plates 320 and 330 of the security panel 310.

Figure 9:
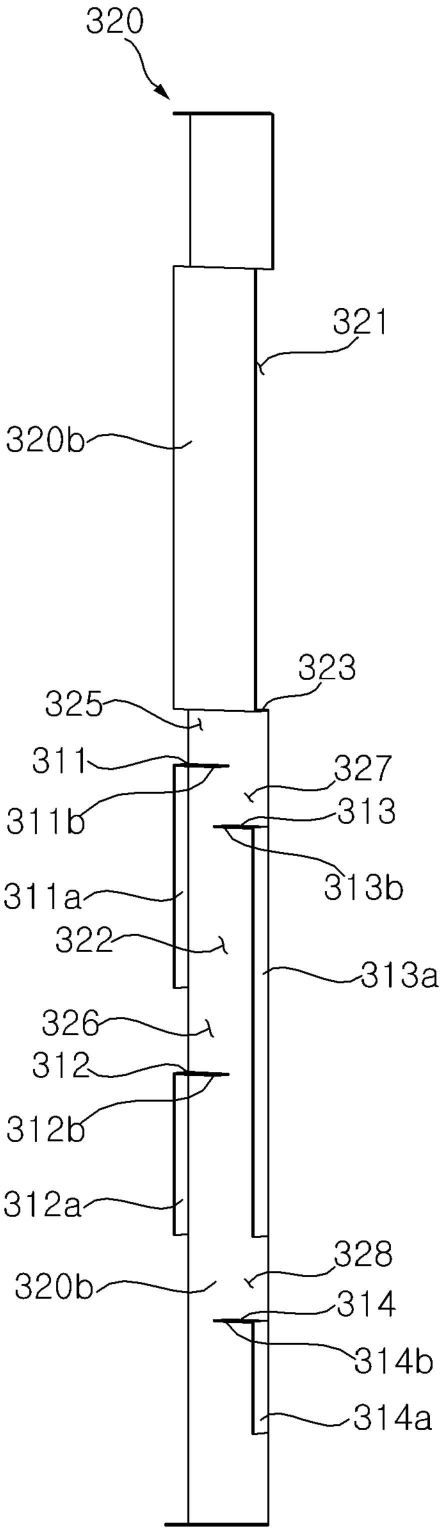
FIG. 9 is a rear perspective view of the first security panel of FIG. 8.
Figure 10:
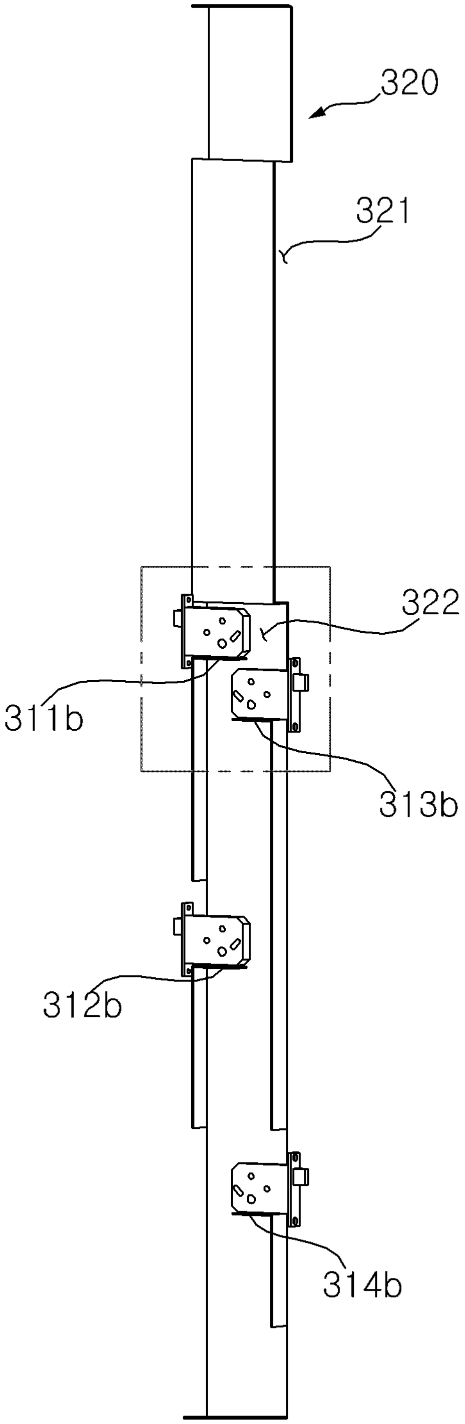
FIG. 10 is a perspective view of a locking device installed in the first security panel of FIG. 8.
Figure 11:
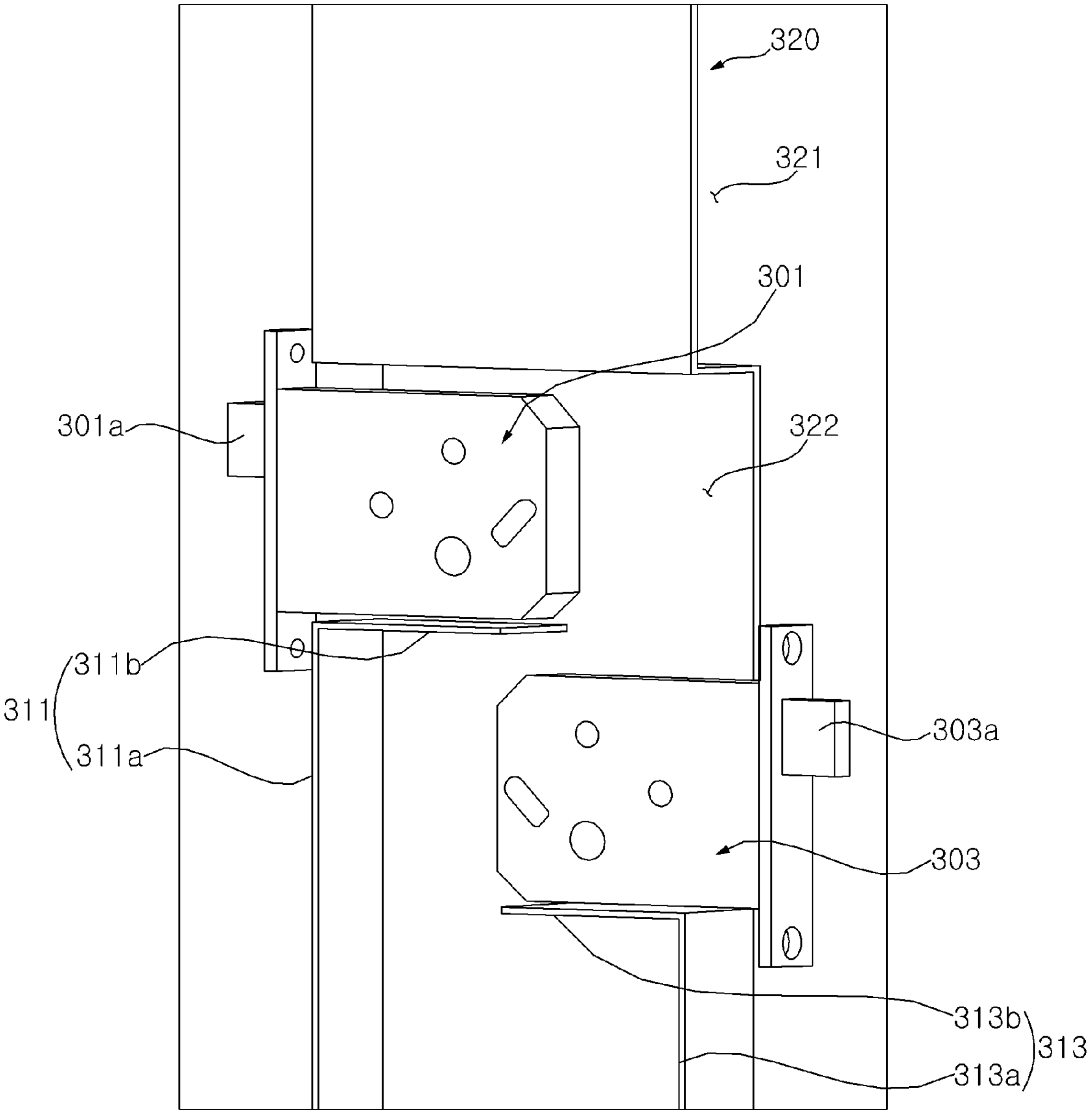
FIG. 11 is an enlarged view of a portion of FIG. 10.
Figure 12:
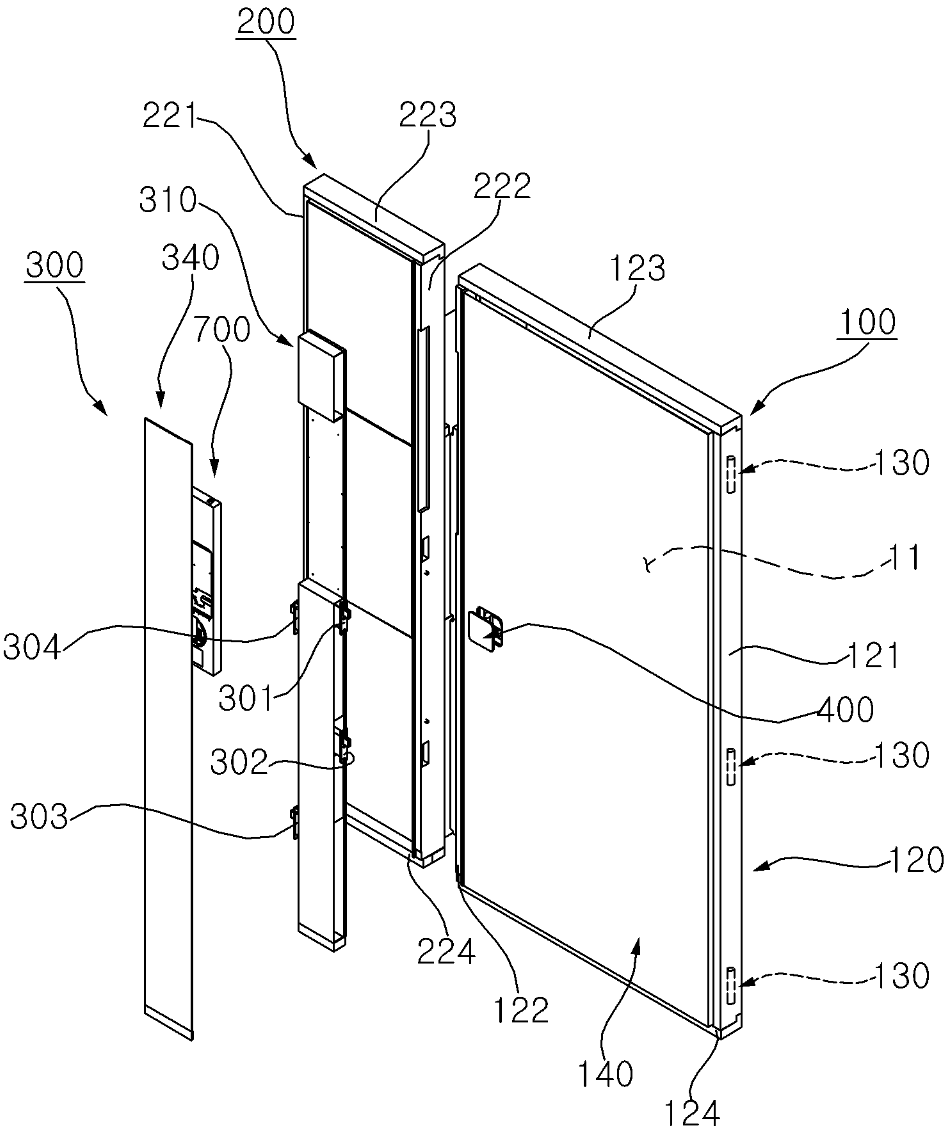
FIG. 12 is a partially exploded perspective view of the access door, the storage compartment, and the security assembly shown in FIG. 1.
Figure 13A:
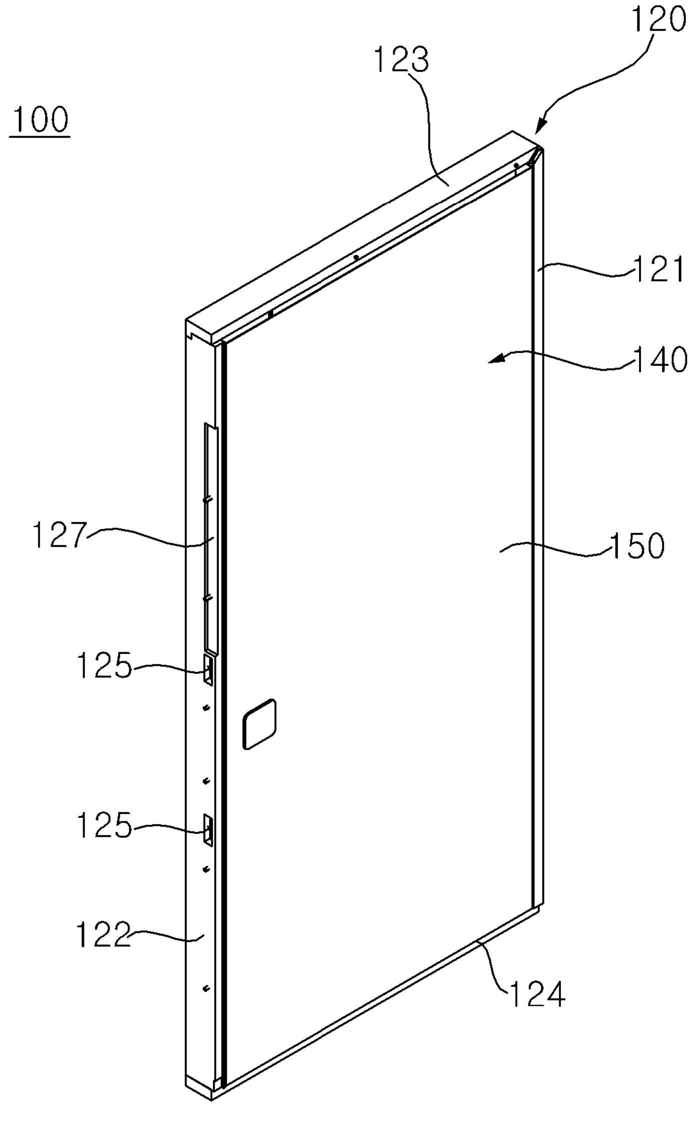
FIG. 13A is a perspective view of the access door shown in FIG. 12.
Figure 13B:
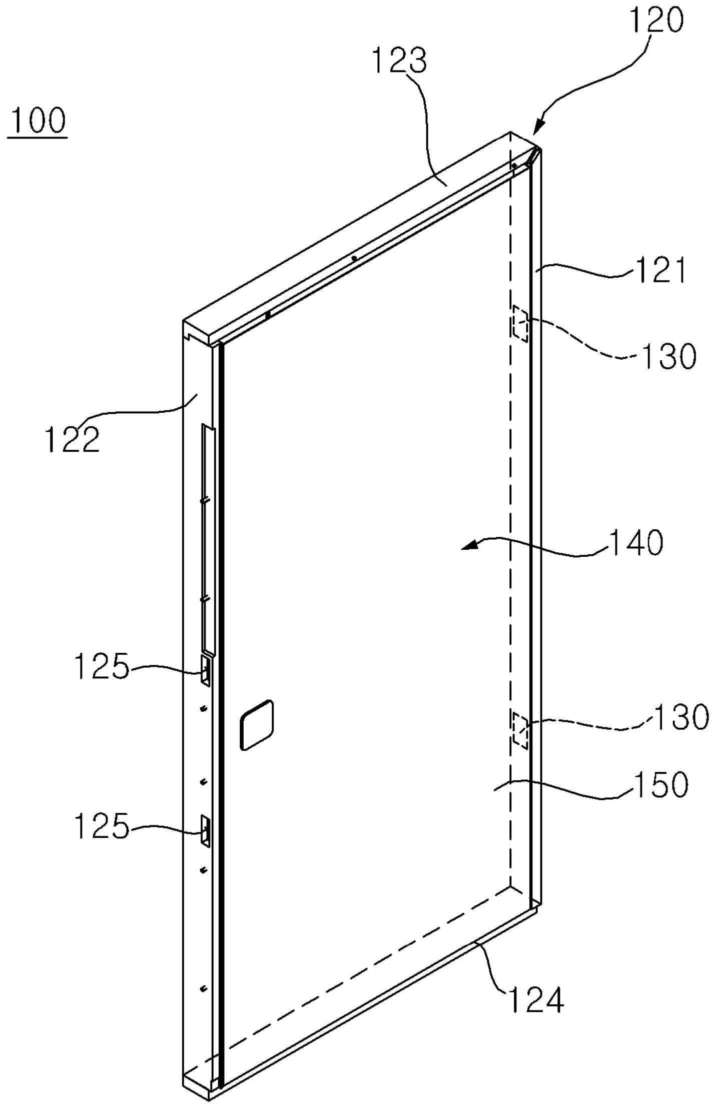
FIG. 13B is an perspective view of the access door showing hinges.

As shown in FIGS. 9 and 11, a first support 311 may be L-shaped and include a first or vertical section 311*a* and a second or lateral section 311*b* extending perpendicularly from the first section 311*a*. The first support 311 may be formed as a single plate, and the second section 311*b* may be formed by bending a portion of the first support 311. An edge of the first section 311*a* may be coupled to an edge of the first plate 320, and an edge of the second section 311*b* may extend across the rear surface 320*b* of the first plate 320.

A front-rear thicknesses of the first section 311*a* and the second section 311*b* may be less than or equal to a depth of the second installation recess 322 so that the first and second sections 311*a* and 311*b* do not protrude past the second installation recess 322.

A configuration of second, third, and fourth supports 312-314 may be substantially similar to a configuration of the first support 311 to have an L-shape. The second support 312 may have a first or vertical section 312*a* and a second or horizontal section 312*b*. The third support 313 may have a first or vertical section 313*a* and a second or horizontal section 313*b*. The fourth support 314 may have a first or vertical section 314*a* and a second or horizontal section 314*b*.

The supports 311, 312, 313, and 314 may form slots or spaces 325-328 therebetween through which the first and second door locks 301 and 302 and the first and second container door locks 303 and 304 may be inserted. A number of spaces 325-328 may correspond to a number of door locks 301 and 302 and storage locks 303 and 304. When there are two door locks 301 and 302 and two container door locks 303 and 304, the number of spaces 325-328 may be four, such that the number of spaces 325-328 may include a first space or a first upper space 325, a second space or a first lower space 326 provided below the first upper space, a third space or a second upper space 327, and a fourth space or a second lower space 328 provided below the second upper space 327.

The first and second door locks 301 and 302 may be inserted through the first upper and lower spaces 325 and 326, respectively. The first and second storage locks 303 and 304 may be inserted through the second upper and lower spaces 327 and 328, respectively.

The first upper space 325 and the first lower space 326 may be opened toward the right side of the security panel 310, which is adjacent to the access door 140. The first and second door locks 301 and 302 may be inserted into the right side of the security panel 310 via the first upper space 325 and the first lower space 326, respectively.

The second upper space 327 and the second lower space 328 may be opened toward the left side of the security panel 310, which may be adjacent to the storage container 500.

The first and second container door locks 303 and 304 may be inserted into the left side of the security panel 310 via the second upper space 327 and the second lower space 328, respectively.

The first support 311 may alternatively be referred to as a first upper support 311. The first upper space 325 may be formed between a bottom of a rear of the first installation recess 321, which may form a protrusion on the rear surface 320*b* of the first plate 320, and the second section 311*b* of the first support 311. The second support 312 may alternatively be referred to as a first lower support 312. The first lower space 326 may be formed between the first section 311*a* of the first support 311 and the second section 312*b* of the second support 312.

The second section 311*b* of the first support 311 may extend in a left-right direction and protrude in a front-rear direction to support a lower end of the first door lock 301. The second section 312*b* of the second support 312 may extend in a left-right direction and protrude in a front-rear direction to support a lower end of the second door lock 302.

The third support 313 may alternatively be referred to as a second upper support 313. The second upper space 327 may be formed between the first section 313*a* of the third support 313 and the bottom of the rear of the first installation recess 321.

The fourth support 314 may alternatively be referred to as a second lower support 314. The second lower space 328 may be formed between the second section 314*b* of the fourth support 314 and the first section 313*a* of the first support 313.

The second section 313*b* of the third support 313 may extend in the left-right direction and protrude in the front-rear direction to support a lower end of the first container door lock 303. The second section 314*b* of the fourth support 314 may extend in the left-right direction and protrude in the front-rear direction to support a lower end of the second container door lock 304.

The first and second door locks 301 and 302 may be fixed to at least one of the first plate 320 or the second plate 330. The first support 311 and the second support 312 may be used to align the positions of the first and second door locks 301 and 302 before the door locks 301 and 302 are fixed to the first plate 320 or the second plate 320.

As previously described, the first plate 320 may be a plate or panel that is bent to form the first installation recess 321 and the second installation recess 322. A connecting plate or horizontal portion 323 may be provided between the second installation recess 322 and the first installation recess 321. The first and second installation recesses 321 and 322 may vertically align to maintain a slim front-rear profile of the security panel 310, and the connecting plate 323 may form a top of the second installation recess 322 and a bottom of the first installation recess 32.

The authentication device 700 may be inserted into the first installation recess 321 and may be supported on bottom by the connecting plate 323. The authentication device 700 may be provided at the front side of the first plate 320, and the first and second door locks 301 and 302 and the first and second container door locks 303 and 304 may be provided at the rear side of the first plate 320.

Figure 6:
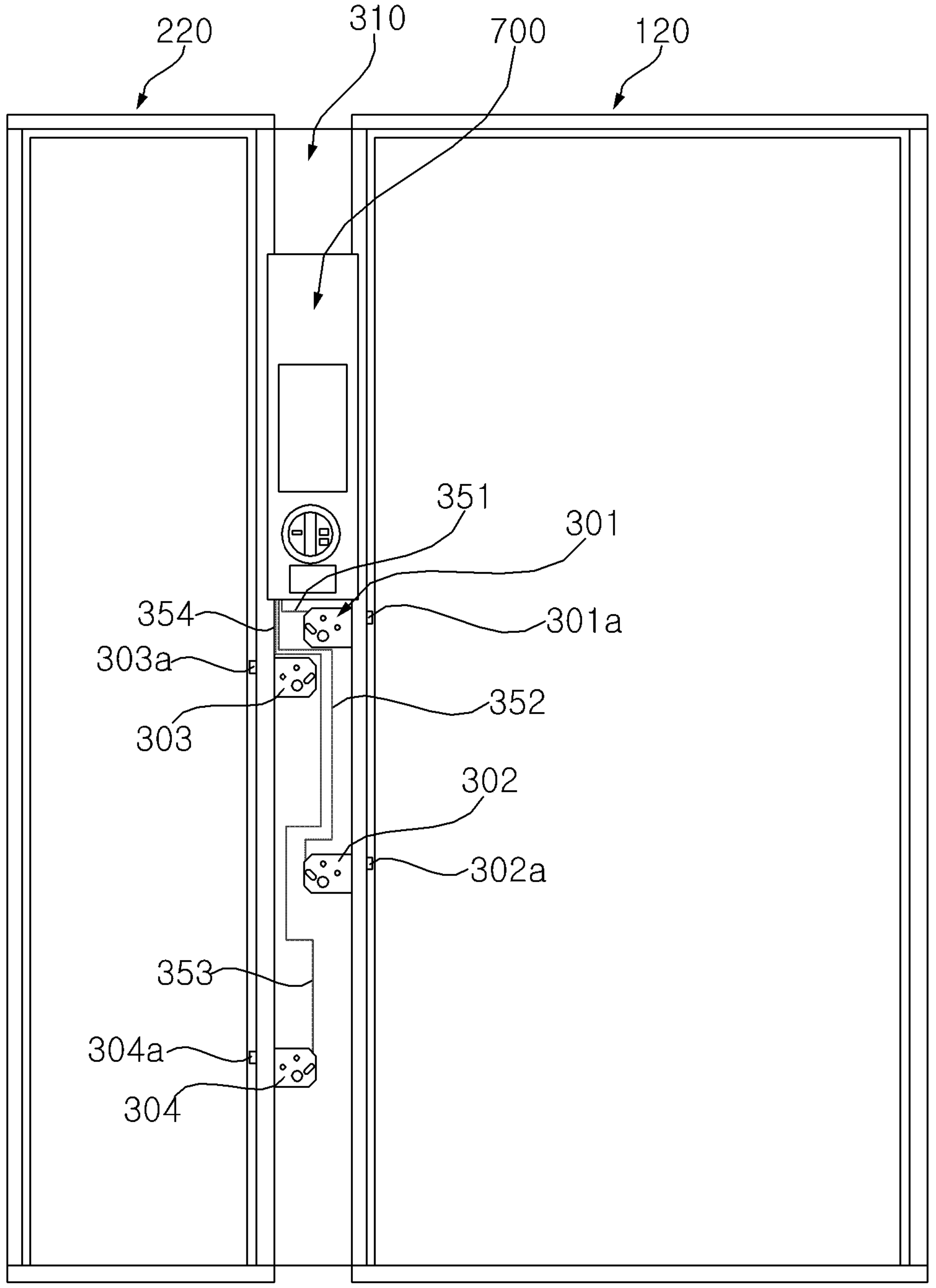
FIG. 6 is a front view illustrating the security assembly illustrated in FIG. 5 assembled and installed.

As shown in FIG. 6, a plurality of cables 351, 352, 353, and 354 may be provided to control the first and second door locks 301 and 302 and the container door first and second storage locks 303 and 304 through the authentication device 700. The plurality of cables 351, 352, 353, and 354 may include a first cable 351, a second cable 352, a third cable 353, and a fourth cable 354. The first and second door locks 301 and 302 may include dead bolts 301*a* and 302*a*, respectively, and the first and second storage locks 303 and 304 may include dead bolts 303*a* and 304*a*, respectively. The dead bolts 301*a*, 302*a*, 303*a*, and 304*a* may be controlled by the first through fourth cables 351-354 and will be described in more detail later. The dead bolts 301*a*, 302*a*, 303*a*, and 304*a* may be moved toward and away from the access door 140 and/or the front container door 520 of the storage container 500 for locking and unlocking.

The first, second, third, and fourth cables 351, 352, 353, and 354 may be provided in the first and second installation recesses 321 and 322. A connection hole or slot 324 may be formed in the connecting plate 323, and the first through fourth cables 351 through 354 may pass through the connection hole 324 so that lengths of the first through fourth cables 351-354 may be minimized.

Referring to FIGS. 12-15B, the door frame 120 may be installed on the structure 10, and the access door 140 may be hinged to the door frame 120 via a hinge 130 to open and close the first opening 11. A handle 400 may be provided on the access door 140 to open and close the access door 140. The hinge 130 may rotatably couple the door frame 120 and the access door 140. The third door frame 123 may be provided at a top of the doorway 15, and the fourth door frame 124 may be provided at a bottom of the doorway 15. The first door frame 121 may be perpendicular to the third and fourth door frames 123 and be provided at a first side (e.g., right side) of the doorway 15, and the second door frame 122 may be perpendicular may be perpendicular to the third and fourth door frames 123 and 124 to face the first door frame 121 and be provided in a middle of the doorway 15 adjacent to the security assembly 300.

The first door frame 121, the second door frame 122, the third door frame 123, and the fourth door frame 124 be provided at a border of the first opening 11, and the access door 140 may be enclosed by the first, second, third, and fourth door frames 121, 122, 123, and 124.

The access door 140 may be rotated to open and close the first opening 11. The access door 140 may be hinged to the first door frame 121 or the second door frame 122, or alternatively to the third door frame 123 so that the door opens rotates in a forward-backward direction.

At least one of the first, second, third, or fourth door frames 121, 122, 123, or 124 frames may be omitted if such door frame is not hinged to the access door 140. For example, if the access door 140 is hinged to the first door frame 121, at least one of the second door frame 122, the third door frame 123, or the fourth door frame 124 may be omitted.

At least one of the first door frame 121, the third door frame 123, or the fourth door frame 124 may be coupled to the structure 10 (e.g., the first, third, and fourth door frames 121, 123, and 124 may be coupled to the right side of the front wall 22 and/or 21, at a top under the ceiling 23, and the floor 24, respectively). The second door frame 122 may be coupled to a right side of the security assembly 300.

A first service or lock slot 125 may penetrate the second door frame 122 to allow movement of the dead bolt 301*a* or 302*a* and to allow access to the first and second locks 301 and 302 from the right side of the security assembly 300. There may be a plurality (e.g., two) of first service slots 125 formed in the second door frame 122 to correspond to a plurality (e.g., the first and second) of door locks 301 and 302. The first service slot 125 may extend in the left-right direction without being exposed to the first space S1.

A size of the first service slot 125 may be large enough for insertion of the first or second door lock 301 or 302. The dead bolts 301*a* and 302*a* of the first and second door locks 301 and 302 of the security assembly 300 may be inserted through the first service slots 125 to engage with the access door 140. A number and positions of the door locks 301 and 302 may correspond to a number and positions of the first service slots 125. The first and second door locks 301 and 302 may be spaced apart in the vertical direction, as are the first service slots 125.

Lock or dead bolt holes or slots 126 (FIG. 16) may be formed at the left side of the access door 140 at positions facing the first service slots 125 of the second door panel 122, respectively. The lock holes 126 may alternatively be referred to as lock grooves or recesses. The dead bolts 301*a* and 302*a* of the door locks 301 and 302 may pass through the first service slot 125 of the second door frame 122 to be inserted into the lock holes 126 of the access door 140. Upon unlocking, the dead bolts 301*a* and 302*a* may be withdrawn through the first service slots 125 into the security panel 310. For example, the first and second door locks 301 and 302 may include housings or cases in which the door bolts 301*a* and 302*a* may be inserted during unlocking.

A service opening 127 may penetrate the second door frame 122 in the left-right direction at a position aligning with a side of the authentication device 700. The authentication device 700 may be repaired or replaced through the service opening 127. The service opening 127 may be opened toward a right side of the second door frame 122.

A first service cover 128 may be provided to close the first service slot 125 and to cover the service opening 127 such that, when the first service cover 128 is coupled to the second door frame 122, the first and second locks 301 and 302 and the authentication device 700 may not be accessible for servicing.

The first service cover 128 may be provided at a right side of the first installation recess 321 to be between the authentication device 700 and the access door 140. The first service cover 128 may cover at least a portion of a side of the first installation recess 321 so as to cover the first upper slot 325 and the first lower slot 326 of the first plate 320 from a right side.

The first service cover 128 may have holes 128*a* and 128*b* through which the dead bolts 301*a* and 302*a* of the door locks 301 and 302 may pass. The size of the holes 128*a* and 128*b* may correspond to a size of the dead bolts 301*a* and 302*a* but not the entire housings of the first and second door locks 301 and 302 so that the first service cover 128 contacts the remainder (or housings) of the first and second locks 301 and 302. The first service cover 128 may allow the dead bolts 301*a* and 302*a* to pass through the holes 128*a* and 128*b*, but may not allow tampering with the housings or inner workings of the first and second locks 301 and 302.

When the first service cover 128 is attached to the second door frame 122, the first and second locks 301 and 302 and the authentication device 700 may be concealed, while the access door 140 may still be locked by a movement of the dead bolts 301*a* and 302*a*. The first service cover 128 may prevent or reduce tampering attempts to the first and second door locks 301 and 302 when the access door 140 is open.

The service opening 127 may be formed to extend in the vertical direction (i.e., a longitudinal direction) of the second door frame 122 at a left side to be provided adjacent to a right side of the security assembly 300. The service cover 128 may cover the service opening 127 and couple to the second door frame 122 via a fastening member (e.g., pressed-fit via pins and recesses, screwed, bolted, or adhered). The service cover 128 may be removable from the second door frame 122 to allow access to the authentication device 700 via the service opening 127 and to the first and second locks 301 and 302 via the first service slots 125.

The service opening 127 and the service cover 128 may be provided on a same plane as the access door 140 when the access door 140 is closed. The service cover 128 and the second door frame 122 may not protrude so that the second door frame 222 and service cover 128 are concealed when viewed from the first space S1 when the access door 140 is closed.

The fourth door frame 124 may be supported on an upper surface of the floor 24. At least a portion of the fourth door frame 124 may be embedded in the floor 24 for fire protection and security.

The access door 140 may be hinged to the door frame 120 and rotated via the hinge 130 to allow egress and ingress through the access door 140. The access door 140 may be rotated into at least one of the first space S1 or the second space S2, and may open and close the first opening 11 by the rotation. As an example, the access door 140 may open into the first space S1, but embodiments disclosed herein are not limited.

The access door 140 may include a first frame or panel 150 at least partially exposed in the first space S1 and a second frame or panel 160 exposed in the second space S2. The first panel 150 may be a front or outdoor frame or panel, and the second panel 160 may be a rear or indoor frame or panel.

The first panel 150 may have a front panel or plate 151 with first and second side walls or plates 152 and 153 that are bent backward from the front plate 151 toward the second space S2. The side walls 152 and 153 may space the first panel 150 apart from second panel 160 described later and cover side edges of a third panel 170 described later.

The side walls 152 and 153 may align with inner sides of the first and second door frames 121 and 122, respectively when the access door 140 is closed and face each other. First and second rear rims 154 and 155 may be bent from the first and second side walls 152 and 153, respectively, to face a rear side of the front plate 151 and also to face the second panel 160. A left side of the front plate 151 may be formed with a first handle hole 156 to receive the handle 400.

The first panel 150 may be formed of a metal material for security and fire protection. The first panel 150 may be manufactured by bending a plate to form the front plate 151, first and second side walls 152 and 153, and first and second rear rims 154 and 155.

The lock holes 126 may be provided at the left side of the access 140 on the second door panel 153 of the first panel 150. The lock holes 126 may be holes, slots, or recess at least partially penetrating the second door panel 153. The dead bolts 301*a* and 302*a* of the first and second door locks 301 and 302 may engage with the lock holes 126 to lock the access door 140.

The handle 400 may be inserted into the first handle hole 156 such that a front surface of the handle 400 may be flush with a front surface of the front plate 151. The handle 400 may be configured to protrude for grasping when the first and second door locks 301 and 302 are unlocked. The first side wall 152 may be hinged to the first door frame 121 via the hinge 130. When the access door 140 is closed, the first side wall 152 may be provided to face an inner side surface of the first door frame 121, and the second side wall 153 may be provided to face the inner side surface of the second door frame 122.

The first rear rim 154 and the second rear rim 155 may be coupled to a front surface of the second panel 160 by a fastening member (e.g., bolt, screw, adhesive, or welded) so that the first and second panels 150 and 160 may be coupled to each other at left and right sides. Inner sides of the first panel 150 and the second panel 160 may face each other and be spaced apart to form a door inner space 141.

A third frame or panel 170 may be provided between the first and second panels 150 and 160. The third panel 170 may also be referred to as a display frame or panel. An optional door display 180 to display information to the user may be provided in a display opening or recess 171 formed in the third panel 170. When the door display 180 is provided, some of the second panel 160 may be made of a transparent material so that the user may view the door display 180 from the second space S2.

Alternatively, the opening or recess 171 may be omitted, and the door display 180 may be coupled to a rear surface of the third panel 170 to be visible through a transparent portion of the second panel 160. As another alternative, the door display 180 may be coupled to the rear surface of the second panel 160 to be provided on an exterior of the access door 140 that faces the second space S2. Embodiments of the door display 180 and a coupling to the access door 140 are not limited.

The third panel 170 may be coupled to at least one of the first panel 150 or the second panel 160. The display opening 171 may be formed to penetrate the third panel 170, and the third panel 170 may support the door display 180 and hide various cables connected to the door display 180. The door display 180 may face the second space S2 to display information to the second space S2 through the display opening 171 and/or a transparent portion of the second panel 160. The door display 180 may be, e.g., a light emitting diode (LED) display or liquid crystal display (LCD). The door display 180 may display video footage recorded from the authentication device 700 or be used to display or stream other information or programs. The door display 180 may have an optional timer, microphone or speaker, and the authentication device 700 may output video recorded from the camera, if permitted by the user. The door display 180 may be configured to mimic a window or the door and/or continuously display an exterior image.

The second panel 160 may include a transmission panel or window 162 formed of a material capable of transmitting light (e.g., a transparent or translucent material such as glass or plastic). A fixing panel assembly 164 configured to be coupled (e.g., bolted, screwed, adhered, or welded) to the first panel 150 may be provided at at least one edge of the transmission panel 162.

The fixing panel assembly 164 may include a first fixing trim or plate **164*a* provided on a left side of the transmission panel 162, a second fixing trim or plate 164*b* provided above the transmission panel 162, and a third fixing trim or plate 164*c* provided under the transmission panel 162, but embodiments disclosed herein are not limited. The first, second, and third fixing trims 164*a*, 164*b*, and 164*c*** may be formed of a metal material.

A fourth fixing trim or plate may be optionally provided on the right side of the transmission panel 162. Embodiments disclosed herein are not limited to a number of fixing trims or plates, and the fixing panel assembly 164 may be coupled to at least one edge (e.g., two or three edges) of the transmission panel 162 to support the transmission panel 162. The fixing panel assembly 164 may be formed with a second handle hole 166 through which the handle 400 may be exposed.

The handle 400 may be flush with the access door 140, and may selectively protrude from the access door 140. The handle 400 may include a first handle 410 protruding from the front of the access door 140 toward the first space S1, and a second handle 420 protruding from the rear of the access door 140 toward the second space S2. An optional handle driving device (e.g., actuator or motor) may selectively move at least one of the first handle 410 or the second handle 420 forward or rearward so that the user may grasp the first or the second handle 410 or 420 accordingly.

When not being moved or used, the first handle 410 may remain within the first panel 150 and cover the first handle hole 156 to lie on a same plane with the front plate 151. When used, the first handle 410 may be moved to protrude beyond the front plate 151 toward the first space S1.

When not being moved or used, the second handle 420 may remain within the second panel 160 and cover the second handle hole 166 to lie on a same plane as the fixing panel 164. When used, the second handle 420 may protrude beyond the fixing panel 164 toward the second space S2. The first and second handles 410 and 420 may be moved by the handle driving device or alternatively may be pulled manually by the user.

When someone wants to enter the second space S2 from the first space S1, the first handle 410 may protrude. When someone wants to exit the second space S2 to enter the first space S1, the second handle 420 may protrude. A control of the first and second handles 410 and 420 may be based on a user input (e.g., a button, touch, knock, or pull of the first and second handles 410 and 420) or alternatively based on user authentication by the authentication device 700, as it may be more difficult for an intruder to break through the access door 140 if the first handle 410 remains flush.

As an alternative, the first and second handles 410 and 420 may be rotatable door knobs to insert and withdraw a bolt configured to protrude out of the access door and be inserted into optional slots of the second door frame 122 and security assembly 300. The user may be able to lock the bolt in the slot via a lock on the first handle 410 to provide added security. The front container door 520 may be spring loaded so as to pop open upon unlocking, or alternatively, the front container door 520 may have a similar handle mechanism as the handle 400 of the door assembly 100.

Figure 17:
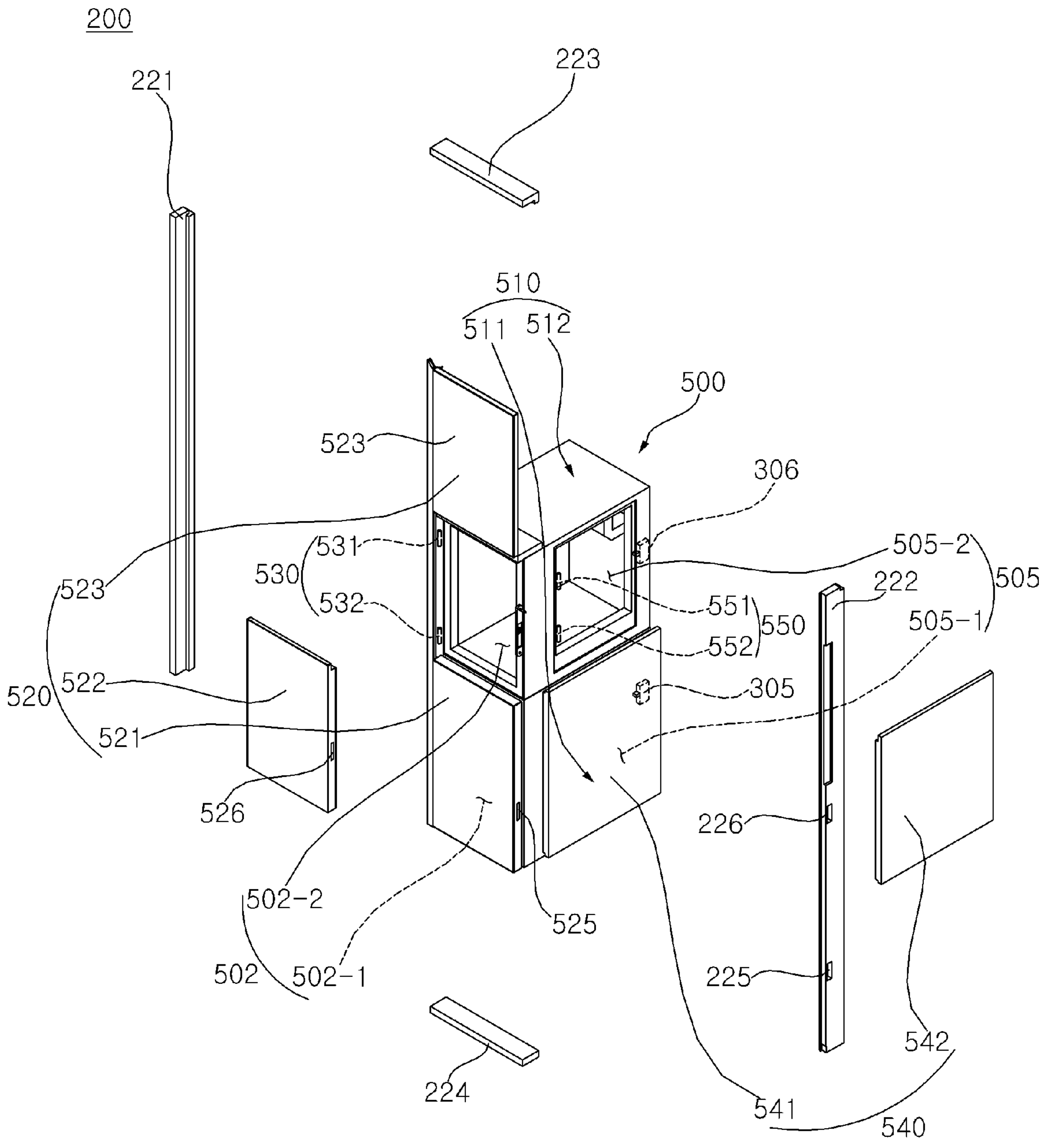
FIG. 17 is an exploded perspective view of FIG. 16.
Figure 18:
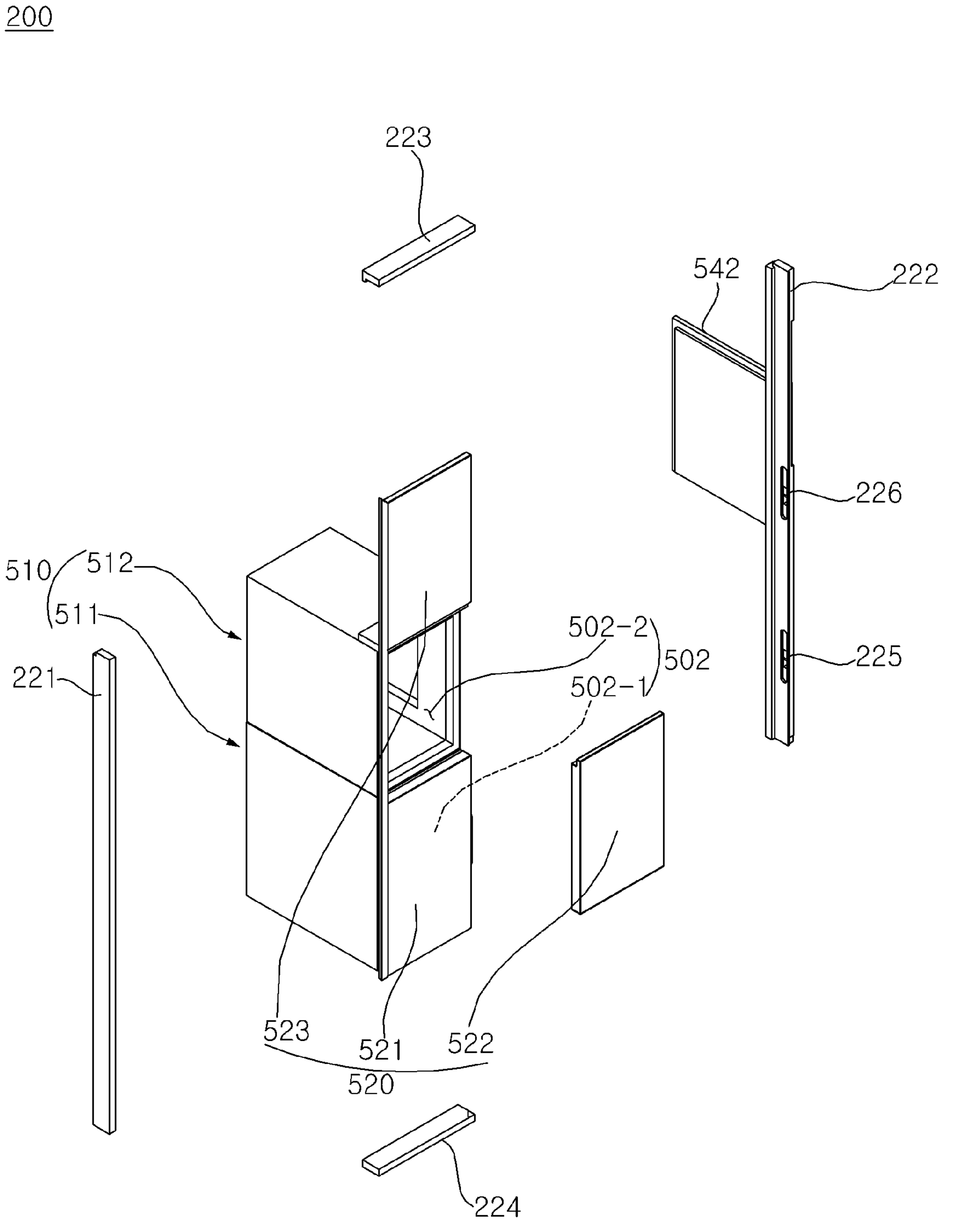
FIG. 18 is an exploded perspective view seen from the other side of FIG. 17.
Figure 19:
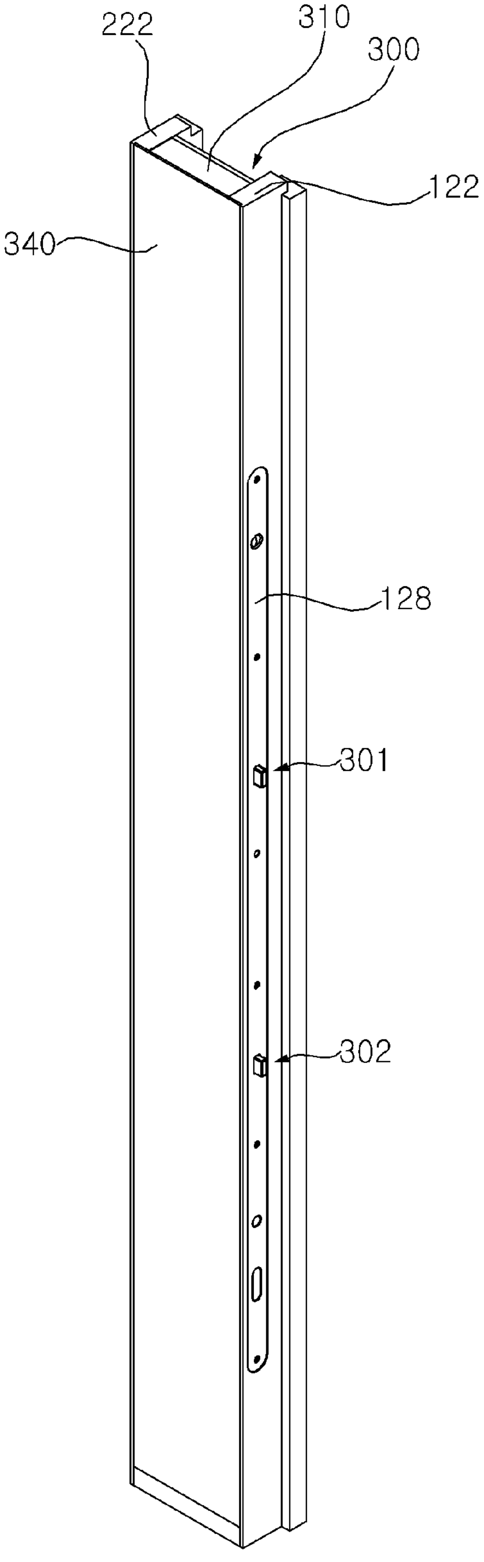
FIG. 19 is a perspective view illustrating the security assembly of FIG. 1 assembled.

Referring to FIGS. 16 to 18, as previously described, the storage assembly 200 may be provided on the left side of the security assembly 300. The storage frame 220 may be installed in the structure 10 and a storage container 500 may be coupled to the storage frame 220. The storage container 500 may be arranged in plurality and include, for example, first and second containers 500-1 and 500-2. The storage assembly 200 may close the second opening 12, and the first space S1 and the second space S2 may communicate with each other through openings of the storage container 500.

Each storage container 500 may include a body or container 510 having a storage space 505 formed therein. The container body 510 may have an overall hexahedral shape (e.g., a rectangular parallelepiped shape), but embodiments disclosed herein are not limited. The container body 510 may have an upper wall, a lower wall, and a left wall that are solid. The container body 510 may further include a front wall and a right wall with first and second (i.e., front and rear) openings 502 and 504, respectively. A first (i.e., front) container or storage door 520 and a second (i.e., rear) container or storage door 540 may be provided in the container body 510 to open and close the first and second openings 502 and 504, respectively, to allow access to the storage space 505. Alternatively or in addition thereto, the right wall of the container body 510 may be solid, and at least one of the rear wall or the upper wall of the container body 510 may have the second opening 504 opened and closed by the rear container door 540, which may be a rear or upper door.

The storage space 505 may be used to store articles or items. When the first container door 520 is opened, the storage space 505 may communicate with the first space S1. When the rear container door 540 is opened, the storage space 505 may communicate with the second space S2. An interior of the container body 510 may have a sensor (e.g., a weight sensor, a light sensor, or a camera) to detect when items are stored in the storage space 505. Information or images from the sensor in the container body 510 may be communicated via the door display 180 and/or wirelessly to a remote device (e.g., to a cell phone via WiFi).

When the front container door 520 and the rear container door 540 are simultaneously opened, the first space S1 and the second space S2 may communicate with each other through the storage space 505 and first and second openings 502 and 504. However, to prevent external intrusion, the front container door 520 and the rear container door 540 may be configured to not be opened at the same time. When the front container door 520 is opened, the rear container door 540 may be locked, and when the rear container door 540 is opened, the front container door 520 may be locked.

At least one door drive device (e.g., a motor or a spring) may open and close the front container door 520 and the rear container door 540. A controller may control an opening of the front container door 520 and the rear container door 540. The controller may be provided in the security assembly 300. Alternatively or in addition thereto, when the front container door 520 is unlocked upon authentication by the authentication device 700, a spring mechanism may be released to pop open the front container door 520 and allow for easy opening of the front container door 520. The rear container door 540 may have a similar spring mechanism structure, or alternatively may have a handle accessible from the second space S2.

The front container door 520 may be hinged to the container body 510 via a first container hinge 530 such that a rotation of the front container door 520 about the first container hinge 530 may open and close the first opening 502. However, embodiments disclosed herein are not limited. For example, the first container hinge 530 may alternatively be omitted, and the front container door 520 may be configured to slide in a horizontal or vertical direction to open and close the first container opening 502.

The first container hinge 530 may be provided at a left side or a right side of the first container opening 502. A plurality of first container hinges 530 may be spaced apart in a vertical direction along the container body 510 adjacent to the opening 502 to support the front container door 520. The plurality of first container hinges 530 may include an upper first container hinge 531 and a lower first container hinge 532 provided below the upper first container hinge 531.

Embodiments of the first container hinge 530 are not limited. For example, the first container hinge 530 may be provided at a top or bottom of the first opening 502. The first container hinge 530 may be a plurality of first container hinges 530 that include a right first container hinge and a left first container hinge spaced apart in a horizontal direction to support the front container door 520. In such an embodiment, the front container door 520 may be temporarily secured when placing or removing items into or from the storage space 505.

Like the front container door 520, the rear container door 540 may be hinged to the container body 510 via a second container hinge 550 to open and close the second container opening 504. When facing the second container opening 504, the second container hinge 550 may be provided at a left or right side and come in plurality to include an upper container hinge 551 and a lower container hinge 552 provided below and spaced apart from the upper container hinge 551. Alternatively, the second container hinge 550 may be provided at a top or bottom side and come in plurality to include right and left container hinges spaced apart from each other in a horizontal direction. As another alternative, the second container hinge 550 may be omitted, and the rear container door 540 may be configured to slide to open and close the second opening 504. Embodiments of the front and rear container doors 520 and 540 and an opening and closing of the first and second openings 502 and 504 are not limited.

The first storage frame 221, the second storage frame 222, the third storage frame 223 and the fourth storage frame 224 may be formed of a steel material for security. The first storage frame 221, the second storage frame 222, the third storage frame 223, and the fourth storage frame 224 may occupy an edge or border of the second opening 12, and the storage container 500 may occupy the remainder of the second opening 12 within the border.

The first container hinge 530 may be provided on the first storage frame 221, the second storage frame 222, the third storage frame 223, or the fourth storage frame 224. At least one of the first storage frame 221, the second storage frame 222, the third storage frame 223, or the fourth storage frame 224 not having the first container hinge 530 may be omitted. At least one of the first storage frame 221, the third storage frame 223, or the fourth storage frame 224 may be coupled to the structure 10 (e.g., the first, third, and fourth storage frames 224 may be coupled to left inner sides of the front and/or rear walls 22 and/or 21, at the top of the doorway 15 under the ceiling 23, and the floor 24, respectively).

The second storage frame 222 may be coupled to the right side of the security assembly 300. The fourth storage frame 224 may be supported on the surface of the floor 24. At least a portion of the fourth storage frame 224 may be embedded in the floor 24 for fire protection and security.

The first door frame 121 and the first storage frame 221 may be parallel to each other. The second door frame 122 and the second storage frame 222 may also be parallel to each other. The third door frame 123 and the third storage frame 223 may be arranged on a same straight line. The fourth door frame 124 and the fourth storage frame 224 may also be arranged on a same straight line.

The storage container 500 may include a plurality of containers 500-1 and 500-2 provided inside of the storage frame 220 which may be stacked in the vertical direction and used for different purposes. Each storage container 500 may include the container body 510, the front and rear container doors 520 and 540, the first and second openings 502 and 504, the storage space 505, and the first and second container hinges 530 and 550. The front container door 520 may be opened and closed from the first space S1 and the rear container door 540 may be opened and closed from the second space S2.

Thus, the container body 510 may include first and second container bodies 511 and 512 for the first and second containers 500-1 and 500-2, respectively, the front container door 520 may include a first front door 521 and a second front door 522, the rear container door 540 may include a first rear or side door 541 and a second rear or side door 544 (or alternatively first and second upper or rear doors), the first container opening 502 may include a first front opening 502-1 and a second front opening 502-2, the second opening

504 may include a first side or rear opening 504-1 and a second side or rear opening 504-2 (or alternatively first and second upper or rear openings), and the storage space 505 may include a first storage space 505-1 and a second storage space 505-2. Although first and second (i.e., upper and lower) containers 500-1 and 500-2 are shown such that there are two front doors 521 and 522, two front openings 502-1 and 502-2, two side doors 541 and 542, two side openings 504-1 and 504-2, and two storage spaces 505-1 and 505-2, embodiments disclosed herein are not limited in number of storage containers 500.

The first container 500-1 may include the first container body 511 having the first storage space 505-1 therein. The first container body 511 may include the first front opening 502-1 and the first side opening 504-1, which the first front door 521 and the first side door 541 open and close, respectively. The first front door 521 may alternatively be referred to as a first outer container door, and the first side door 541 may alternatively be referred to as a first inner container door. The first front opening 502-1 may alternatively be referred to as a first outer opening, and the first side opening 504-1 may alternatively be referred to as a first inner opening.

The second container 500-2 may include the second container body 512 having the second storage space 505-2 therein. The second container 512 may include the second front opening 502-2 and the second side opening 504-2, which the second front door 522 and the second side door 542 open and close, respectively. The second front door 522 may alternatively be referred to as a second outer container door, and the second side door 542 may alternatively be referred to as a second inner container door. The second front opening 502-2 may alternatively be referred to as a second outer opening, and the second side opening 504-2 may alternatively be referred to as a second inner opening.

The second container body 512 may be stacked above the first container body 511. The first and second container bodies 511 and 512 may be formed integrally as one unitary container body 510 or alternatively formed separately and later combined (e.g., screwed, bolted, or welded).

The second front door 522 may be provided above the first front door 521. A third front door 523 may be provided above the second front door 522. The third front door 523 may be used for a third container or box stacked above the second container 500-2, or, if no third box is provided (as shown in FIG. 17), the third front door 523 may be used to open and close a space formed within the first and second storage frames 221 and 222 and the ceiling 23.

The second opening 12 of the door frame 15 may be covered by the first front door 521, the second front door 522, and the third front door 523. The first, second, and/or third front doors 521, 522, and/or 523 may be opened and closed to open a portion of the second opening 12.

The first storage container 500-1 may be used to temporarily store items at ambient temperature, while the second storage container 500-2 may be used to temporarily store items that require temperature control. A temperature control device (e.g., a thermoelectric module) may be provided in the second storage container 500-2 to heat or cool items in the second storage space 505-2.

The thermoelectric module may be a thermoelectric cooler (TEC) having a Peltier device to provide cooling and/or heating, but embodiments disclosed herein are not limited. A temperature of items in the second storage space 505-2 may be controlled by controlling a current applied to the Peltier device. For example, delivery goods may be maintained at an ambient temperature, or groceries may be maintained at a cold temperature.

Alternatively or in addition thereto, the second storage container 500-2 may include a refrigeration cycle having a compressor to compress a refrigerant, a condenser to exchange the compressed refrigerant and external air, an expansion valve to expand the condensed refrigerant, and an evaporator to exchange the air and the expanded refrigerant such that the second storage container 500-2 serves as a freezer or refrigerator.

When the second storage container 500-2 adjusts the air temperature of the storage space 505 through the thermoelectric module and/or the refrigeration cycle, a heat insulating material may be provided in the container body 510 and/or attached to the container doors 520 and 540. Packing or a seal around the first opening 502 and the second opening 504 may be provided to reduce or prevent air leakage or heat seeping in.

Second and third service slots 225 and 226 may be formed through the second storage frame 222 in a left-right direction to allow movement of the dead bolts 303*a* and 304*a*. The second and third service slots 225 and 226 may face the left side of the security assembly 300 to align with the storage locks 303 and 304 provided in the security assembly 300, and the first and storage locks 303 and 304 may be inserted into the second and third service slots 225 and 226, respectively.

A size of the second and third service slots 225 and 226 may be greater than or equal to the size of the storage locks 303 and 304 to allow access to the storage locks 303 and 304 for repair or replacement. The second and third service slots 225 and 226 may alternatively be referred to as upper and lower second service slots or to 2-1 and 2-2 second service slots, respectively. The second storage frame 222 may have an optional service opening to allow access to the authentication device 700.

Figure 20:
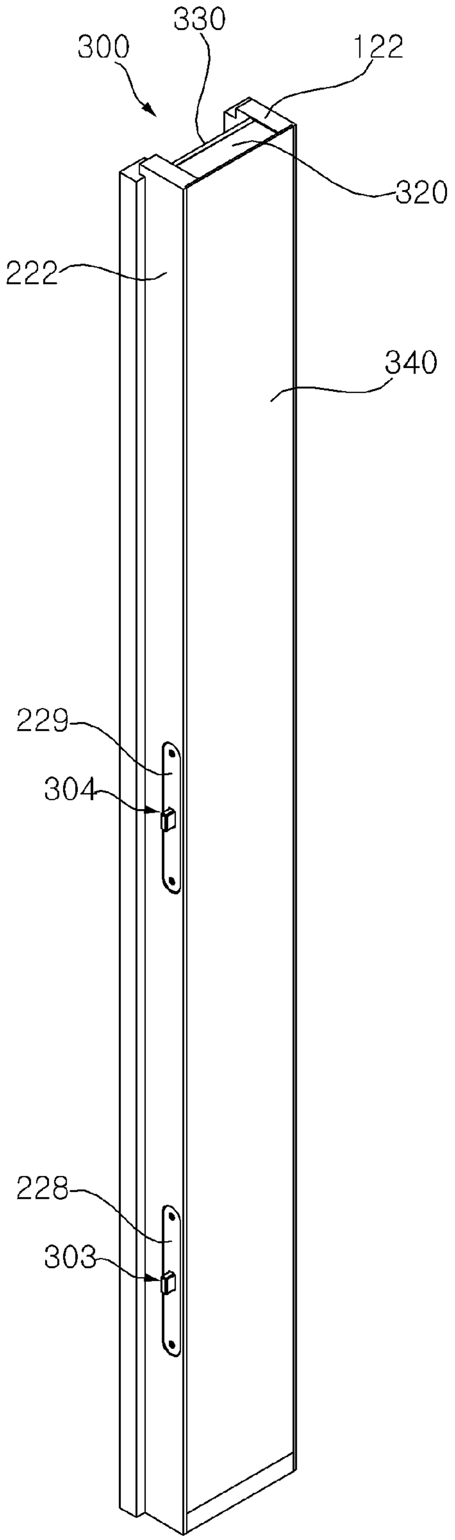
FIG. 20 is a perspective view of the other side of FIG. 19.

Second and third service covers 228 and 229 (FIG. 20) may be configured to couple to the second storage frame 222 to partially cover the second and third service slots 225 and 226 such that, when the second and third service covers 228 and 229 are attached to the second storage frame 222, the first and second storage locks 303 and 304 may be concealed and inaccessible for service. The second and third service covers 228 and 229 may have holes 228*a* and 229*a* through which the dead bolts 303*a* and 303*b* of the storage locks 303 and 304 pass to engage with the front container doors 521 and 522 in locking and unlocking. A size of the holes 228*a* and 229*a* may correspond to a size of the dead bolts 303*a* and 304*a*, but not the first and second storage locks 303 and 304, so that the second and third service covers 228 and 229 conceal a remainder of the first and second storage locks 303 and 304. The second and third service covers 228 and 229 may prevent or reduce tampering attempts to the first and second storage locks 303 and 304 when the front container doors 521 and 522 are open.

The second and third service covers 228 and 229 may be provided between the storage container 500 and the first and second storage locks 303 and 304. The second service cover 228 may be coupled to and close the second service slot 225. The third service cover 229 may be coupled to and close the third service slot 226. The second and third service covers 228 and 229 may cover at least part of the second installation recess 322 of the security assembly 300, the second and third service slots 225 and 226, and the storage locks 303 and 304. The second and third service covers 228 and 229 may be provided at sides of the second upper space 327 and the second lower space 328 to conceal the second upper space 327 and the second lower space 328 of the security assembly 300. When the second and third service covers 228 and 229 are removed, the storage locks 303 and 304 may be exposed, and the storage locks 303 and 304 may be replaced or repaired through the second and third service slots 225 and 226.

Alternatively, the second and third service covers 228 and 229 may be configured to be part of a larger service cover that is similar in configuration to the first service cover 128. Such a cover may be configured to cover the second and third service slots and have holes 228*a* and 229*a* through which the dead bolts 303*a* and 303*b* of the storage locks 303 and 304 pass. In addition, when the second storage frame 222 has a service opening for access to the authentication device 700, such a larger service cover may cover the optional service opening. However, such a larger service cover may require removal of one of the containers 511 or 512 or a partition therebetween to remove the larger service cover. As another alternative, one of the first or second service covers 228 and 229 that overlaps with the authentication device 700 may be larger to also cover any optional service opening for the authentication device 700.

The second service cover 228 may be exposed through the first front opening 502-1. When the first front door 521 is closed, the second service cover 228 may be covered by the first front door 521. The third service cover 229 may be exposed to the second front opening 502-2. When the second front container door 522 is closed, the third service cover 229 may be covered by the second front container door 522. The first storage lock 303 may lock or unlock the first front door 521 and the second storage lock 304 may lock or unlock the second front door 522. The dead bolt 303*a* of the first storage lock 303 may pass through the second service slot 225 to engage with a first storage lock or dead bolt hole or cavity 525 formed in a side or edge of the first front door 521. The dead bolt 304*a* of the second storage lock 304 may pass through the third service slot 226 to engage with a second lock or dead bolt hole or cavity 526 formed in a side or edge of the second front door 522.

The first storage lock hole 525 may be a concave recess provided on a right side surface of the first front door 521 to face the second service slot 225. The second storage lock hole 526 may be a concave recess provided on a right side surface of the second front door 522 to face the third service slot 226. Each of the first and second storage lock holes 525 and 526 may be formed to face a side surface of the security assembly 300, and may be provided at sides of the first and second front openings 502-1 and 502-2 that are opposite to sides having the first container hinges 530. When the dead bolts 303*a* and 304*a* of the first and second storage locks 303 and 304 are inserted through the first and second storage lock holes 525 and 526, the first and second front doors 521 and 522 may be prevented from rotating about the first container hinges 550, as movement in the front-rear direction may be restricted.

Additionally, as shown in FIG. 17, third and fourth storage locks 305 and 306 may be provided to lock and unlock the first and second side doors 541 and 542. The first and second storage locks 303 and 304 may alternatively be referred to as first and second front locks or first and second outer locks, while the third and fourth storage locks 305 and 306 may alternatively be referred to as first and second side locks or first and second inner locks.

As shown in FIG. 17, the third storage lock 305 may be provided at a rear side surface of the first container body 511 to be adjacent to the first side opening 504-1. The third storage lock 305 may be provided on a side of the first side opening 504-1 that is opposite to a side having the second container hinge 550.

A dead bolt of the first inner storage lock 305 may be configured to protrude into the first side opening 504-1 to lock or unlock the first side door 541. A concave lock opening or recess may be formed on a rear surface or edge of the first side door 541, and the dead bolt of the first inner storage lock 305 may be inserted into the lock opening to restrict a movement of the first side door 504-1 about the second container hinge 550.

As shown in FIG. 17, the fourth storage lock 306 may be provided at a rear side surface of the second container body 522 to be adjacent to the second side opening 504-2. The fourth storage lock 305 may be provided on a side of the second side opening 504-2 that is opposite to a side having the second container hinge 550.

A dead bolt of the second inner storage lock 305 may be configured to protrude into the second side opening 504-2 to lock or unlock the second side door 542. A concave lock hole or recess may be formed on a rear surface or edge of the second side door 542, and the dead bolt of the second inner storage lock 305 may be inserted into the lock hole to restrict a movement of the second side door 504-2 about the second container hinge 550.

Referring to FIGS. 18 to 22, the right side of the security panel 310 may be coupled with the second door frame 122, and the left side of the security panel 310 may be coupled to the second storage frame 222. The first and second door locks 301 and 302 and the first and second storage locks 303 and 304 may be provided between the security assembly 300 and the second door frame 122 and the second storage frame 222, respectively. The first and second door locks 301 and 302 and the first and second storage locks 303 and 304 may not be accessed from the first space S1 without removing the first security plate 320.

The authentication device 700 may be provided at a front of the security panel 310 to identify a user. To prevent external intrusion, when any one of the first front door 521 or the second front door 522 is opened, the authentication device 700 may lock the first side door 541 and the second side door 542, preventing intrusion into the second space S2 when placing items into the first and/or second storage spaces 505-1 and 505-2.

The cover 340 may be formed to have a greater area than the front of the security panel 310 so as to cover edges of the second door frame 122 and the second storage frame 222. A width of the first installation recess 321 of the first security plate 320 may be M1, a width of the authentication device 700 may be M2, a width of the cover 340 may be M3, and a width across the security assembly 300 and the front edges of the second door frame 122 and the second storage frame 222 may be M4.

The width M3 of the cover 340 may be greater than or equal to the width M4 across the security assembly 300 so that the cover 340 may cover the front edges of the second door frame 122 and the second storage frame 222 and the security assembly 300. A left edge of the cover 340 may face a right edge of the front container door 520, and the right edge of the cover 340 may face a left edge of the access door 140. The cover 340 may lie a same plane as the front surface of the access door 140 and the front surface of the first container door 520.

The first plate 320 may face the first space S1 and the second plate 330 may be provided closer to the second space S2 than the first space S2. The first plate 320 and the second plate 330 may align in the front-rear direction, but embodiments disclosed herein are not limited and may depend on a space where the smart entryway is installed.

If available, the middle structure 25 (FIG. 7) may be provided at and coupled to a rear of the second plate 330 to support the second plate 330. However, embodiments disclosed herein are not limited to a placement of the middle structure 25. For example, the middle structure 25 may be omitted, and the second plate 330 may be coupled to at least one of the door frame 120 or the storage frame 220. When there is the middle structure 25, the security panel 310 may be coupled to the middle structure 25 instead of the door and/or storage frames 120 and/or 220.

The second plate 330 may cover the rear surface of the first plate 310 to close the second installation recess 322. The first and second plates 320 and 330 may be coupled to each other. The first and second door locks 301 and 302 and the first and second storage locks 303 and 304 may be provided between the first plate 320 and the second plate 330 so as to not be accessible through a bottom or rear. The first plate 320 may block front access to the first and second door locks 301 and 302 and the first and second storage locks 303 and 304, while the second plate 330 may block rear access.

The first plate 320 may be provided between the second door frame 122 and the second storage frame 222. The width M2 of the authentication device 700 may be longer than the width M1 of the first installation recess 321 such that right and left edges 701 and 702 of the authentication device 700 may protrude out of the first installation recess 321.

Figure 21:
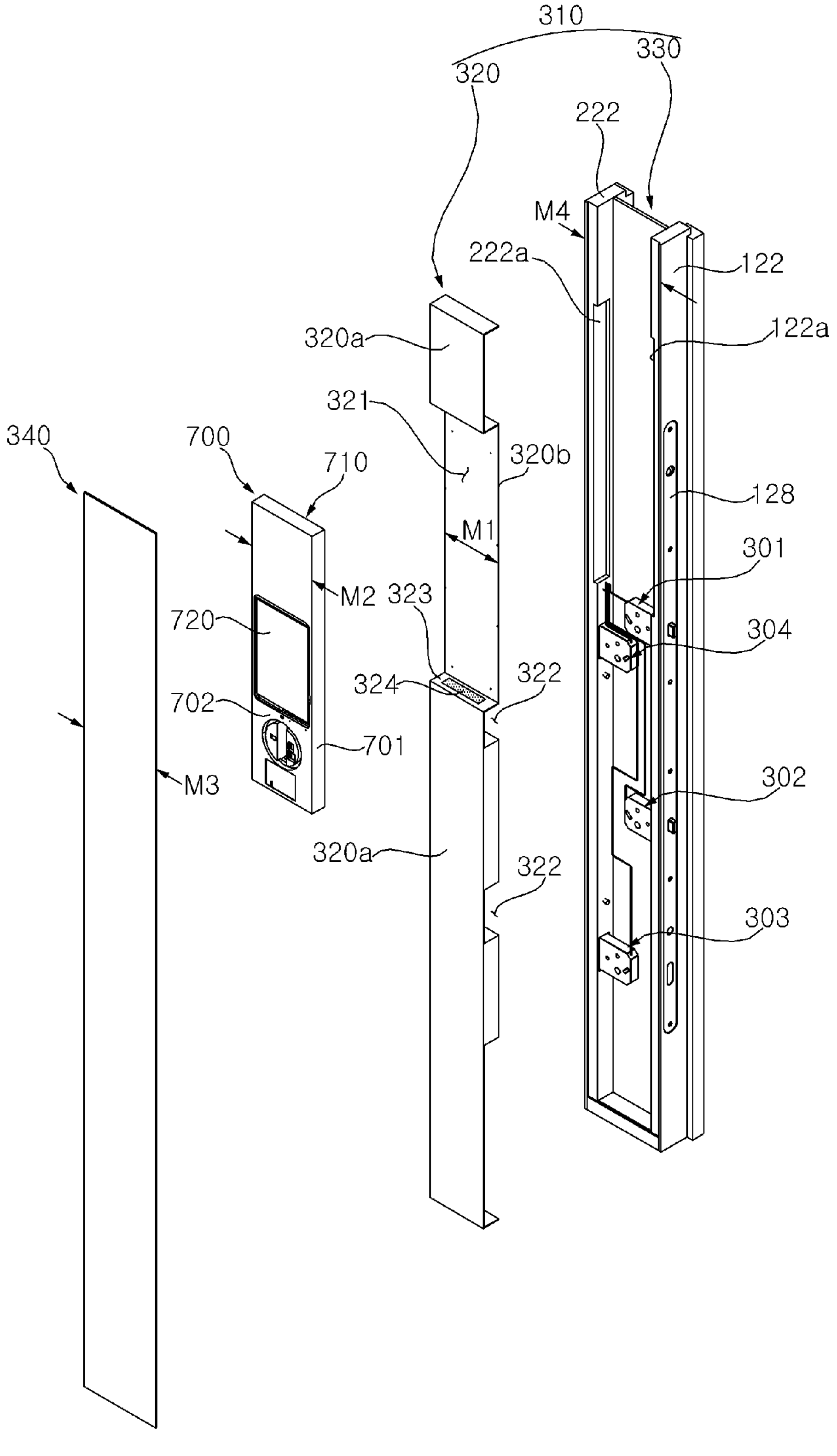
FIG. 21 is a partially exploded perspective view of FIG. 19.

As shown in FIG. 21, the right edge 701 of the authentication device 700 may be inserted into a first installation groove 122*a* formed in the second door frame 122. The left edge 702 of the authentication device 700 may be inserted into a second installation groove 222*a* formed in the second storage frame 222. The first and second installation grooves 122*a* and 222*a* may extend in the vertical direction. Alternatively, the right and left edges 701 and 702 may be pressed fit between the second door and storage frames 122 and 222.

The right edge 701 of the authentication device 700 may be fixed to the service cover 128 provided on the second door frame 122. When the service cover 128 is removed, at least a portion of the authentication device 700 may be exposed for repair or replacement.

The first installation groove 122*a* and the second installation groove 222*a* may face each other. The first installation groove 122*a* may surround the right side of the authentication device 700 to support the authentication device 700. The second installation groove 222*a* may surround the left side of the authentication device 700 to support the authentication device 700. The service opening 127 may be formed in a portion of the first installation groove 122*a* to allow access to the authentication device 700.

The front surface of the authentication device 700 and/or the front surface of the cover 340 may lie on the same plane as the front surfaces of the second door frame 122 and the second storage frame 222. The authentication device 700 may not protrude toward the first space S1 so as to reduce or prevent tampering.

Figure 22:
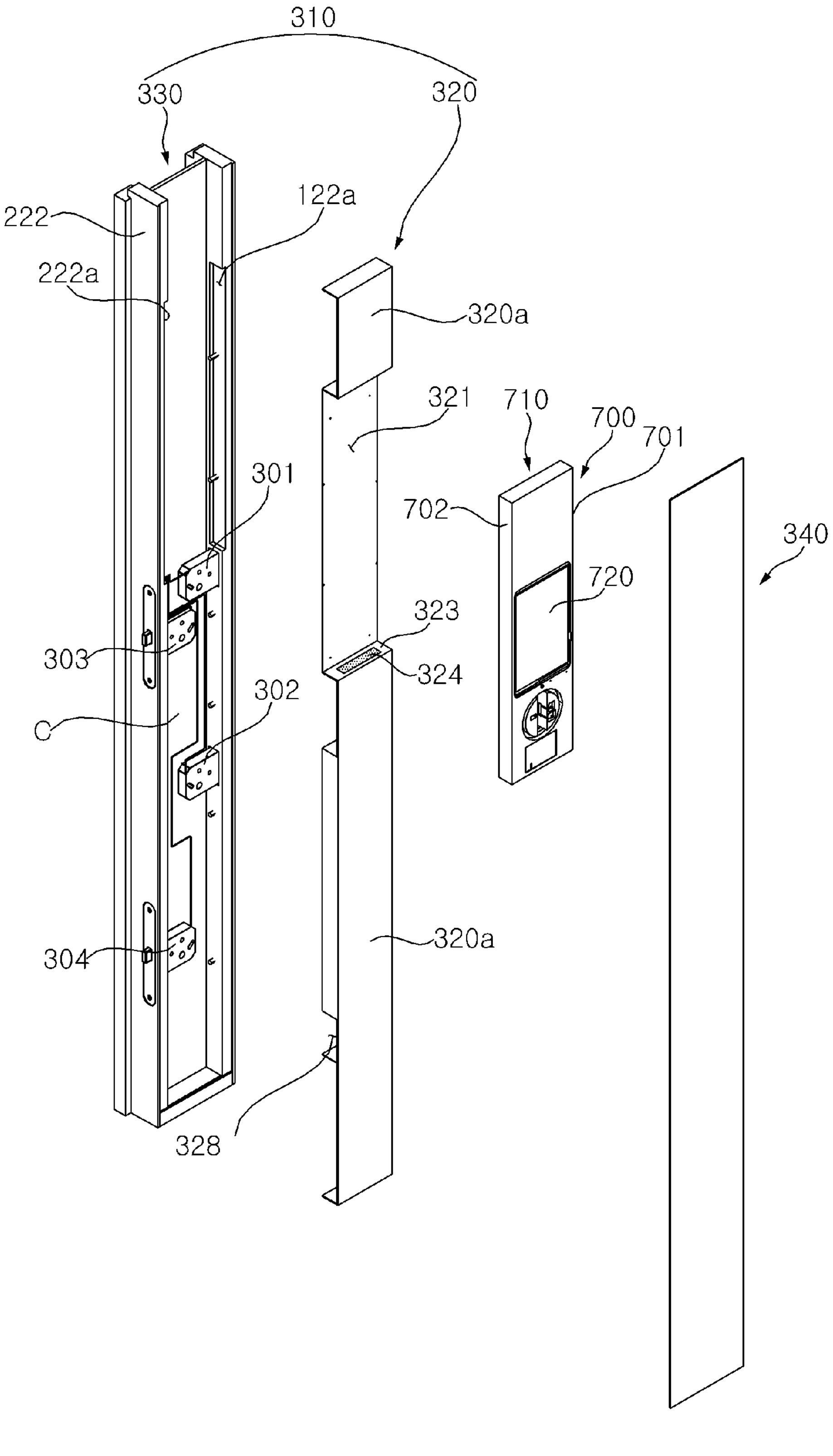
FIG. 22 is a perspective view of the other side of FIG. 21.
Figure 23:
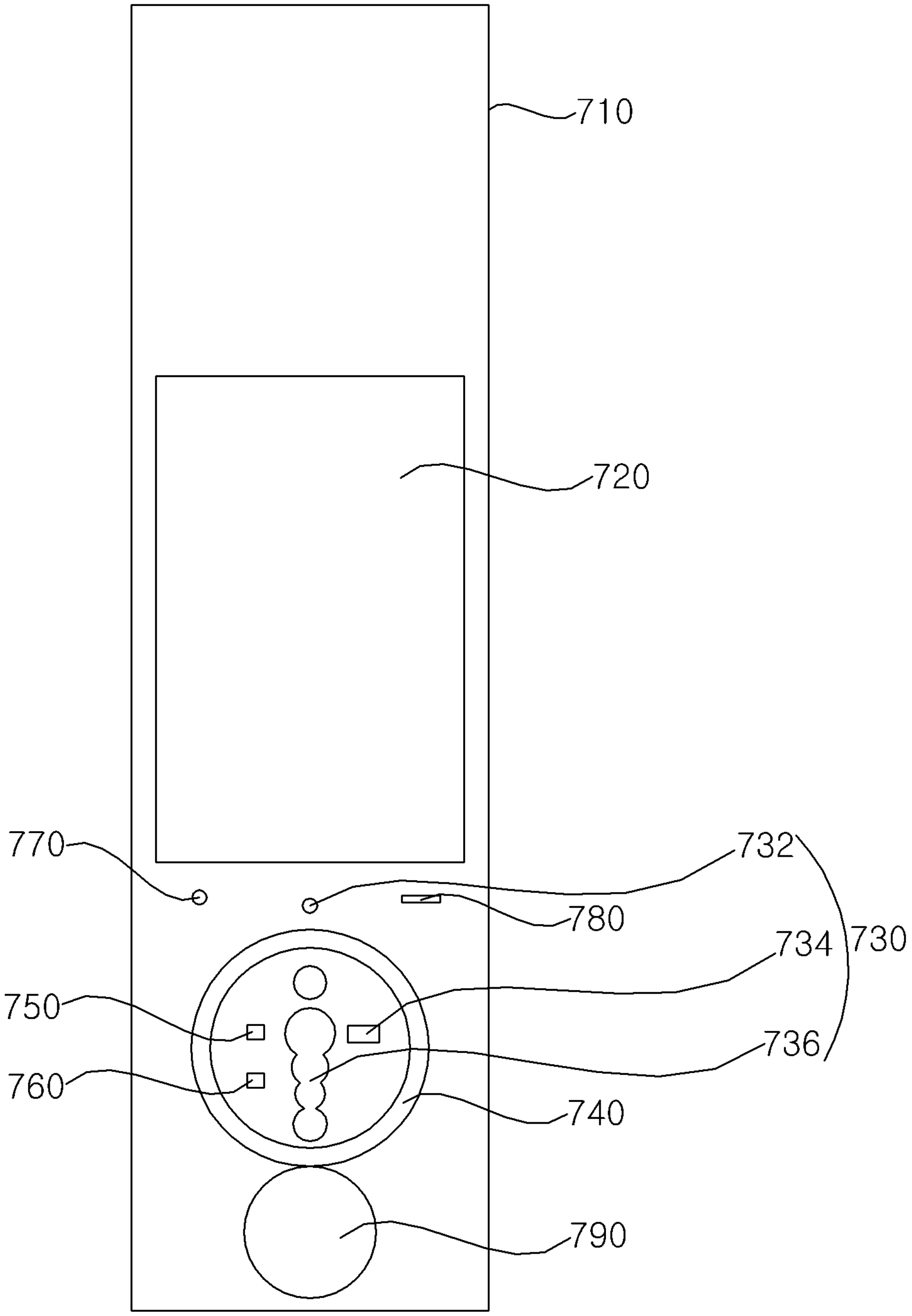
FIG. 23 is a schematic front view of an authentication device shown in FIG. 21.

Referring to FIGS. 22-23, a controller C may be provided between the first and second plates 320 and 330 to control the first and second door locks 301 and 302 and the first and second storage locks 303 and 304. As an example, the controller C may be provided between the second door lock 302 and the first storage lock 304, but embodiments disclosed herein are not limited. The controller C may be wired to the authentication device 700 or have an optional communication module to communicate with the authentication device 700. The controller C may be accessed by removing the second plate 330 from the first plate 320 of the security assembly 300. The second plate 330 may be removable from the middle structure 25 and/or the second door and storage frames 122 and 222 for convenient access to the controller C and the security assembly 300.

The authentication device 700 may include a case 710, a display 720, a camera 730, a light emitting member 740, a light sensor 750, a proximity sensor 760, a microphone 770, a speaker 780, and an authentication controller 790.

The case 710 may be coupled to the first plate 320 and exposed to the first space S1. The case 710 may be inserted into the first installation recess 321 of the first security panel 320. A shape of the case 710 may correspond to a shape or contour of the first installation recess 321. Although rectangular shapes are shown, embodiments disclosed herein are not limited.

The display 720 may be provided in the case 710 to face the first space S1. Information (e.g., address, time, instructions, greetings, or a live video stream) may be shown on the display 720 and visible from the first space S1. A plurality of cameras 730 may be provided to capture images or videos of the first space S1. The cameras 730 may include an external call image camera 732, a vein or fingerprint authentication camera 734 for vein or fingerprint authentication, and a face recognition camera 736 for face authentication. The cameras 730 may capture an image (e.g., a face, a fingerprint, a bar code, or a QR code), and the authentication controller 790 may have a memory to store the captured images, which may be compared to pre-set or predetermined images or information. When the captured image and stored images or information match or correspond, an authentication or verification signal may be transmitted to the controller C of the security assembly 300. The door display 180 may have an optional camera, and the display 720 may display video recorded from the door display 180.

As an example, when the face recognition camera 736 captures a user's face, and the captured image matches a predetermined face image or data, the security assembly 300 may control the first and second door locks 301 and 302 to unlock the access door 140 so that the user may enter the second space S2. Alternatively, two-factor authentication may be required to enter through the access door 140. For example, after the face recognition camera 736 captures the user's face, the vein authentication camera 734 may be used to capture a user's fingerprint, which must match a predetermined stored fingerprint before the first and second door locks 301 and 302 will be unlocked.

When the external call image camera 732 captures an image of a bar code or other data that matches predetermined bar code data, the security assembly 300 may control a corresponding one of the first or second storage lock 302 or 303 to unlock so that a corresponding storage space 505 may be accessed. Once at least one of the first or second storage locks 302 or 303 is opened, the security assembly 300 may lock the third and fourth storage locks 304 and 305 so that someone in the first space S1 may not see into the second space S2 through the storage space 505. Like access through the access door 140, alternatively, access to the storage containers 500 may alternatively require two-factor authentication.

The light emitting member 740 may surround the vein authentication camera 734, the face recognition camera 736, the light sensor 750, and the proximity sensor 760. The light emitting member 740 may be a light emitting panel in a ring shape, arc shape, square shape, rectangle shape, etc. having at least one light emitting diode (LED) to emit light for use with the cameras 730 and the light sensor 750 so as to improve a quality of images captured (e.g., a recognition rate of the face recognition camera 736).

The authentication controller 790 may be provided inside of the case 710 to operate the light emitting member 740 according to a value detected by the light sensor 750. For example, if the light sensor 750 detects a relatively low level of light or a decrease in a sensed intensity level, the light emitting member 740 may be controlled to illuminate more light emitting diodes or to increase an intensity of light emitted. The authentication controller 790 may be wired to the controller C, or have an optional communication module to communicate with the communication module of the controller C of the security assembly 300. The security assembly 300 may control the first and second door locks 301 and 302, along with the first, second, third, and fourth storage locks 303, 304, 305, and 306, based on a verification signal transmitted from the authentication device 700 to the controller C. A wired connection may be more secure than wireless communication via communication modules (e.g., Wi-Fi or Bluetooth modules).

One of the authentication controller 700 and the controller C may be omitted, and one controller (C or 790) may control both the security assembly 300 and the authentication device 700. Such controller C or 790 may be provided in the security panel 310, or alternatively in the authentication device 700.

The display 720, the cameras 730, the light emitting member 740, the light sensor 750, the proximity sensor 760, the microphone 770, and the speaker 780 may be controlled based on a value detected by the proximity sensor 760. For example, if the proximity sensor 760 senses a moving object approaching or that an object is within a predetermined distance or less from the proximity sensor 760, at least one of the cameras 730 or microphone 770 may be turned on and/or operated in a standby mode.

Figure 24:
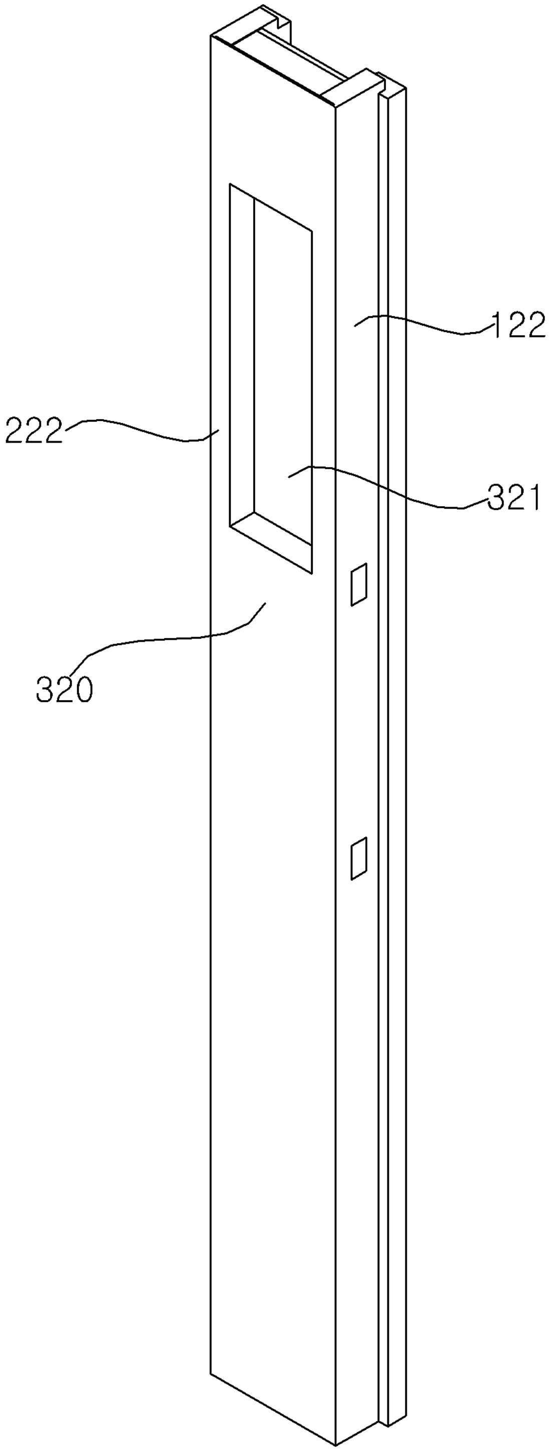
FIG. 24 is a perspective view showing another embodiment of a front panel of the security assembly.

Referring to FIG. 24, the security assembly 300 may be formed integrally with the second door frame 122 and the second storage frame 222. The first plate 320 may be welded or bonded to the second door and storage frames 122 and 222, and the first installation recess 321 may be formed in a front surface of the first plate 320 to receive the authentication device 700. Such an embodiment may be used when a middle structure 25 is omitted or if the structure 10 is otherwise insufficient to support the security assembly 300.

Figure 25:
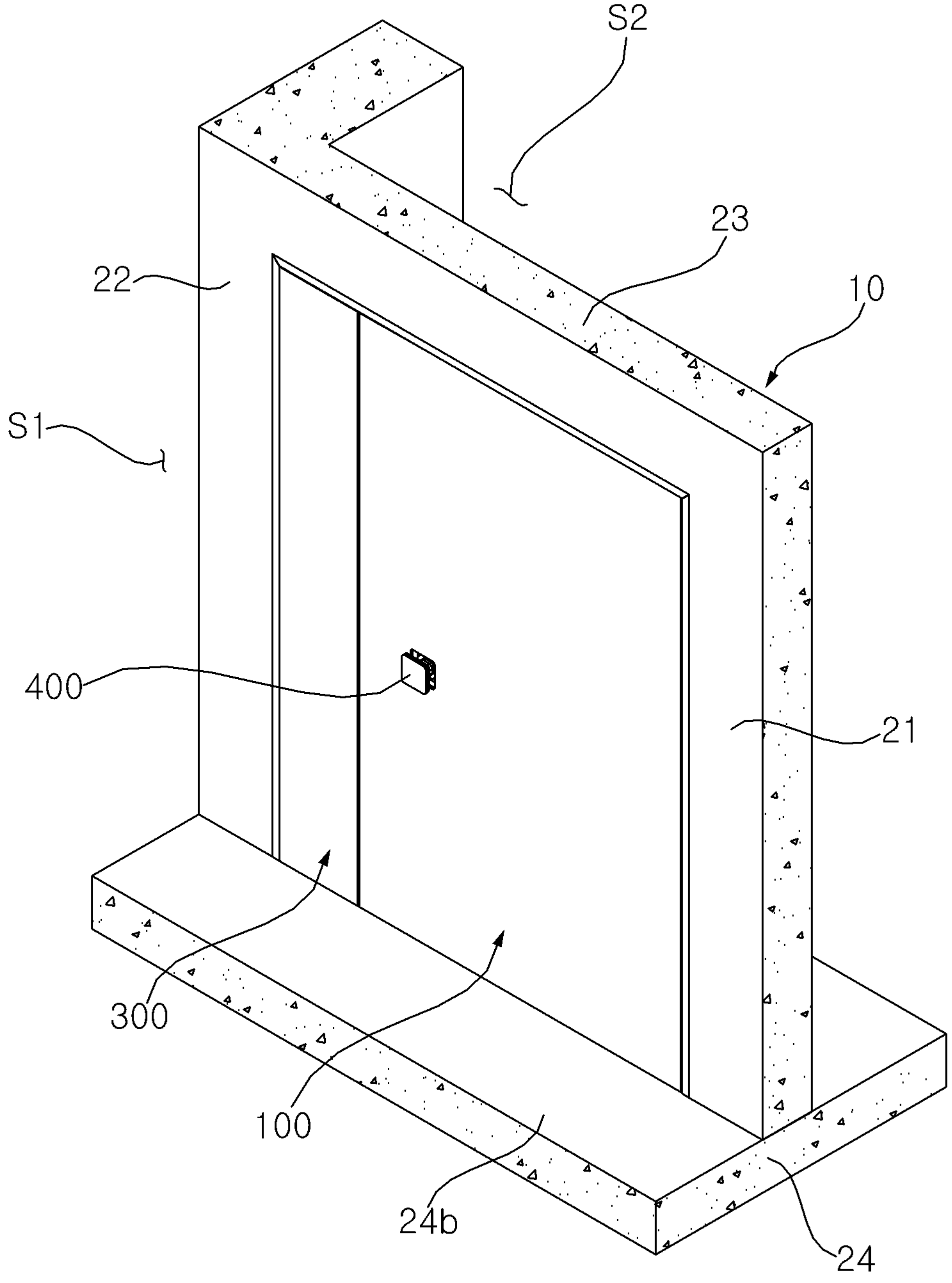
FIG. 25 is a perspective view of a smart gate where the storage assembly is omitted.

Referring to FIG. 25, the storage assembly 200 may be omitted. The smart entryway may primarily have an entrance door assembly 100 configured to be opened and closed and a security assembly 300 provided adjacent to the structure 10 to control an opening and closing of the entrance door assembly 100. Other details and configurations are primarily the same as described with reference to FIGS. 1-23, and a repetitive description will be omitted. The entrance door assembly 100 may be hinged to the structure 10 (at a right side in FIG. 25), while the security assembly 300 may be coupled to the structure at a side opposite to the hinge (at a left side in FIG. 25) to lock and unlock the entrance door assembly 100. The handle 400 may be provided at a side of the entrance door assembly 100 adjacent to the security assembly 300 (i.e., the left side).

The security assembly 300 may include an authentication device similar to the authentication device 700 described with reference to FIGS. 1-23 to authenticate users and a locking device to lock and unlock the entrance door assembly 100 based on a signal received from the authentication device. A controller may be provided in the security assembly 300 to control the authentication device and the locking device.

Figure 26:
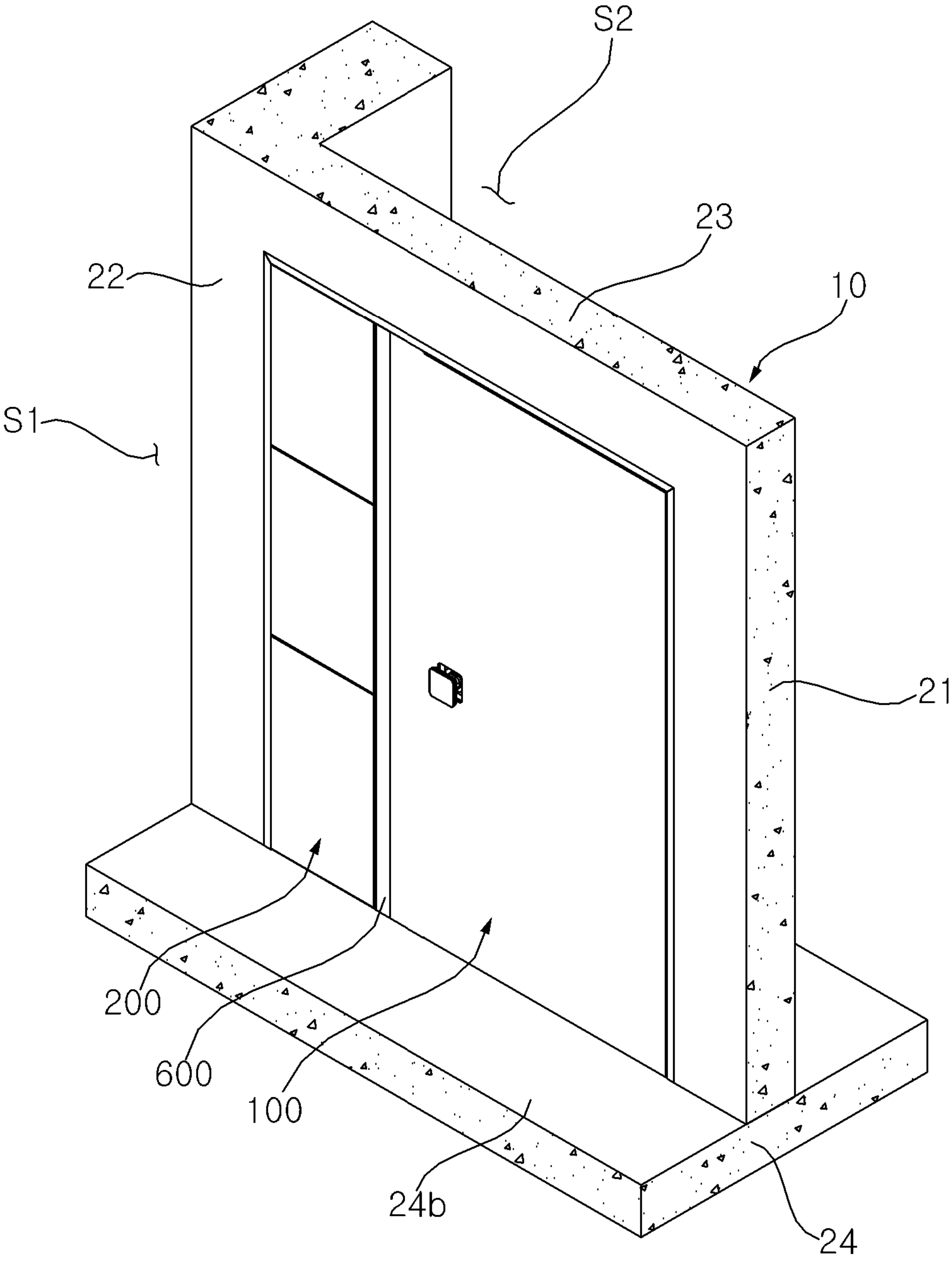
FIG. 26 is a perspective view of a smart gate where the security assembly is omitted.

Referring to FIG. 26, the security assembly 300 may be omitted and replaced with a middle frame 600, and an arrangement of the entrance door assembly 100, storage assembly 200, and structure 10 may be substantially the same as described with reference to FIGS. 1-23. A plurality of locks (e.g., deadbolts) may be provided inside of the middle frame 600 to lock and unlock the entrance door assembly 100 and front doors and/or side doors of the plurality of storage containers 500 of the storage assembly 200. The locks may be locked and unlocked manually from the second space S2, or alternatively may be controlled based on a user input such that the middle frame 600 is similar to the security assembly 300 of FIGS. 1-23 except that there is no authentication device 700.

Figure 27:
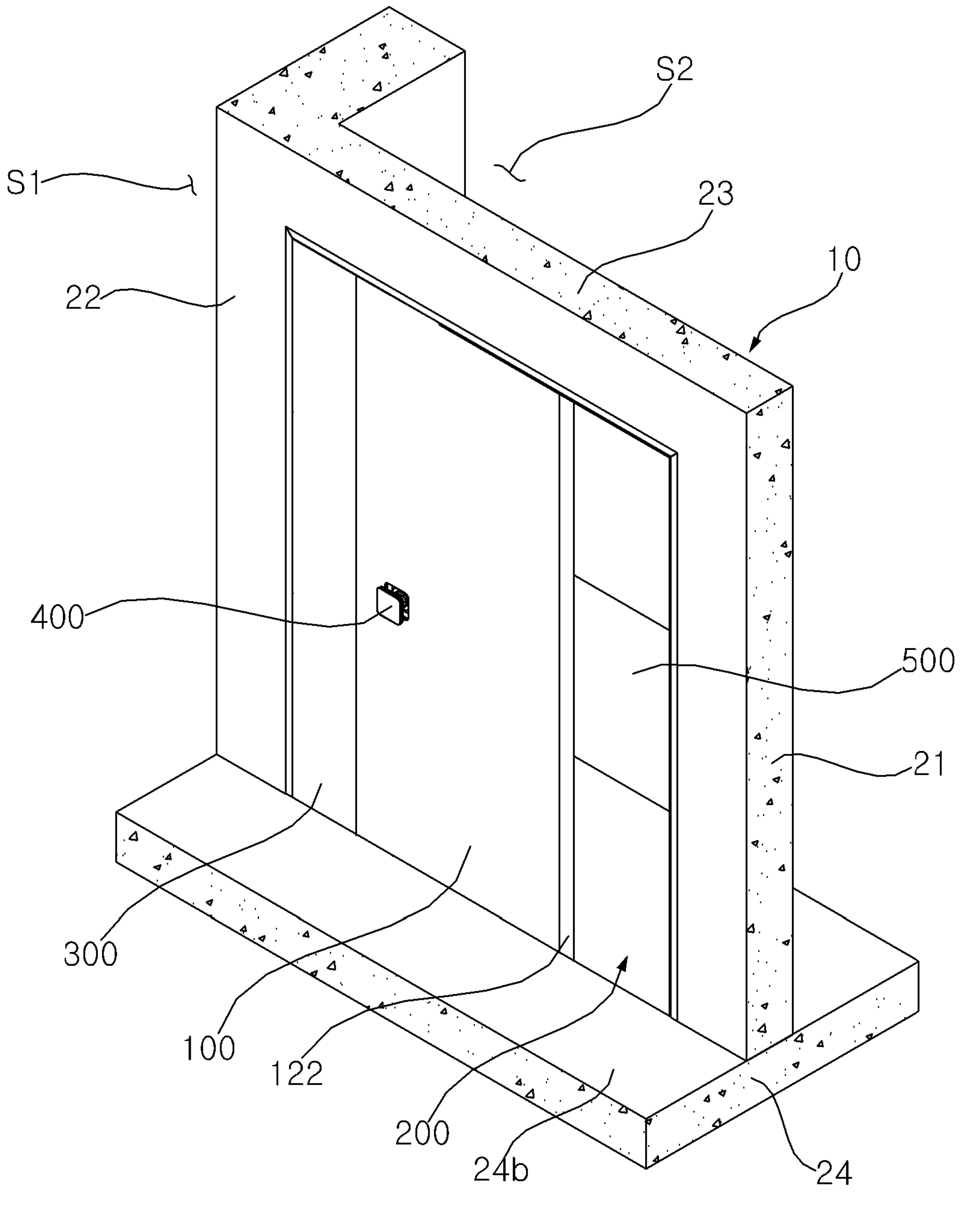
FIG. 27 is a perspective view of a smart gate having an alternative arrangement of the storage assembly and the entrance door assembly.

Referring to FIG. 27, an arrangement of the entrance door assembly 100, the storage assembly 200, and the security assembly 300 may not be limited. For example, the security assembly 300, instead of being provided between the entrance door assembly 100 and the storage assembly 200, may be coupled to the structure 10 at a first (i.e., left) side. One of the entrance door assembly 100 and the storage assembly 200 may be coupled to the structure 10 at a second (i.e., right) side opposite to the first side, and the other of the entrance door assembly 100 and the storage assembly 200 may be provided in the middle. As shown in FIG. 27, the storage assembly 200 may be provided at the right side and coupled to the structure 10.

The second door frame 122 may be adjacent or replace the second storage frame 222 described with reference to FIGS. 1-23. The entrance door assembly 100 may be hinged to the second door frame 122 at a right side, and the security assembly 300 may include an authentication device and a locking device to lock and unlock the door at a left side where a handle 400 may be provided. Another locking device may be installed in the second door frame 122 and/or the structure 10 to lock and unlock the storage assembly 200. Alternatively, there may be a manual locking mechanism (e.g., deadbolt) in the second space S2 to lock and unlock the storage assembly 200.

In yet another alternative embodiment, the entrance door assembly 100 may be formed integrally with the storage assembly 200 to form a unitary door which may be hinged to the structure 10 at the right side. A first storage frame similar to the first storage frame 121 may be provided at the right side of the storage assembly 200, and the first storage frame may be hinged to the structure 10. The security assembly 300 may lock and unlock the entrance door assembly 100. When the entrance door assembly 100 is unlocked, a user may pull or push the handle 400 to rotate the entrance door assembly 100 together with the storage assembly 200. The individual storage containers 500 of the storage assembly 200 may be locked manually via, e.g., deadbolts from the second space S2 or alternatively have a mechanism controlled by a user input.

This application is related to U.S. patent application Ser. No. 17/205,846 filed on Mar. 18, 2021, the entire contents of which are incorporated by reference herein.

Embodiments disclosed herein may provide a smart gate or door having a locking device and an authentication device that is concealed and inaccessible from the outside. The smart gate may include a service slot for repair or replacement of the locking device and the authentication device from the outside. The service slot may be exposed only when an access door is opened and/or when a service cover is removed. The authentication device and the locking device may be installed in a security assembly instead of the access door so as not to damage the structure. The smart gate may have a structure that is difficult to disassemble or access the authentication device and the lock device from the outside.

Embodiments disclosed herein may provide a smart gate or door that authenticates a person in an external space through an authentication device. A concealed locking device may be connected to the authentication device to prevent external intrusion.

Embodiments disclosed herein may provide a smart gate or door having an entrance door assembly to enter and exit an indoor space and a storage assembly to store items from the outside and retrieve items from the inside. The smart gate may include a locking device to lock and unlock the storage assembly and entrance door assembly and an authentication device to authenticate residents and guests who desire to enter the indoor space through the entrance door assembly and also deliverymen who desire to deliver or store items in the storage assembly. The locking device may be controlled based on authentication detected by the authentication device. A controller may efficiently control an operation of the locking device. The locking device and the authentication device may be provided in a security assembly having a security panel.

Embodiments disclosed herein may provide a smart gate or door having a storage assembly with a plurality of storage boxes or compartments. At least one of the storage boxes may be optionally refrigerated or heated via a refrigeration cycle or a thermoelectric cooling module. Each storage box may have an exterior door to be opened and closed from an outside for delivery and an interior door to be opened and closed from an inside for retrieval. A locking device may selective lock and unlock the exterior and interior doors of each storage box, and an authentication device to control a locking and unlocking of at least the exterior doors. The storage assembly may facilitate contactless delivery.

Embodiments disclosed herein may provide a smart gate that can reduce or prevent theft of items stored in a storage assembly. The smart gate may maintain the storage assembly in a locked state after a deliveryman has delivered and stored items in the storage assembly.

Embodiments disclosed herein may provide a smart gate provided with an entrance door assembly that can be accessed by an authenticated user and a storage assembly that can store goods delivered from the outside and an exterior door that can be accessed by authenticated deliverymen.

Embodiments disclosed herein may provide a smart gate or door including a security assembly, which may have an authentication device and a lock device. The security assembly may be separate from the entrance door assembly so as to reduce damage to the structure of the building where the smart gate is installed.

Embodiments disclosed herein may provide a smart gate or door that may allow only one of the entrance door assembly and the storage assembly to be opened to maintain security. Embodiments disclosed herein may provide a smart gate that may enhance aesthetics while performing a combination of various security and storage functions to improve security.

Embodiments disclosed herein may provide a smart gate or door that can be installed in a simple and robust manner and having a plurality of locking devices. The smart gate may be have a large number of security devices without being attached to a fastening member of the door and without providing a significant load on the door.

Embodiments disclosed herein may provide a smart gate or door having at least one storage box or container that may not be arbitrarily accessed by a third party, reducing unintended withdrawals or dispenses from the storage box.

Embodiments disclosed herein may provide a smart gate or door that can secure a passage for escape of a user in the event of a fire by minimizing thermal deformation of a frame. Embodiments disclosed herein may provide a smart gate or door that may ensure a safety and durability of a structure where the smart gate is installed in the event of fire. The smart gate may stably support the structure.

Embodiments disclosed herein may provide a smart gate or door that may minimize a penetration of heat during a fire. The smart gate may have an entrance door assembly for passage and a storage assembly for receiving goods. Embodiments disclosed herein may provide a smart gate or door capable of preventing external intrusion by opening only one of the first box door of the storage box exposed to the outside and the second box door of the storage box exposed to the outside.

Embodiments disclosed herein may provide a smart gate or door capable of selectively opening and closing an access door and a first box door exposed to the outside through locking devices installed in a security assembly.

Embodiments disclosed herein may provide a smart gate or door including an entrance door assembly having an access door and a security assembly having a security panel or box to lock and unlock the access door. A side frame may be provided between the access door and the security panel. A first service slot may penetrate the side frame. When the access door is closed, the service slot may be concealed from an exterior space. The security assembly may include an authentication device to authenticate users and a locking device to lock and unlock the access door. When the access door is opened, the service slot may be exposed for repair of the authentication device or the locking device.

Embodiments disclosed herein may prevent intrusion of outsiders because the service slot for repair or replacement of the locking device and authentication device are shielded from the outside. The service slot may be further concealed by a service cover, and access to outsiders may be further reduced or prevented. The locking device may be concealed by the security panel and may not be accessed from the outside, further reducing a possibility of intrusion. The service cover may allow passage of deadbolts to lock and unlock, but otherwise conceal the rest of the locking device.

Embodiments disclosed herein may provide a security panel or plate on which an authentication device is installed is provided in an opening. An assembly structure may be provided behind the security panel. Since the assembly structure may be coupled to a structure (e.g., building), even if the security panel is disassembled from an outside, external intrusions may be prevented due to the assembly structure. Embodiments disclosed herein may reduce or minimize thermal deformation of a smart entryway even in the event of a fire because the security panel and the assembly structure may be formed of a steel material.

Embodiments disclosed herein may provide a smart gate or entryway that is entirely integrated since an assembly structure may be coupled to an access gate or door assembly provided on one side and a delivery gate or storage box assembly provided on the other side. Embodiments disclosed herein may provide a door frame coupled to one side of the security panel, a box or storage frame coupled to the other side. A back side may be coupled to the assembly structure to block the access of the locking device from the outside. Embodiments disclosed herein may improve security and fire protection performance, since upper and lower ends of the assembly structure may be embedded and installed in the structure such that the assembly structure may not be disassembled from the outside.

Embodiments disclosed herein may provide a smart gate capable of delivering goods in a non-face-to-face manner. Embodiments disclosed herein may provide a smart gate capable of improving security of a security panel in which an authentication device and a locking device are installed. Embodiments disclosed herein may provide a smart gate capable of improving fire protection performance through an assembly structure installed in an opening.

In the embodiments disclosed herein, an unauthorized person may deliver an item to an indoor user through a storage box or assembly in a non-face-to-face manner. Since a security panel on which the authentication device is installed may be in an opening, an assembly structure may be provided behind the security panel, and the assembly structure may be coupled to the structure. Even if the security panel is dismantled from an outside, the assembly structure may prevent external intrusion due to the assembly structure. Since the security panel and the assembly structure may be formed of a steel material, thermal deformation of the smart gate or entryway may be reduced or minimized, even in a case of a fire.

Embodiments disclosed herein may include a structure in which an opening is formed inside, a security panel provided across the opening in a, up and down direction, an access door or door assembly provided in the opening and provided at one side of the security panel, a storage box or storage assembly provided in the opening and provided on the other side of the security panel, and an assembly structure fixed to the structure.

An upper end of the assembly structure may be fixed to a third structure (e.g., ceiling or upper portion of a structure defining a doorway), and the upper end of the assembly structure may protrude upward from or beyond an upper end of the security panel to be embedded. A lower end of the assembly structure may be fixed to a fourth structure (e.g., floor or bottom of a structure defining the doorway), and the lower end of the assembly structure may protrude downward from or beyond a lower end of the security panel.

The assembly structure may be provided at a rear of the security panel, and the assembly structure and the security panel may be coupled. A door frame may be provided between the access door and the security panel, and the door frame and the assembly structure may be coupled. A box frame or storage frame may be provided between the storage box and the security panel, and the box frame and the assembly structure may be coupled. At least a portion of the assembly structure may be provided between the door frame and the box frame.

A first space may be provided in front of the structure, and a second space may be provided behind the opening. The assembly structure may include a first middle portion or front portion provided to face a rear surface of the security panel, a second middle portion or rear portion provided toward the second space, and a connect middle portion or connection portion connecting the first middle portion and the second middle portion.

A structure cover may include a first cover portion covering one side of the assembly structure, a second cover portion covering the other side of the assembly structure, and a third cover portion connecting the first cover portion and the second cover portion and covering the rear surface of the assembly structure.

Embodiments disclosed herein may provide a smart gate or door dividing a first space (i.e., an exterior space provided at the front of a structure where the smart gate is installed) and a second space (i.e., an interior space provided at the rear of the structure). The smart gate may have or border an opening between the first space and the second space. The smart gate may include a security assembly having a security panel and an entrance door assembly having an access door. The security assembly and the entrance door assembly may be provided in the opening.

The access door may be rotatable with respect to the structure to open and close so as to allow or prevent passage between the first space and the second space. A door lock may be provided at the security panel and be configured to lock or unlock the access door. A side frame may be provided between the access door and the security panel.

A first service slot may be formed in the side frame to expose the door lock. When the door is closed, the service slot may be concealed from the first space. A first service cover may be coupled to the side frame to further conceal the service slot. The first service cover may be provided between the access door and the door lock.

The first service cover may be formed with a hole through which a dead bolt of the door lock may penetrate to engage with a locking hole or recess formed in the access door. When the access door is closed, the locking recess may face and align with the hole of the first service cover so that the dead bolt may be inserted through both the locking recess and the hole to lock the access door in the closed position. The first service slot may be hidden from the first space and the second space.

The security panel may include an authentication device, and the door lock may be controlled based on the authentication device. A service opening may be formed through the side frame, and the authentication device may be accessed through the service opening for repair or replacement. When the access door is closed, the service opening may be hidden from the first space. A first service cover may be coupled to the side frame to cover the service opening. The first service cover may also cover the first service slot. The service opening may be hidden from the first space and the second space.

The access door may include a first panel exposed to the first space and a second panel coupled to the first panel and exposed to the second space. The first service cover may be provided between the first panel and the second panel when the door is closed.

The security panel may be coupled to the side frame. The security panel may include a first security panel facing the first space and a second security panel provided behind the first security panel to be closer to the second space. The door lock may be provided between the first security panel and the second security panel.

A first service cover may be assembled to the side frame to close the first service slot. The first service cover may be provided between the first security panel and the second security panel.

An authentication device may be installed in the first security panel. A first installation recess may be provided on or formed in the first security panel. The authentication device may be installed in the first installation recess. A second installation recess or assembly may be provided between the first security panel and the second security panel. The entrance door lock may be installed in the second installation recess. The authentication device may be provided at the front of the first security panel, and the door lock may be provided at the rear of the first security panel.

A storage assembly having at least one storage box or compartment may be provided in the opening and fixed to the structure. The storage assembly may be provided at a side of the security panel that is opposite to a side where the access door is provided.

The storage box may define a storage space, which may be optionally refrigerated or heated via a refrigeration cycle or a thermoelectric cooling module. A box door may open and close the storage space. The box door may be exposed to the first space and formed inside the storage box. A box lock may be provided on the security panel and be configured to lock or unlock the box door.

Another (i.e., a second) side frame may be provided between the box door and the security panel and fixed to the structure. A second service slot may be formed to penetrate the second side frame, and the box lock may be inserted through the second service slot. When the box door is closed, the second service slot maybe concealed from the first space or the second space by the box door. The first service slot and the second service slot may be opened in opposite directions.

A second service cover may be coupled to the second side frame to cover the second service slot. The second service cover may be provided between the box door and the box lock. A hole may be formed to penetrate the second service cover. A dead bolt of the box lock penetrates may penetrate the hole. A locking hole or recess may be formed on the box door. When the box door is closed, the locking recess may face and align with the hole, and the dead bolt may pass through the hole and the locking recess to lock the box door.

The second service slot may be hidden from the first space and the second space. When the box door is closed, the second service cover may face the side of the box door. The authentication device may be provided at the front of the first security panel, and the box lock may be provided at the rear of the first security panel.

The door lock according to the present disclosure may include a door lock dead bolt for locking or unlocking the door, the box door lock may include a box door lock dead bolt for locking or unlocking the box door, the door lock dead bolt and The box door lock dead bolt protrudes in the opposite direction.

Embodiments disclosed herein may provide a smart gate having an authentication device and a locking device, which may be provided between an access door and a storage box. The locking device may selectively lock or unlock the access door and the storage box.

The storage box may have a first box door exposed to an outside and a second box door exposed to an inside. The first and second box doors may be selectively opened and closed to facilitate delivery and retrieval of external articles in a non-face-to-face manner.

Embodiments disclosed herein may provide a door to store delivered items and to allow entry and exit into a building without damaging the structure of the building. An authentication device and a locking device may be installed without damaging the structure of the building.

Embodiments disclosed herein may selectively open and close an access door exposed to the outside through a door lock concealed by a security panel.

Embodiments disclosed herein may selectively open and close a box door exposed to the outside through a box door lock concealed by the security panel.

Embodiments disclosed herein may provide a smart gate provided between a first space at a front and a second space at a rear. The smart gate may have an opening through which the first space may communicate with the second space. The smart gate may include at least one entrance door assembly having an access door opening and closing a part of the opening and preventing communication between the first space and the second space. The entrance door assembly may be coupled (e.g., hinged) to a structure of a building where the smart gate is installed. The entrance door assembly may be coupled to the structure at a first side (e.g., right side) of the opening.

A storage assembly having at least one storage box defining a storage space may be provided in the opening. The storage assembly may be fixed to the structure at a second side (e.g., left side) of the opening. The storage assembly may include a box door to open and close the storage space.

A security assembly having a security panel may be provided between the entrance door and the storage box. An access door lock may be provided on the security panel and be configured to lock or unlock the access door. A box door lock may be provided on the security panel and be configured to lock or unlock the box door.

The door lock may include a door lock dead bolt to lock and unlock the access door. The box door lock may further include a box door lock dead bolt to lock or unlock the box door. The door lock dead bolt and the box door lock dead bolt may protrude in opposite directions.

A door frame may be provided between the access door and the security panel. The door frame may be fixed to the structure. The door frame may include a slot or a through-hole through which the door lock dead bolt may pass to lock or unlock the door. The access door may include a female lock portion (or a lock recess), and the lock recess may mutually engage with the door lock dead bolt, which may also be referred to as a male lock portion.

A storage frame may be provided between the box door and the security panel. The storage frame may be fixed to the structure. The storage frame may include a slot or a through hole through which the box door lock dead bolt may pass to lock or unlock the box door. The box door may include a female locking part (or a lock recess), and the lock recess may mutually engage with the box door dead bolt, which may also be referred to as a male door lock portion.

The security panel may be coupled to at least one of the door frame, storage frame, or structure. The door lock and the box door lock may be provided at a rear of the security panel to be closer to the second space. An authentication device may be provided at a front of the security panel closer to the first space.

A first installation unit or recess may be provided on the front of the security panel. The authentication device may be installed at the first installation unit. A second installation unit or recess may be provided on the rear of the security panel. The door lock and the box door lock may be installed at the second installation unit. The first installation unit may be a concave when viewed from the first space, and the second installation unit may be concave when viewed from the second space.

The security panel may have a connection hole penetrating through the security panel. The access door lock and the box door lock may be connected to the authentication device via cables passing through the connection hole.

A connection plate may be provided on the security panel between the first installation unit and the second installation unit. The connection hole may be formed in the connection plate.

The security panel may include a first mounting portion and a second mounting portion provided below the first mounting portion. The door lock and the box door lock may be mounted in the first and second mounting portions, respectively. The authentication device may be provided above the door lock and the box door lock.

Embodiments disclosed herein may provide a smart gate having a security panel provided between a first side of a structure (or alternatively, a first structure or wall) and a second side of the structure (or alternatively, a second structure or wall). The first and second sides of the structure may face each other. The smart gate may have a first opening formed adjacent to the first side of the structure. An entrance door may be provided between the first side of the structure and the security panel to open and close the first opening. An access door lock may be provided on the security panel. A door frame may be provided between the entrance door and the security panel and fixed to the structure. An access door lock dead bolt may lock or unlock the access door.

The smart gate may have a second opening formed adjacent to the second side of the structure. A storage box may be provided between the second side of the structure and the security panel to open and close the second opening. A box door lock may be provided on the security panel. A storage frame may be provided between the storage box and the security panel and fixed to the structure. A box door lock dead bolt may lock or unlock the storage box.

Embodiments disclosed herein may provide a smart gate or door having an access door to open and close an opening of a structure wherein the smart gate is provided. The smart gate may have a security panel may be provided at a first side of the access door and a locking device to lock and unlock the door.

A storage compartment may be provided at a side of the security panel opposite to a side where the access door is provided. The storage compartment may be optionally refrigerated or heated to preserve perishable delivery items. The locking device may lock and unlock the storage compartment. An authentication device may be provided to authenticate users wishing to lock or unlock the access door or storage compartment. The authentication device and the locking device may be installed in the security panel instead of in the access door or storage compartment so as to prevent or reduce damage to the structure.

Embodiments disclosed herein may provide a smart gate that authenticates a person in an external space through an authentication device facing the external space. A locking device may be connected to the authentication device and operate according to authentication by the authentication device. The locking device may be hidden and not easily accessed from the first space by being provided behind a security panel configured to prevent or reduce external intrusion. The security panel and the locking device may be part of a security assembly.

The smart gate may also include an entrance door assembly configured to allow users to enter an internal space blocked by the smart gate and a storage assembly configured to allow users to store and retrieve items without going into the internal space.

The security panel may be coupled to the entrance door assembly and the storage assembly. The locking device may be configured to selectively lock or unlock at least one of the entrance door assembly or a door to the storage assembly. A controller may control the locking device based on an operation of the authentication device.

Since the security assembly may be coupled to the entrance door assembly and the storage assembly, it may be difficult to disassemble the security assembly, thereby improving securing, and the security assembly may be installed without damaging a structure of the building.

The entrance door assembly may include an access door and a door frame surrounding the access door. The door frame may be provided between the access door and the security panel and fixed to the structure. The security panel may be coupled to the door frame.

The storage assembly may include at least one storage box and a storage frame surrounding the storage box. The storage frame may be provided between the storage assembly and the security panel and fixed to the structure. The security panel may be coupled to the storage frame.

The authentication device may be provided at a front of the security panel to face the external space. The locking device may be provided at a rear of the security panel to be shielded by the external space via the security panel.

A first installation unit or recess may be provided on the front of security panel for the authentication device. A second installation unit or recess may be provided on the rear of the security panel for the locking device.

A connector may include a connecting plate or panel and a connecting hole penetrating through the connecting plate. The locking device may be connected to the authentication device through a cable passing through the connecting hole.

The connecting plate may constitute a part of the security panel and be provided between the first installation unit and the second installation unit. The connecting hole may be formed in the connecting plate. The connecting plate may extend horizontally, and the authentication device may be supported by the connecting plate. The second installation unit may be provided below the first installation unit. At least part of the first and second installation units may overlap.

A second door frame may be provided between the entrance door and the security panel and fixed to the structure. A second storage frame may be provided between the storage compartment and the security panel and fixed to the structure. An installation groove may be formed in at least one of the second door frame or the second storage frame. The authentication device may be inserted into the installation groove and supported by the installation groove. Since the authentication device may be fitted and assembled to the second door frame and the second storage frame, installation may be easy.

The installation groove may include a first installation groove formed in the second door frame and into which one side of the authentication device may be inserted and a second installation groove formed in the second storage frame and into which the other side of the authentication device may be inserted.

A cover member may cover the authentication device and the security panel. One side of the cover member may be coupled to the second door frame, and the other side of the cover member may be coupled to the second storage frame.

The structure may further include a middle structure provided in the vertical direction. The middle structure may be provided on the second space side with respect to the security panel, and the security panel may be fixed to the middle structure. Since the security panel may be fixed to the middle structure, it may be difficult to dismantle the security panel from the outside, thereby securing more robust indoor security.

Embodiments disclosed herein may be implemented as a smart gate having an access door that may open and close an opening formed in a structure may where the smart gate is installed, at least one storage box provided on one side of the access door to store an object, a security panel provided between the access door and the storage box, and a locking device provided on the security panel to lock at least one of the access door and the storage box. The access door, the storage box, and the security panel may partition a first space located in front of the structure and a second space located behind the structure.

The security panel may be provided with an authentication device to confirming whether a person is authorized to access the access door or the storage box and a controller to receive a signal from the authentication device and control an operation of the locking device based on the received signal.

There may be a plurality of storage boxes used for different purposes. For example, one storage box may be large to accommodate large packages. Another storage box may be refrigerated to keep grocery items cold. Another storage box may be heated to keep delivery food warm. Embodiments disclosed herein are not limited. The access door, the storage box, and the security panel may be provided to have substantially the same height, and respective front surfaces may lie on the same plane.

A first door frame may connect to the structure and may be vertically installed between the entrance door and the security panel. The access door may be provided between a first sidewall of the structure and the first door frame, and may be rotatably connected (e.g., hinged) to the first sidewall.

A first storage frame may connect to the structure and may be vertically installed between the storage box and the security pane. The security panel may be provided and fixed between the first door frame and the first storage frame. The security panel may include a front panel made of a high strength material, and the locking device and the controller may be provided at a rear of the front panel.

A front part of the storage box may be provided between a second side wall of the structure and the first storage frame spaced apart and may be fixed to the first storage frame. The storage box may be spaced apart from the first sidewall.

The storage box may include a container having a front opening and/or a rear or side opening. The container may form an accommodation or storage space therein. A first box door may open and close the front opening. A second box door may open and close the rear or side opening.

The locking device may be installed in the security panel and include a first box door lock to lock the first box door and a second box door lock to lock the second box door. The rear opening may be formed at a side of the box body adjacent to the access door. The first box door may be opened from the external space, while the second box door may be opened from the internal space.

Any one of the storage box and the security panel may be omitted. The security panel may alternatively be provided on one side of the entrance door, the storage box may be provided on the other side of the entrance door, and the first storage frame may be provided between the entrance door and the storage box. The access door may be hinged to the first storage frame.

Embodiments disclosed herein may be implemented as a smart gate or smart door having an entrance door assembly to allow entrance through the smart gate and a storage assembly to allow temporary storage of items and contactless delivery. The storage assembly may include at least one storage box. The storage box may include a storage container having a storage space there. A first box door may be provided on a front of the container to open and close a front opening of the container. The front opening may communicate with the storage space, and the first box door may be accessed from an outside space of the smart gate.

The smart gate may include a security assembly configured to lock and unlock the entrance door assembly and the storage assembly. The security assembly may include a security panel. A box door lock that locks the first box door may be installed in the security panel to prevent unauthorized access into the storage space.

An authentication device may be provided so that the first box door may be accessible only to an authorized person. The box door lock may be controlled to be opened based on authorization by the authentication device, and an unauthorized person may not arbitrarily dispense objects into the storage box or withdraw objects from the storage box.

The storage box may be provided with a second box door provided on a rear or side of the container that opens and closes a rear or side opening of the container. The rear opening may communicate with the storage space, and the second box door may be accessed from an internal side or resident side of the smart gate. A storage box door lock may lock the second box door, so that the rear opening may be opened and closed. The storage box door lock may be configured to lock the second box door when the first box door is unlocked via the box door lock, reducing a possibility that a third party may see into or enter into the internal space.

Embodiments disclosed herein may provide a smart gate having a storage assembly and an entrance door assembly installed separately from the storage assembly. A security assembly to lock and unlock the entrance door assembly and storage assembly may be further installed separately. The entrance door assembly may have a door frame surrounding an access door hinged to the door frame to open and close. The storage assembly may include a storage frame surrounding at least one storage box. The security assembly may include a security panel coupled to the box and door frames. An optional front frame or trim may be provided in front of the box and door frames to further increase fire protection.

The smart gate may be between a first sidewall of a structure of a building and a second sidewall facing the first sidewall. A general opening may be formed between the first sidewall and the second side wall. The general opening may include first, second, and third openings. The first opening may be defined by the door frame, which may be provided adjacent to the first sidewall. The second opening may be defined by the storage frame, which may be provided adjacent to the second sidewall. The third opening may be provided between the box and door frames. The access door may fill the first opening, the storage box may fill the second opening, and the security panel may fill the third opening.

The structure may include an upper wall or ceiling connecting the first side wall and the second side wall and a bottom wall or floor provided below the opening and connecting the first side wall and the second side wall. At least a part of the door frame may support the upper wall and the bottom wall.

The door frame may include a first door frame in close contact with the first side wall, a second door frame in close contact with the security panel, a third door frame in close contact with the upper wall to support the first door frame and the second door frame, and an optional fourth door frame in close contact with the bottom wall.

The storage frame may include a first storage frame in close contact with the security panel, a second storage frame in close contact with the second sidewall, a third storage frame in close contact with the upper wall to support the first storage frame and the second storage frame, and an optional fourth storage frame in close contact with the bottom wall.

The storage box further may include a box door that opens and closes an interior space. The box door may be hinged to the second door frame, the third door frame, or a container forming the storage box.

The security panel may be coupled to the second door frame and the first storage frame. The second door frame and the first storage frame may face each other. The third door frame and the third storage frame may be aligned to form a continuous upper frame or panel. The third door frame and the third storage frame may be provided at the same height. The fourth door frame or the fourth storage frame may be in close contact with the bottom wall or embedded in the bottom wall. A front frame may be provided in front of the door frame and the storage frame and cover the door frame and the storage frame with respect to an external space.

Embodiments disclosed herein may provide a smart gate that partitions external and internal spaces while being secured to and supporting a structure of the building in which the smart gate is installed. Since a door frame and a storage frame may be provided in an opening of the smart gate to support an upper side and a lower side of the structure, heat deformation of the box and door frames may be minimized in case of fire, and an escape passage may be secured. Since an entrance door and a door frame may shield a first opening through which a person may pass, and a storage box and a storage frame may shield a second opening through which an item may be delivered, heat may be less likely to penetrate into a room or internal space during a fire.

Embodiments disclosed herein may include a smart gate having a locking device concealed from an outside. Embodiments disclosed herein may have an advantage of preventing or reducing intrusion of outsiders because a service slot for repair or replacement of the locking device may be also concealed from the outside. A service cover may have service slots. Since the service cover may not be exposed to the outside, intrusion of outsiders may be prevented or reduced. Since the service slot may be exposed only when an access door is opened, access to outsiders may be reduced.

Embodiments disclosed herein may provide a locking device shielded by an access door and can be inserted or withdrawn only through a service slot. The locking device may have an advantage in that the configuration of the locking device may be not exposed to the outside at all, because a dead bolt may protrude toward the entrance door through a hole of a service cover. The service cover may simultaneously cover a service opening for installation of the door lock and/or an authentication device. The service cover may be located between a first panel and a second panel constituting an access door, and the service cover can be accessed only by opening the access door. Since the door lock may be installed between the first security panel and the second security panel formed of a metal material, the door lock can be accessed only by removing the service cover. The door lock may be installed through one side of the security assembly, and a box door lock may be installed through the other side. The security panel may operate the box and door locks in both directions.

Embodiments disclosed herein may be provide a storage gate having an authentication device and a lock device provided between a door and a storage box to selectively lock or unlock the door, provided on one side, and a box door of the storage box, provided on the other side. Embodiments disclosed herein may selectively open a first box door exposed to an outside through an authentication device, and selectively open a second box door exposed to an inside through which goods may be received in a non-face-to-face manner.

Embodiments disclosed herein may have an advantage of providing a storage assembly to store goods delivered from the outside and a door that can be accessed by the user without damaging the structure of the building. An authentication device and a locking device may be installed on a security panel without damaging the structure of the building.

Embodiments disclosed herein may have the advantage of opening and closing an access door exposed to the outside via a door lock concealed in a security panel, and selectively opening and closing a box door via a box door lock concealed in the security panel. Since the door lock and the box door lock may be installed in the security panel, a door lock dead bolt and a box door lock dead bolt may protrude in opposite directions and may selectively lock or unlock the access door or the box door.

Since the dead bolt of the access door may penetrate a door frame to lock or unlock with the access door, the lock of the access door may be more secure. Since the door lock deadbolt and the box door lock deadbolt may be operated in the security panel and pass through various slots or holes in the door and storage frames and the door and box to lock and unlock the door and box. The locks may be operated such that only one door or box door may be opened at a time. The door and box locks may be provided at a rear of the security panel away from an external space and closer to an internal space so as to be concealed from the outside.

Embodiments disclosed herein may provide an access door and a storage box that are selectively locked by a door lock and box lock. The door and box locks may be provided at a rear of a security panel to be concealed, while an authentication device may be provided at a front of the security panel. The door and box locks may be connected to an authentication device through a cable arranged to pass through the security panel, and a connection length of the cable can be minimized. The authentication device may be provided above the access door and box locks to better determine or recognize a user's face.

Embodiments disclosed herein may provide a smart gate having an authentication device to authenticate users in an external space and a locking device connected to the authentication device that is separated from the external space by a security panel, thereby preventing or reducing external intrusion. The security assembly may be coupled to an access door or gate and a storage compartment or assembly, and it may be difficult to dismantle the security assembly, thereby securing an internal or residential space. There may be an advantage in that the security assembly may be installed without damaging the structure of the building.

The security panel may be formed of a metal material. Since the authentication device may be provided in front of the security panel and the locking device may be provided behind the security panel, security of the internal space can be secured. When viewed from the outside the locking device may be hidden by the security panel, and there may be an advantage that the locking device cannot be accessed from the outside. A cable may be connected to the authentication device through a connection hole of the security panel, and there may be an advantage that the authentication device and the locking device may be connected in a structure separate from the security panel. At least a portion of a first mounting portion or recess and a second mounting portion or recess may overlap with respect to a front-rear direction, and there may be an advantage of minimizing a front-rear thickness of the security assembly.

The authentication device may be fitted and assembled to a door frame and a storage frame, and so the authentication device may be easy to install. Since the security panel may be fixed to a middle structure, it may be difficult to dismantle the security panel from an outside, improving security.

Embodiments disclosed herein may provide a smart gate having a door, a security panel or box, and storage boxes for storing objects arranged adjacent to each other in an opening of a structure (e.g., wall) of a building. It may be possible to easily install the smart gate, and the smart gate may have a simple aesthetic while performing a variety of complex functions. Since the storage boxes may be arranged and positioned to have a same overall height as the door, several storage boxes with various uses may be installed, and sufficient storage space can be ensured.

An authentication device, a locking device, and a controller may be centrally installed inside the security panel. Devices may be directly connected to each other through a cable, and the possibility of hacking may be reduced, and a locking device can be safely controlled even in a fire. The devices can be easily installed in a gate. The security panel may improve security because a high-strength front panel may be provided in front of the locking device and the controller.

A first door frame fixed to the structure may be installed between the door and the security panel, and a first storage frame may be installed between the storage boxes and the security panel. The storage boxes and the security panel may be secured inside the structure.

Box and door frames may support upper and lower sides of the structure, and heat deformation of the first box and door frames may be minimized in case of fire, securing a passage for escape. Since the door and storage frames provided in the opening of the structure respectively support the structure, the structure may be safer and more stable in the event of a fire.

Embodiments disclosed herein may have an advantage in minimizing thermal deformation during fire because the door frame and the storage frame may be separately installed, and the storage box and the door may be separately installed.

A front frame may be provided in front of the door frame and the storage frame to shield a connection of the door frame and the storage frame, which may be vulnerable or weak. Embodiments disclosed herein may have an advantage in delaying penetration of external heat into an interior space.

The front frame may be formed of a material having low thermal conductivity, and embodiments disclosed herein may have an advantage of minimizing heat transfer to the room during an external fire.

The front frame may include an inner frame coupled to the box and door frames and an outer frame coupled to the front surface of the inner frame. The outer frame may be made of a material having low thermal conductivity, and the inner frame may be made of a material that may be easy to manufacture.

Embodiments disclosed herein may be implemented as a smart entryway comprising a door assembly having a door configured to open or close a first section of a doorway to allow ingress or egress between an exterior space and an interior space, a storage assembly having a first container and a storage door in the second section of the doorway, the storage door configured to be opened or closed for allowing or preventing access to the first container from the exterior space and the interior space, and a security panel provided in a third section of the doorway between the first and second sections, the security panel having a locking device. The lock assembly may include a first lock configured to protrude into the door and a second lock configured to protrude into the storage door.

The entrance door assembly may include a door frame configured to be fixed to the doorway. The door may have a first side rotatably coupled to the door frame and a second side configured to engage with the first lock. The security panel may be coupled to the door frame. The door frame may be fixed to a top of the doorway and to a first side of the doorway, the door may be hinged to a first section of the door frame that may be fixed to the first side of the doorway, and the door frame may surround the door.

A base may be provided below the entrance door assembly, security panel, and the storage assembly. A bottom section of the door frame may be fixed to the base.

The first lock may have a door bolt configured to protrude into the door. A first side of the security panel may include a door lock passage that aligns with the first lock. The door may be formed with a bolt recess that aligns with the first lock and the door lock passage when the door is closed. The bolt recess may have a size configured to allow insertion of the door bolt. A second side of the door frame may be formed with a door lock hole that aligns with the bolt recess, the door lock passage, and the first lock when the door may be closed. The door bolt may be configured to protrude outside of the security panel to be inserted through the door lock passage, the door lock hole, and the bolt recess to lock the door.

A door lock service cover may be configured to be coupled to and removed from the second side of the door frame. The door lock service cover may have a bolt hole configured to align with the bolt recess when the door is closed. The door lock hole may have a size configured to allow access to the first lock. The door lock passage may have a size configured to allow access to the first lock. The bolt hole may have a size configured to allow insertion of the door bolt but not to expose the first lock such that, when the door lock service cover is coupled to the second side of the door frame, a remaining portion of the first lock not including the door bolt may be covered by the door lock service cover.

The storage assembly may include a storage frame configured to be fixed to the doorway. The storage door may have a first side rotatably coupled to the first container and a second side configured to engage with the second lock. The storage door may be rotated to open or close the first container to allow access to the second section of the doorway from the exterior space.

The storage frame may be coupled to the security panel. The storage frame may be fixed to a top of the doorway and to a second side of the doorway. The storage door may be hinged to the first container at a side that may be closer to the second section of the doorway than the first section of the doorway, and the storage frame may surround the storage door.

A base may be provided below the entrance door assembly, security panel, and the storage assembly. A bottom section of the storage frame may be fixed to the base.

The second lock may have a storage bolt. A second side of the security panel may include a storage lock passage that aligns with the second lock when the storage door is closed. The storage door may be formed with a bolt recess that aligns with the second lock and the storage lock passage when the storage door is closed. The bolt recess may have a size configured to allow insertion of the storage bolt. A second side of the storage frame may be formed with a storage lock hole that aligns with the bolt recess, the storage lock passage, and the second lock. The storage bolt may be configured to protrude outside of the security panel to be inserted through the storage lock passage, the storage lock hole, and the bolt recess to lock the storage door.

A storage lock service cover may be configured to be coupled to and removed from the second side of the storage frame. The storage lock service cover may have a bolt hole configured to align with the bolt recess when the storage door is closed. The storage lock hole may have a size configured to allow access to the second lock, the storage lock passage may have a size configured to allow access to the second lock, and the bolt hole may have a size configured to allow insertion of the storage bolt but not to expose the second lock such that, when the storage lock service cover is coupled to the second side of the storage frame, a remaining portion of the second lock not including the storage bolt may be covered by the storage lock service cover.

The first container may have a retrieval door provided behind the security assembly and the storage frame and having a first side rotatably coupled to the first container and a second side configured to engage with a third lock. The retrieval door may be rotated to open or close the first container to allow access to the second section of the doorway from the interior space. The third lock may be controlled based on whether the second lock is locked or unlocked such that, when the second lock is unlocked, the third lock may be locked. The retrieval door may be provided at a sidewall of the first container so as to be perpendicular to the storage door.

The storage assembly may include a second container having a storage door configured to be opened or closed from the exterior space. When the door of the door assembly is closed and the storage doors of the first and second containers are closed, the door and the storage doors lie on a same plane. At least one of the first or second containers may include a thermoelectric cooler or a refrigeration assembly.

An authentication sensor may be provided, and a first controller may determine whether a person in the exterior space is a primary user or a secondary user. When the authentication controller confirms the person to be a primary user, the authentication controller allows at least one of ingress to the interior space through the door or access to the first container. When the authentication controller confirms the person to be a secondary user, the authentication controller allows access only to the first container. A second controller may receive a signal from the first controller and control the first and second locks based on the received signal.

Embodiments disclosed herein may be implemented as a smart entryway comprising an access door installed in a doorway and configured to open or close for allowing or preventing passage between an interior space and an exterior space, a storage container installed in the doorway and having a storage space and a container door configured to open or close for allowing and preventing access to the storage space from the exterior space, a frame provided between the access door and the storage container and fixed to a top of the doorway, and a lock configured to lock or unlock at least one of the access door or the container door. The access door, the storage container, and the frame fill the doorway.

Embodiments disclosed herein may be implemented as a smart entryway comprising an access door installed in a doorway and configured to open or close for allowing and preventing passage between an interior space and an exterior space, a security assembly installed in the doorway and having a security panel, a lock coupled to a rear surface of the security panel and configured to lock or unlock the access door, an authentication interface coupled to a front surface of the panel to determine whether a person in the exterior space is authorized to enter the interior space and to transmit a signal, and a controller configured to receive the transmitted signal from the authentication interface and to operate the lock based on the transmitted signal. A frame may be fixed to a top of the doorway and provided between the access door and the security assembly.

Embodiments disclosed herein may be implemented as a smart entryway configured to be installed in a doorway comprising a security panel having a first side and a second side opposite to the first side, an entrance door assembly provided at the first side of the security panel and having an access door configured to open or close a first space of a doorway, the access door being formed with a door lock recess, a storage assembly provided at the second side of the security panel and having a storage door configured to open or close a second space of the doorway, the storage door being formed with a storage lock recess, and a door lock having a door bolt and provided inside of the security panel. The door bolt may be configured to move in a first horizontal direction to protrude out of the first side of the security panel and engage with the door lock recess to lock the access door. The door bolt may be configured to move in a second horizontal direction opposite to the first horizontal direction to withdraw from the door lock recess and unlock the access door. The smart entryway may further comprise a storage lock having a storage bolt and provided inside of the security panel. The storage bolt may be configured to move in the second horizontal direction to protrude out of the second side of the security panel and engage with the storage lock recess to lock the storage door. The storage bolt may be configured to move in the first horizontal direction to withdraw from the storage lock recess and unlock the storage door.

The entrance door assembly may include a door frame configured to be fixed to a doorway and provided between the access door and the security panel. The door frame may include a door lock passage provided at a position configured to align with door lock recess when the access door is closed and the door bolt in the first and second horizontal directions. The security panel may be fixed to the door frame, and the door bolt and storage bolt may be deadbolts.

The storage assembly may include a storage frame configured to be fixed to the doorway and provided between the storage door and the security panel. The storage frame may include a storage lock passage provided at a position configured to align with the storage lock recess when the storage door is closed and the storage bolt in the first and second horizontal directions.

An authentication interface may be coupled to the security panel and configured to determine whether a person at a front side of the security panel is authorized to open at least one of the access door or the storage door.

The security panel may include a first plate having a front recess recessed rearward from a front surface and a rear recess recessed forward from a rear surface. The front recess may have an inner contour corresponding to an outer contour of the authentication interface so as to be configured to receive the authentication interface. The door lock and the storage lock may be coupled to the rear surface at the rear recess.

The rear surface of the first plate may include a first ledge and a second ledge extending in the first and second horizontal directions. The first ledge may be configured to support the door lock and the second ledge may be configured to support the storage lock. The first ledge may provide a first passage above the first ledge through which the door bolt passes and the second ledge may provide a second passage above the second ledge through which the storage bolt passes. A back surface of the front recess may be provided behind a front surface of the rear recess such that the front and rear recesses at least partially align in a vertical direction.

A second plate may be coupled to the first plate and provided at a rear of the first plate. The door lock and storage lock may be provided between the first plate and the second plate.

A connection hole may penetrate the first plate and a cable may pass through the connection hole to couple the door lock and the storage lock to the authentication interface. The first plate may be bent to form a connection plate extending in the first and second horizontal directions and provided between the first recess and the second recess, and the connection hole may be formed in the connection plate. The first recess may be provided above the second recess such that the connection plate supports a bottom of the authentication interface.

A transparent cover may be coupled to the first plate and provided at a front of the first plate such that the authentication interface may be provided between the transparent cover and the first plate.

Embodiments disclosed herein may be implemented as a smart entryway comprising a first plate having a front recess facing a front space and a rear recess facing a rear space, an entrance door assembly coupled to a first side of the first plate and having a door configured to allow passage between the front and rear spaces, a storage assembly coupled to a second side of the first plate and having a container configured to allow storage of an item from the front space and retrieval of the item from the rear space, a door lock provided in the rear recess and configured to lock or unlock the door of the entrance door assembly, a storage lock provided in the rear recess and configured to lock or unlock the container of the storage assembly, an authentication interface provided in the front recess and configured to determine whether a person in the front space is authorized to store an item in the storage assembly or to access the rear space, the door lock and storage lock being controlled based on a determination by the authentication interface, and a front cover coupled to a front of the first plate to cover the authentication interface. When the access door of the entrance door assembly is locked and the container of the storage assembly is locked, the storage lock and door lock are concealed from the front space. Edges of the front cover may lie flush with front surfaces of the entrance door assembly and the storage assembly when the access door and container are locked.

A second plate may be coupled to a rear of the first plate to cover the door lock and the storage lock. The door lock may include a door bolt configured to protrude out of a first gap formed between the first and second plates. The storage lock may include a storage bolt configured to protrude out of a second gap formed between the first and second plates.

The door of the entrance door assembly may include a door lock recess such that, when the door bolt is inserted into the door lock recess, the door may be locked. The container may include a storage lock recess such that, when the storage bolt is inserted into the storage lock recess, the container may be locked.

The storage assembly may include a storage door provided at a front of the container and configured to be locked and unlocked by the storage lock, a retrieval door provided behind the first plate so as to be accessible only from the rear space, and a retrieval lock provided adjacent to the retrieval door and configured to lock or unlock the retrieval door.

The entrance door assembly may include a door frame fixed to a doorway and the first plate and surrounding the door. The door may be hinged to the door frame so as to rotatably open or close for passage between the front and rear spaces. The storage assembly may include a storage frame fixed to the doorway and the first plate and surrounding the storage container. A front trim may be provided in front of the door frame and the storage frame so as to at least partially shield the door frame and the storage frame from the front space.

Embodiments disclosed herein may be implemented as a smart entryway comprising a plate, an authentication sensor, a first lock, a first cable, a first bolt, and a first door assembly. The plate may have a front recess facing a front space and recessed rearward, a rear recess facing a rear space opposite to the front space and recessed forward, the rear recess being provided below the front recess, a connection plate forming a bottom surface of the front recess and a top surface of the rear surface, the connection plate being formed with a connection hole, and a first ledge extending horizontally across the rear recess from a first side. The authentication sensor may have at least one of a camera, fingerprint sensor, barcode scanner, QR scanner, microphone, number pad, or keyboard provided in the front recess and supported by the connection plate. The first lock may be provided in the rear recess and supported by the first ledge. The first cable may penetrate the connection hole and connect the authentication sensor and first lock to transmit a first signal from the authentication sensor. The first bolt may be provided in the first lock and be configured to move horizontally out of or into the rear recess based on the first signal transmitted from the authentication sensor. The first door assembly may be coupled to the first side of the plate and have a first door. The first bolt may be configured to engage with or withdraw from the first door assembly to lock or unlock the first door to prevent or allow passage between the front space and the rear space.

A second ledge may extend horizontally across the rear recess from a second side. A second lock may be provided in the rear recess and supported by the second ledge. A second cable may penetrate the connection hole and connect the authentication sensor and second lock to transmit a second signal from the authentication sensor. A second bolt may be provided in the second lock and configured to move horizontally out of or into the rear recess based on the second signal transmitted from the authentication sensor. A second door assembly may be coupled to the second side of the plate and have a second door. The second bolt may be configured to engage with or withdraw from the second door assembly to lock or unlock the second door.

Embodiments disclosed herein may be implemented as a smart door comprising a door assembly having a door and a door frame surrounding the door, the door having a first side hinged to the door frame and a second side opposite to the first side, a security panel provided adjacent to the door frame, a door lock opening formed in the second side of the door, a door lock slot formed in the door frame at a position aligning with the door lock opening when the door is closed, and a door lock provided in the security panel and configured to lock or unlock the door, the door lock including a bolt configured to be inserted into or withdrawn from the door lock opening and the door lock slot. When the door is closed, the door lock opening, the door lock slot, and the bolt of the door lock may be concealed.

A first service cover may be configured to be coupled to or removed from the door frame at a position where the door lock slot is provided and configured to be covered by the door when the door may be closed. The first service cover may include a door lock hole configured to align with the door lock slot and door lock opening when the door is closed such that the bolt of the door lock passes from the security panel through the door lock slot, the door lock hole, and the door lock opening to lock the door, while a remainder of the door lock slot and door lock may be covered.

An authentication interface may be provided at a front of the security panel. A service opening may be formed through the door frame at a position aligning with a side of the authentication interface and provided above or below the door lock slot such that the side of the authentication interface may be exposed through the service opening when the door may be opened.

A first service cover may be configured to be coupled to and removed from the door frame at a position where the service opening may be provided to close the service opening such that, when the door is opened, the authentication interface may be concealed by the first service cover, the first service cover being configured to not interfere with an insertion of the bolt into the door lock opening, and when the door is closed, the first service cover may be covered by the door.

The door may include a first panel and a second panel provided behind the first panel. The first panel may include a front plate and first and second side plates that are bent from the front plate. The door lock opening may be formed in the second side plate.

A display panel may be provided between the first panel and the second panel. A display may be supported by the display panel. The second panel may include a transparent material such that the display may be viewable from a rear of the second panel.

The security panel may be fixed to the door frame. The security panel may include a first plate and a second plate provided behind and coupled to the first plate, and the door lock may be provided between the first plate and the second plate.

An authentication interface may be provided. The first plate may have a front surface, a rear surface, a first recess that may be recessed rearward from the front surface, and a second recess that may be recessed forward from the rear. The authentication interface may be provided in the first recess, and the door lock may be provided in the second recess.

A cable may connect the authentication interface and the door lock. The first recess may be provided above the second recess. The first and second recesses may be formed by bending the first plate such that a connection plate extends horizontally between the first and second recesses. The connection plate may have a hole through which the cable passes.

At least one container may define a storage space. The container may have a front surface, a rear surface opposite to the front surface, and a side surface connecting the front and rear. The rear surface and at least a portion of the side surface may be provided behind the security panel. A storage frame may surround the container. A first opening may be provided in the front surface and communicate with the storage space. A second opening may be provided in the rear surface or the side surface. The second opening may be provided behind the security panel and communicating with the storage space. A first container door may be hinged to the container to open or close the first opening. The first container door may have a first side and a second side opposite to the first side, the second side facing the security panel. A second container door may be hinged to the container to open or close the second opening. A first storage lock opening may be formed in the second side of the first container door. A first storage lock slot may be formed in the storage frame at a position aligning with the first storage lock opening when the first container door is closed. A first storage lock may be provided in the security panel and configured to lock or unlock the first container door. The first storage lock may have a first bolt configured to be inserted into or withdrawn from the first storage lock slot and the first storage lock opening. When the first container door is closed, the first storage lock opening, first storage lock slot, and the bolt of the first storage lock are concealed.

A second storage lock opening may be formed in the second container door. A second storage lock may be provided in the container. The second storage lock may have a bolt configured to be inserted into or withdrawn from the second storage lock opening. When the bolt of the first storage lock is withdrawn from the first storage lock opening such that the first storage lock may be unlocked, the bolt of the second storage lock may be inserted into the second storage lock recess opening that the second storage lock may be locked.

A second service cover may be configured to be coupled to or removed from the storage frame at a position where the first storage lock slot may be provided and configured to be covered by the first container door when the first container door is closed. The second service cover may include a first storage lock hole configured to align with the first storage lock slot and the first storage lock opening such that the bolt of the first storage lock passes from the security panel through the first storage lock slot, first storage lock hole, and first storage lock opening to lock the first container door, while a remainder of the first storage lock slot and the first storage lock remains covered, When the first container door is closed, the first container door and the door may lie on a same plane.

Embodiments disclosed herein may be implemented as a smart storage assembly configured to be installed in a wall comprising at least one container. The container may have a front surface, a rear surface opposite to the front surface, a side surface connecting the front and rear surfaces, a front opening provided in the front surface and communicating with the storage space, a retrieval opening provided in the rear surface or the side surface, the retrieval opening communicating with the storage space, a front container door configured to open or close the front opening, the front container door having a first side hinged to the container and a second side opposite to the first side, a retrieval container door configured to open or close the retrieval opening, the retrieval container door having a first side hinged to the container to open or close the retrieval opening and a second side opposite to the first side, a front lock recess formed in the second side of the front container door, a retrieval lock recess formed in the retrieval container door, and a retrieval lock having a bolt configured to be inserted into and withdrawn from the retrieval lock recess to lock and unlock the retrieval container door. The smart storage assembly may further comprise a storage frame surrounding the container, the storage frame having a vertical portion formed with a lock hole that aligns with the front lock recess of the front container door when the front container door may be closed, a security panel provided adjacent to the vertical portion of the storage frame, wherein the retrieval opening and retrieval container door are provided behind the security panel, a locking assembly provided behind the security panel, the locking assembly including a bolt aligning with the lock hole of the storage frame and the front lock recess of the front container door when the front container door may be close, the bolt being configured to be inserted into or withdrawn from the lock hole and the front lock recess to lock or unlock the front container door, and an authentication interface provided at a front of the security panel to determine whether a user may be authorized to unlock the front container door.

When the front container door is closed and locked, the locking assembly and the storage frame may be concealed. When the authentication interface determines that the user is authorized to unlock the front container door, the bolt of the locking assembly may be withdrawn from the front lock recess and the lock hole to unlock the front container door, and the bolt of the retrieval lock may be inserted into the retrieval lock recess to lock the retrieval container door.

At least one container may include a plurality of containers that are stacked vertically. The storage frame may surround the plurality of containers. The vertical portion of the storage frame may be formed with a plurality of lock holes that align with the front lock recesses of the front container doors when the front container doors are closed. The locking assembly may include a plurality of bolts configured to be inserted into and withdrawn from the plurality of lock holes and the front lock recesses of the front container doors.

A plurality of service covers may be configured to be coupled to or removed from the storage frame to cover the plurality of lock holes. The lock holes may have a size configured to allow access to the locking assembly. The service covers may have bolt holes having a size configured to allow passage of the bolts of the locking assembly while concealing a remainder of the lock holes and locking assembly. At least one of the plurality of containers may be configured to heat or cool an item provided in the storage space.

A door may be provided adjacent to the security panel. The door may have a vertical length equal to a vertical length of all of the at least one containers. The locking assembly may be configured to lock or unlock the door.

Embodiments disclosed herein may be implemented as a smart door comprising a door and a door frame surrounding the door, the door frame being configured to be installed in a first side of a doorway of a building, a storage container and a storage frame surrounding the storage container, the storage frame being configured to be installed in a second side of the doorway, a security panel provided between the door frame and the storage frame, a container door configured to open or close the storage container, a lock assembly coupled to a rear of the security panel and having a first bolt and a second bolt, the first bolt being configured to extend through the door frame into a side of the door to lock the door and the second bolt being configured to extend through the storage frame into a side of the container door to lock the container door, an authentication interface coupled to a front of the security panel to determine whether a user at the authentication interface may be authorized to access at least one of the door or the storage container, the first and second bolts being moved based on a determination by the authentication interface, a service opening formed in at least one of the door frame or the storage frame at a position aligning with a side of the authentication interface to allow access to the authentication interface, a lock opening formed below the service opening at a position aligning with a side of the lock assembly to allow access to the lock assembly, and a service cover configured to be coupled to or removed from the door frame or the storage frame to open or close the service opening, the service cover having bolt holes to allow passage of the first or second bolts while covering a remainder of the lock opening.

Embodiments disclosed herein may be implemented as a smart door configured to be installed in a doorway comprising a door assembly having a door configured to allow passage between a front space and a rear space, the door assembly being configured to be installed at a first side of a doorway, a storage assembly having a storage container configured to allow storage of an item from the front space and retrieval of the item from the rear space, the storage assembly being configured to be installed at a second side of the doorway, a security assembly provided between the door assembly and the storage assembly, the security assembly including a metal plate having a front surface facing the front space and a rear surface facing the rear space, a lock provided behind the metal plate and configured to lock or unlock the door assembly and the storage assembly, and an authentication interface provided in front of the metal plate to authenticate a user in the front space. The lock may be controlled based on a determination by the authentication interface.

The door assembly may include a door frame provided between the door and the security assembly, and the metal plate may be coupled to the door frame. The storage assembly may include a storage frame provided between the storage container and the security assembly, and the metal plate may be coupled to the storage frame.

When the door assembly and the storage assembly are in a closed state, the lock may be concealed from the front space, and the door assembly, the storage assembly, and the security assembly may fill the doorway The doorway may be formed in a building having an exterior wall, an interior wall behind the exterior wall, and a middle structure between the exterior and interior walls, and the metal plate may be coupled to the middle structure.

The metal plate may include a first recess that may be recessed rearward from a front surface of the metal plate and configured to receive the authentication interface, and a second recess that may be recessed forward from a rear surface of the metal plate configured to receive the lock.

A cable may connect the lock and the authentication interface. A connection hole may be formed through the metal plate. The cable may pass through the connection hole.

A connection section may be formed between the first and second recesses to extend horizontally above the second recess and below the first recess such that the first and second recesses align in a vertical direction. A bottom of the authentication interface may be supported by the connection section.

A cable may connect the authentication interface and the lock. The connection section may have a horizontal plate shape and may be formed with a connection hole through which the cable passes.

The door assembly may include a door frame provided between the door and the security assembly, the storage assembly may include a storage frame provided between the storage container and the security assembly, an installation groove may be formed in at least one of the door frame or the storage frame at a side facing the security assembly, and the authentication interface may be inserted into and supported by the installation groove. The installation groove may include a first installation groove formed in the door frame and a second installation groove formed in the storage frame, and a first side of the authentication interface may be configured to be inserted into the first installation groove and a second side of the authentication interface may be configured to be inserted into the second installation groove.

A cover plate may be provided at a front of the security assembly to cover a front of the security assembly. The authentication interface may include at least one of a camera, a fingerprint sensor, a speaker, a microphone, a barcode scanner, a QR scanner, a number pad, or a key pad.

The authentication interface may determine whether a person in the front space may have a primary authorization, a secondary authorization, or unauthorized access. When the authentication interface determines primary authorization, the lock may be controlled to unlock at least the door assembly. When the authentication interface determines secondary authorization, the lock may be controlled to unlock the storage assembly and to keep the door assembly locked. When the authentication interface determines unauthorized access, the door assembly and the storage assembly may remain locked.

The security assembly may include a secondary metal plate provided at a rear of the metal plate. The lock may be provided between the metal plate and the secondary metal plate.

Embodiments disclosed herein may be implemented as a smart door configured to be installed in a doorway comprising a door panel having a first side and a second side opposite to the first side, the first side being configured to be rotatably fixed to a structure defining a doorway to allow passage through a front space in front of the doorway and a rear space behind the doorway, a security panel provided in the doorway to be adjacent to the second side of the door panel when the door panel may be closed, the security panel having a front surface facing the front space and a side surface facing the second side of the door panel when the door panel may be closed, a lock recess formed in the second side of the door panel, a lock hole formed through the side surface of the security panel at a position aligning with the lock recess, and a lock provided inside of the security panel at a position aligning with the lock hole and having a bolt configured to engage with the lock recess of the door panel to lock the door panel.

The door panel may have a front surface. When the bolt is engaged with the lock recess, the front surface of the door panel may face the front space and lies flush with the front surface of the security panel.

The security panel may include a front plate, a rear plate coupled to the front plate, and a transparent plate coupled to the front plate and defining the front surface. The lock may be provided between the front plate and the rear plate. A sensor may be provided between the front plate and the transparent plate to determine whether a user in the first space may be authorized to enter the rear space. The lock may be controlled based on a determination of the sensor.

A door frame may surround the door panel. The door frame may have a side surface coupled to the side surface of the security panel. The side surface of the door frame may be formed with a lock hole configured to align with the lock hole of the security panel and the lock recess when the door panel may be closed.

A plurality of storage containers may be stacked vertically in the doorway. Each storage container may have a front door having a side surface provided adjacent to the security panel, a storage lock recess formed in the side surface of the front door, a storage lock hole formed through the security panel at a position aligning with the lock recess, and a storage lock provided inside of the security panel at a position aligning with the lock hole and having a bolt configured to engage with the storage lock recess of the front door to lock the front door. When the bolt of the storage lock is engaged with the storage lock recess, the storage lock may be concealed, and the front doors of the storage containers lie flush with the front surface of the security panel.

Embodiments disclosed herein may be implemented as a smart entryway comprising a wall having a doorway, the doorway having a first section adjacent to a first side of the wall, a second section adjacent to a second side of the wall, and a third section provided between the first section and the second section, a door provided in the first section of the doorway to allow passage between an interior space and an exterior space, a door frame bordering the first section of the doorway and surrounding the door, the door frame having a first beam fixed to the first side of the wall, the door being hinged to the first beam of the door frame, at least one storage container having a storage space provided in the second section of the doorway and an exterior door to allow access to the storage space from the exterior space, a storage frame bordering the second section of the doorway to surround the at least one storage container, the storage frame having a first beam fixed to the second side of the wall, and a security assembly provided in the third section of the doorway to be between the door frame and the storage frame, the security assembly having a lock and a panel housing the lock, the panel being coupled to at least one of the door frame, the storage frame, or a portion of the wall above the third section of the doorway.

The door frame may be made of a material configured to support a portion of the wall above the first section of the doorway, and the door frame may have a bottom panel configured to be fixed to or embedded in a surface provided at a bottom of the doorway. The storage frame may be made of a material configured to support a portion of the structure above the second section of the doorway, and the storage frame may have a bottom panel configured to be fixed to or embedded in a surface provided at a bottom of the doorway.

The door frame may include a second beam opposite to the first beam, and the second beam may be fixed to the panel. The storage frame may include a second beam opposite to the first beam, and the second beam may be fixed to the panel.

The storage container may include an opening, and the exterior door may include a first side and a second side opposite to the first side, the first side of the exterior door being hinged to the storage container at an edge of the opening and the second side of the exterior door being adjacent to a section of the storage frame that contacts the panel.

The first beam of the door frame and the first beam of the storage frame may be parallel to each other. The panel may be aligned with the first beam of the door frame and the first beam of the storage frame. Tops of the door frame, storage frame, and panel may have a same height.

A front trim assembly may be configured to border the doorway at a position in front of the door frame and the storage frame. The front trim assembly may have a first front trim coupled to the first beam of the door frame.

The door frame may have a top beam configured to contact a bottom of the structure at a position above the first section of the doorway. The storage frame may have a top beam configured to contact the bottom of the structure at a position above the second section of the doorway. The first front trim may be coupled to the top beams of the door frame and storage frame such that the first front trim conceals the first and top beams of the door and storage frames from the exterior space.

A rear of the first front trim may be formed with a block configured to be inserted between the top beams of the door frame and the storage frame to be provided above the panel and to contact the bottom of the structure at a position above the third section of the doorway. An upper beam may be provided above the panel to be between the top beams of the storage frame and the door frame. The upper beam may have a front-rear thickness that may be less than front-rear thicknesses of the top beams of the storage frame and the door frame such that a front gap may be formed in front of the upper panel between the storage frame and the door frame. The block may be configured to be inserted into the front gap to cover the upper beam.

The front trim assembly may include a second front trim coupled to a front of the first front trim. The front of the first front trim may be formed with a groove, and a rear of the second front trim may be formed with a protrusion configured to fit into the groove to couple the second front trim to the first front trim.

Embodiments disclosed herein may be implemented as smart entryway configured to be installed in a doorway comprising a door assembly provided in a first section of a doorway, the door assembly including an access door and a door frame, the door frame bordering the access door and the access door being rotatably coupled to the door frame so as to allow or prevent passage between a front space and a rear space, a storage assembly provided in a second section of the doorway, the storage assembly including a storage container and a storage frame, the storage frame bordering the storage container and the storage container having a front door to allow access to an inside the storage container from the front space, a security panel provided in a third section of the doorway between the first and second sections, wherein left and right sides of the security assembly contact the storage frame and the door frame, respectively, a lock coupled to a rear of the security panel and configured to lock or unlock the access door and the front door, and a front seal provided to border the doorway and to couple to front sections of the door frame and the storage frame. The front seal may be configured to protect the door frame and the storage frame and to reduce heat transmission between the front space and the rear space when the access door and the front door are closed.

The door frame may include a first section coupled to a structure in which the doorway may be formed, a second section opposite to the first section and coupled to the security panel, a third section coupled to a portion of the structure above the first section of the doorway, and a fourth section embedded into a bottom surface. The storage frame may include a first section coupled to the structure, a second section opposite to the first section and coupled to the security panel, a third section coupled to a portion of the structure above the second section of the doorway, and a fourth section embedded into the bottom surface. The front seal may include a first section coupled to the first section of the door frame, a second section coupled to the first section of the storage frame, and a top section coupled to the third sections of the door frame and the storage frame, the front seal contacting the structure at the first section, second section, and third section. A rear of the top section of the front seals may include a block configured to be inserted between the third sections of the door frame and the storage frame and between the structure and the security panel.

An authentication interface may be coupled to a front of the security panel and configured to determine whether a user in the front space is authorized to access the rear space or the inside of the storage container. The lock may be controlled based on a determination by the authentication interface.

A front handle may be provided on a front surface of the access door and configured to be moved to protrude forward. A rear handle may be provided on a rear surface of the access door and configured to be moved to protrude rearward. A handle actuator may be configured to move the front handle and the rear handle.

When the authentication interface determines that the user is authorized to enter the second space, the lock may be controlled to unlock the access door, and the front handle may be controlled to protrude forward from the front surface of the access door. When the authentication interface determines that the user may be not authorized to enter the second space, the lock may be controlled to lock the access door, and the front handle may be controlled to be moved to a position where a front surface of the handle may be flush with the front surface of the access door.

The access door may include a display configured to be visible from the rear space. Information from the authentication interface may be displayed on the display.

The storage container may include a rear or interior door to allow access to the inside of the storage container from the rear space. When the front door is unlocked, the rear door may be automatically locked.

Embodiments disclosed herein may be implemented as a smart entryway comprising a door assembly installed in a building and having an access door configured to open or close a first section of a doorway of the building to allow ingress or egress between an exterior space and an interior space, a storage assembly having a first container and a storage door in a second section of the doorway, the storage door configured to be opened or closed for allowing or preventing access to the first container from the exterior space and the interior space, a security panel provided in a third section of the doorway between the first and second sections, the security panel having a lock assembly configured to lock and unlock the access door and the container door, and an assembly support installed in the building and provided behind and fixed to the security panel, the assembly support configured to secure the security panel to the building.

An upper end of the assembly support may be embedded in a portion of the building that defines a top of the doorway. The upper end of the assembly support may extend upward beyond an upper end of the security panel.

A lower end of the assembly support may be embedded in a floor or base that defines a bottom of the doorway. The lower end of the assembly support may extend downward beyond a lower end of the security panel.

The assembly support may have a length in a vertical direction that may be longer than a length of the security panel in the vertical direction. The assembly support may be a beam (e.g., an H-beam) welded or riveted to the security panel.

A door frame may be provided between the access door and the security panel. The door frame may be coupled to the assembly support. A storage frame may be provided between the first container and the security panel. The storage frame may be coupled to the assembly support.

The assembly support may include a first portion facing a rear surface of the security panel, a second portion spaced apart from the first portion and facing away from the rear surface of the security panel, and a third portion connecting the first portion and the second portion.

A door frame may be provided between the access door and the security panel. The first portion may be coupled to the door frame. A storage frame provided between the first container and the security panel. The first portion may be coupled to the storage frame.

A support cover may be configured to surround the assembly support. The support cover may have an opened surface through which the assembly support may be exposed to an outside of the support cover. The support cover may include a first cover plate covering a first side of the assembly support, a second cover plate covering a second side of the assembly support, the second side being opposite to the first side, and a third cover plate connecting the first cover plate and the second cover plate to cover a rear surface of the assembly support. The third cover plate may be exposed to the interior space.

A door frame may be provided between the access door and the security panel. The first cover plate may be provided between the first side of the assembly support and the door frame. A storage frame may be provided between the first container and the security panel. The second cover plate may be provided between the second side of the assembly support and the storage frame.

An authentication device may be provided in the security panel to lock or unlock the lock assembly. The lock assembly may include an access door lock bolt configured to protrude into a side of the access door to lock or unlock the access door, and a storage door lock configured to protrude into a side of the storage door to lock or unlock the storage door.

The storage assembly may include a second container having a secondary storage door configured to be opened or closed for allowing or preventing access to the second container from the exterior space and the interior space.

Embodiments disclosed herein may be implemented as a smart entryway comprising a door assembly installed in a building, the door assembly having an access door and a door frame, wherein the access door may be configured to open or close a first section of a doorway of the building to allow ingress or egress between an exterior space and an interior space, a storage assembly having a first container, a storage door, and a storage frame provided in a second section of the doorway, wherein the storage door may be configured to be opened or closed for allowing or preventing access to the first container from the exterior space and the interior space, a security panel provided in a third section of the doorway between the first and second sections, the security panel having a lock assembly configured to lock and unlock the access door and the container door, wherein the door frame may be provided between the access door and the security panel and the storage frame may be provided between the storage door and the security panel, and an assembly support installed in the building and provided behind and fixed to the security panel, the assembly support configured to secure the security panel to the building, wherein the assembly support may be provided between the door frame and the storage frame.

Embodiments disclosed herein may be implemented as a smart entryway comprising a door and a frame surrounding the door, the door frame being configured to be installed in a first side of a doorway of a building, a security panel provided adjacent to the frame, the security panel including a lock assembly that has a bolt configured to extend through the frame into a side of the door to lock the door, and a rigid support fixed to a rear of the security panel and configured to have at least one end embedded in a portion of the building that defines the doorway to secure the security panel to the building.

Although the above has been shown and described with respect to preferred embodiments of the present disclosure, the present disclosure is not limited to the above-described specific embodiments, it is intended in the technical field to which the disclosure belongs without departing from the spirit of the disclosure claimed in the claims. Various modifications can be made by those skilled in the art, and these modifications should not be individually understood from the technical spirit or the prospect of the present disclosure.

Advantages and features of the present disclosure, and methods for achieving them will be apparent with reference to the embodiments described below in detail in conjunction with the accompanying drawings. However, the present disclosure is not limited to the embodiments disclosed, but may be embodied in various different forms, and the present embodiments merely make the disclosure of the present disclosure complete, and those of ordinary skill in the art to which the present disclosure belongs. It is provided to fully inform the person having the scope of the disclosure, which is defined only by the scope of the claims. Like reference numerals refer to like elements throughout.

It will be understood that when an element or layer is referred to as being “on” another element or layer, the element or layer can be directly on another element or layer or intervening elements or layers. In contrast, when an element is referred to as being “directly on” another element or layer, there are no intervening elements or layers present. As used herein, the term “and/or” includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as “lower”, “upper” and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as “lower” relative to other elements or features would then be oriented “upper” relative to the other elements or features. Thus, the exemplary term “lower” can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A smart entryway, comprising:

a door assembly installed in a building and having an access door configured to open or close a first section of an access zone of the building, the access zone allowing ingress or egress between an exterior space and an interior space;

a storage assembly having

- a first container provided in a second section of the access zone,
- a first storage door configured to open or close the first container from the exterior space, and
- a second storage door configured to open or close the first container from the interior space;

a security panel provided in a third section of the access zone between the first and second sections, the security panel having a lock assembly configured to lock and unlock each of the access door and the first storage door when the access door and the first storage door are in a closed state; and an assembly support installed in the building and provided behind and fixed to the security panel, the assembly support being configured to secure the security panel to the building.

2. The smart entryway of claim 1, wherein an upper end of the assembly support is embedded in a top of the access zone.

3. The smart entryway of claim 2, wherein the upper end of the assembly support extends upward beyond an upper end of the security panel.

4. The smart entryway of claim 1, wherein a lower end of the assembly support is embedded in a floor or base that defines a bottom of the access zone.

5. The smart entryway of claim 4, wherein the lower end of the assembly support extends downward beyond a lower end of the security panel.

6. The smart entryway of claim 1, wherein the assembly support has a length in a vertical direction that is longer than a length of the security panel in the vertical direction.

7. The smart entryway of claim 1, wherein the assembly support is an H-beam welded or riveted to the security panel.

8. The smart entryway of claim 1, further comprising a door frame provided between the access door and the security panel, wherein the door frame is coupled to the assembly support.

9. The smart entryway of claim 1, further comprising a storage frame provided between the first container and the security panel, wherein the storage frame is coupled to the assembly support.

10. The smart entryway of claim 1, wherein the assembly support includes:

a first portion facing a rear surface of the security panel;

a second portion spaced apart from the first portion and facing away from the rear surface of the security panel; and a third portion connecting the first portion and the second portion.

11. The smart entryway of claim 10, further comprising a door frame provided between the access door and the security panel, wherein the first portion is coupled to the door frame.

12. The smart entryway of claim 10, further comprising a storage frame provided between the first container and the security panel, wherein the first portion is coupled to the storage frame.

13. The smart entryway of claim 1, further comprising a support cover configured to surround the assembly support, the support cover having an opened surface through which the assembly support is exposed to an outside of the support cover.

14. The smart entryway of claim 13, wherein the support cover includes:

a first cover plate covering a first side of the assembly support;

a second cover plate covering a second side of the assembly support, the second side being opposite to the first side; and a third cover plate connecting the first cover plate and the second cover plate to cover a rear surface of the assembly support.

15. The smart entryway of claim 14, wherein the third cover plate is exposed to the interior space.

16. The smart entryway of claim 14, further comprising a door frame provided between the access door and the security panel, wherein the first cover plate is provided between the first side of the assembly support and the door frame.

17. The smart entryway of claim 14, further comprising a storage frame provided between the first container and the security panel, wherein the second cover plate is provided between the second side of the assembly support and the storage frame.

18. The smart entryway of claim 1, further comprising an authentication device provided in the security panel to lock or unlock the lock assembly, wherein the lock assembly includes:

an access door lock bolt configured to protrude into a side of the access door to lock or unlock the access door; and a storage door lock configured to protrude into a side of the first storage door to lock or unlock the first storage door.

19. The smart entryway of claim 1, wherein the storage assembly includes a second container having a secondary storage door configured to open or close access to the second container from the exterior space and the interior space.

20. A smart entryway, comprising:

a door assembly installed in a building, the door assembly having an access door and a door frame, wherein the access door is configured to open or close a first section of an access zone to allow ingress or egress between an exterior space and an interior space;

a storage assembly having a first container, a first storage door, a second storage door, and a storage frame provided in a second section of the access zone, wherein the first storage door is configured to open or close the first container from the exterior space, and the second storage door is configured to open or close the first container from the interior space;

a security panel provided in a third section of the access zone between the first and second sections, the security panel having a lock assembly configured to lock and unlock the access door and the first storage door in a closed state, wherein the door frame is provided between the access door and the security panel, and the storage frame is provided between the first storage door and the security panel; and an assembly support installed in the building and provided behind and fixed to the security panel, the assembly support being configured to secure the security panel to the building, wherein the assembly support is provided between the door frame and the storage frame.

* * * * *